(12) United States Patent
Shabtay et al.

(10) Patent No.: US 12,411,392 B2
(45) Date of Patent: *Sep. 9, 2025

(54) SLIM POP-OUT CAMERAS AND LENSES FOR SUCH CAMERAS

(71) Applicant: Corephotonics Ltd., Tel Aviv (IL)

(72) Inventors: Gal Shabtay, Tel Aviv (IL); Itay Yedid, Tel Aviv (IL); Ephraim Goldenberg, Tel Aviv (IL); Tal Korman, Tel Aviv (IL); Roy Rudnick, Tel Aviv (IL); Kobi Goldstein, Tel Aviv (IL); Yiftah Kowal, Tel Aviv (IL); Michael Dror, Tel Aviv (IL); Michael Scherer, Tel Aviv (IL)

(73) Assignee: Corephotonics LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 19/010,050

(22) Filed: Jan. 5, 2025

(65) Prior Publication Data
US 2025/0138396 A1    May 1, 2025

Related U.S. Application Data

(63) Continuation of application No. 18/768,244, filed on Jul. 10, 2024, now Pat. No. 12,292,671, which is a
(Continued)

(51) Int. Cl.
G03B 17/04     (2021.01)
G02B 7/02      (2021.01)
(Continued)

(52) U.S. Cl.
CPC ............ *G03B 17/04* (2013.01); *G02B 7/021* (2013.01); *G02B 7/026* (2013.01); *G02B 13/02* (2013.01);
(Continued)

(58) Field of Classification Search
CPC ........ H04N 23/54; H04N 23/55; H04N 23/57; G02B 7/021; G02B 7/026; G02B 13/02;
(Continued)

(56) References Cited

U.S. PATENT DOCUMENTS 2,106,752 A    2/1938   Land
2,354,503 A    7/1944   Cox
(Continued)

FOREIGN PATENT DOCUMENTS

CN    101025470 A    8/2007
CN    101634738 A    1/2010
(Continued)

OTHER PUBLICATIONS

A compact and cost effective design for cell phone zoom lens, Chang et al., Sep. 2007, 8 pages.
(Continued)

*Primary Examiner* — Twyler L Haskins
*Assistant Examiner* — John H Morehead, III
(74) *Attorney, Agent, or Firm* — Nathan & Associates; Menachem Nathan

(57) ABSTRACT

Digital cameras comprising a lens assembly comprising N lens elements $L_1$-$L_N$ starting with $L_1$ on an object side, wherein N is ≥4, an image sensor having a sensor diagonal $S_D$, and a pop-out mechanism that controls a largest air-gap d between two consecutive lens elements within lens elements $L_1$ and $L_N$ to bring the camera to an operative pop-out state and a collapsed state, wherein the lens assembly has a total track length TTL in the operative pop-out state and a collapsed total track length cTTL in the collapsed state, wherein $S_D$ is in the range of 7-20 mm and wherein cTTL/$S_D$<0.6.

20 Claims, 48 Drawing Sheets

Related U.S. Application Data continuation of application No. 17/567,417, filed on Jan. 3, 2022, now Pat. No. 12,066,747, which is a continuation of application No. 17/460,231, filed on Aug. 29, 2021, now Pat. No. 12,072,609, which is a continuation-in-part of application No. 17/291,475, filed as application No. PCT/IB2020/058697 on Sep. 18, 2020, now abandoned.

(60) Provisional application No. 63/037,836, filed on Jun. 11, 2020, provisional application No. 63/026,317, filed on May 18, 2020, provisional application No. 62/904,913, filed on Sep. 24, 2019.

(51) Int. Cl.
*G02B 13/02* (2006.01)
*G02B 13/06* (2006.01)
*G03B 17/12* (2021.01)
*G03B 30/00* (2021.01)
*H04N 23/54* (2023.01)
*H04N 23/55* (2023.01)
*H04N 23/57* (2023.01)

(52) U.S. Cl.
CPC ............ *G02B 13/06* (2013.01); *G03B 30/00* (2021.01); *H04N 23/54* (2023.01); *H04N 23/55* (2023.01); *H04N 23/57* (2023.01); *G03B 17/12* (2013.01)

(58) Field of Classification Search
CPC ........ G02B 13/06; G03B 30/00; G03B 17/04; G03B 17/12
See application file for complete search history.

(56) References Cited

U.S. PATENT DOCUMENTS

| | | | |
|---|---|---|---|
| 2,378,170 A | 6/1945 | Aklin | |
| 2,441,093 A | 5/1948 | Aklin | |
| 3,388,956 A | 6/1968 | Eggert et al. | |
| 3,524,700 A | 8/1970 | Eggert et al. | |
| 3,558,218 A | 1/1971 | Grey | |
| 3,864,027 A | 2/1975 | Harada | |
| 3,942,876 A | 3/1976 | Betensky | |
| 4,134,645 A | 1/1979 | Sugiyama et al. | |
| 4,338,001 A | 7/1982 | Matsui | |
| 4,465,345 A | 8/1984 | Yazawa | |
| 4,792,822 A | 12/1988 | Akiyama et al. | |
| 5,000,551 A | 3/1991 | Shibayama | |
| 5,327,291 A | 7/1994 | Baker et al. | |
| 5,331,465 A | 7/1994 | Miyano | |
| 5,600,488 A | 2/1997 | Minefuji et al. | |
| 5,969,869 A | 10/1999 | Hirai et al. | |
| 6,014,266 A | 1/2000 | Obama et al. | |
| 6,035,136 A | 3/2000 | Hayashi et al. | |
| 6,038,087 A | 3/2000 | Suzuki et al. | |
| 6,147,702 A | 11/2000 | Smith | |
| 6,169,636 B1 | 1/2001 | Kreitzer | |
| 6,654,180 B2 | 11/2003 | Ori | |
| 7,187,504 B2 | 3/2007 | Horiuchi | |
| 7,206,136 B2 | 4/2007 | Labaziewicz et al. | |
| 7,274,516 B2 | 9/2007 | Kushida et al. | |
| 7,515,351 B2 | 4/2009 | Chen et al. | |
| 7,564,635 B1 | 7/2009 | Tang | |
| 7,643,225 B1 | 1/2010 | Tsai | |
| 7,660,049 B2 | 2/2010 | Tang | |
| 7,684,128 B2 | 3/2010 | Tang | |
| 7,688,523 B2 | 3/2010 | Sano | |
| 7,692,877 B2 | 4/2010 | Tang et al. | |
| 7,697,220 B2 | 4/2010 | Iyama | |
| 7,738,186 B2 | 6/2010 | Chen et al. | |
| 7,777,972 B1 | 8/2010 | Chen et al. | |
| 7,813,057 B2 | 10/2010 | Lin | |
| 7,821,724 B2 | 10/2010 | Tang et al. | |
| 7,826,149 B2 | 11/2010 | Tang et al. | |
| 7,826,151 B2 | 11/2010 | Tsai | |
| 7,869,142 B2 | 1/2011 | Chen et al. | |
| 7,898,747 B2 | 3/2011 | Tang | |
| 7,916,401 B2 | 3/2011 | Chen et al. | |
| 7,918,398 B2 | 4/2011 | Li et al. | |
| 7,957,075 B2 | 6/2011 | Tang | |
| 7,957,076 B2 | 6/2011 | Tang | |
| 7,957,079 B2 | 6/2011 | Tang | |
| 7,961,406 B2 | 6/2011 | Tang et al. | |
| 8,000,031 B1 | 8/2011 | Tsai | |
| 8,004,777 B2 | 8/2011 | Sano et al. | |
| 8,077,400 B2 | 12/2011 | Tang | |
| 8,149,523 B2 | 4/2012 | Ozaki | |
| 8,218,253 B2 | 7/2012 | Tang | |
| 8,228,622 B2 | 7/2012 | Tang | |
| 8,233,224 B2 | 7/2012 | Chen | |
| 8,253,843 B2 | 8/2012 | Lin | |
| 8,279,537 B2 | 10/2012 | Sato | |
| 8,363,337 B2 | 1/2013 | Tang et al. | |
| 8,395,851 B2 | 3/2013 | Tang et al. | |
| 8,400,717 B2 | 3/2013 | Chen et al. | |
| 8,451,549 B2 | 5/2013 | Yamanaka et al. | |
| 8,503,107 B2 | 8/2013 | Chen et al. | |
| 8,514,502 B2 | 8/2013 | Chen | |
| 8,570,668 B2 | 10/2013 | Takakubo et al. | |
| 8,718,458 B2 | 5/2014 | Okuda | |
| 8,780,465 B2 | 7/2014 | Chae | |
| 8,810,923 B2 | 8/2014 | Shinohara | |
| 8,854,745 B1 | 10/2014 | Chen | |
| 8,958,164 B2 | 2/2015 | Kwon et al. | |
| 9,185,291 B1 | 11/2015 | Shabtay et al. | |
| 9,201,223 B2 | 12/2015 | Ohashi | |
| 9,229,194 B2 | 1/2016 | Yoneyama et al. | |
| 9,235,036 B2 | 1/2016 | Kato et al. | |
| 9,279,957 B2 | 3/2016 | Kanda et al. | |
| 9,299,510 B2* | 3/2016 | Cheong | H01H 13/86 |
| 9,438,792 B2 | 9/2016 | Nakada et al. | |
| 9,488,802 B2 | 11/2016 | Chen et al. | |
| 9,568,712 B2 | 2/2017 | Dror et al. | |
| 9,678,310 B2 | 6/2017 | Iwasaki et al. | |
| 9,817,213 B2 | 11/2017 | Mercado | |
| 9,835,834 B2 | 12/2017 | Li et al. | |
| 9,869,846 B1 | 1/2018 | Bone et al. | |
| 10,330,892 B2 | 6/2019 | Hashimoto | |
| 10,948,696 B2 | 3/2021 | Shabtay et al. | |
| 11,340,425 B2 | 5/2022 | Yamazaki | |
| 11,347,016 B2 | 5/2022 | Shabtay et al. | |
| 12,066,747 B2* | 8/2024 | Shabtay | H04N 23/54 |
| 12,069,371 B2 | 8/2024 | Shabtay et al. | |
| 12,292,671 B2* | 5/2025 | Shabtay | G02B 13/02 |
| 2002/0118471 A1 | 8/2002 | Imoto | |
| 2003/0048542 A1 | 3/2003 | Enomoto | |
| 2004/0095503 A1 | 5/2004 | Iwasawa et al. | |
| 2005/0041300 A1 | 2/2005 | Oshima et al. | |
| 2005/0062346 A1 | 3/2005 | Sasaki | |
| 2005/0128604 A1 | 6/2005 | Kuba | |
| 2005/0141103 A1 | 6/2005 | Nishina | |
| 2005/0168840 A1 | 8/2005 | Kobayashi et al. | |
| 2005/0270667 A1 | 12/2005 | Gurevich et al. | |
| 2006/0092524 A1 | 5/2006 | Konno | |
| 2006/0238902 A1 | 10/2006 | Nakashima et al. | |
| 2006/0262420 A1 | 11/2006 | Matsumoto et al. | |
| 2006/0275025 A1 | 12/2006 | Labaziewicz et al. | |
| 2007/0114990 A1 | 5/2007 | Godkin | |
| 2007/0183058 A1 | 8/2007 | Bito et al. | |
| 2007/0188884 A1 | 8/2007 | Yoshitsugu et al. | |
| 2007/0229983 A1 | 10/2007 | Saori | |
| 2007/0247726 A1 | 10/2007 | Sudoh | |
| 2007/0253689 A1 | 11/2007 | Nagai et al. | |
| 2008/0056698 A1 | 3/2008 | Lee et al. | |
| 2008/0094730 A1 | 4/2008 | Toma et al. | |
| 2008/0094738 A1 | 4/2008 | Lee | |
| 2008/0117527 A1 | 5/2008 | Nuno et al. | |
| 2008/0273250 A1 | 11/2008 | Nishio | |
| 2008/0291531 A1 | 11/2008 | Heimer | |
| 2008/0304161 A1 | 12/2008 | Souma | |
| 2009/0002839 A1 | 1/2009 | Sato | |

(56) References Cited

U.S. PATENT DOCUMENTS

| | | |
|---|---|---|
| 2009/0067063 A1 | 3/2009 | Asami et al. |
| 2009/0122423 A1 | 5/2009 | Park et al. |
| 2009/0135245 A1 | 5/2009 | Luo et al. |
| 2009/0141365 A1 | 6/2009 | Jannard et al. |
| 2009/0147368 A1 | 6/2009 | Oh et al. |
| 2009/0161228 A1 | 6/2009 | Lee |
| 2009/0225438 A1 | 9/2009 | Kubota |
| 2009/0279191 A1 | 11/2009 | Yu |
| 2009/0303620 A1 | 12/2009 | Abe et al. |
| 2010/0007967 A1 | 1/2010 | Ohashi |
| 2010/0026878 A1 | 2/2010 | Seo |
| 2010/0033844 A1 | 2/2010 | Katano |
| 2010/0060995 A1 | 3/2010 | Yumiki et al. |
| 2010/0165476 A1 | 7/2010 | Eguchi |
| 2010/0214664 A1 | 8/2010 | Chia |
| 2010/0277813 A1 | 11/2010 | Ito |
| 2011/0001838 A1 | 1/2011 | Lee |
| 2011/0032409 A1 | 2/2011 | Rossi et al. |
| 2011/0080655 A1 | 4/2011 | Mori |
| 2011/0102667 A1 | 5/2011 | Chua et al. |
| 2011/0102911 A1 | 5/2011 | Iwasaki |
| 2011/0115965 A1 | 5/2011 | Engelhardt et al. |
| 2011/0149119 A1 | 6/2011 | Matsui |
| 2011/0157430 A1 | 6/2011 | Hosoya et al. |
| 2011/0157721 A1 | 6/2011 | Ohtake |
| 2011/0188121 A1 | 8/2011 | Goring et al. |
| 2011/0249347 A1 | 10/2011 | Kubota |
| 2012/0062783 A1 | 3/2012 | Tang et al. |
| 2012/0069455 A1 | 3/2012 | Lin et al. |
| 2012/0092777 A1 | 4/2012 | Tochigi et al. |
| 2012/0105708 A1 | 5/2012 | Hagiwara |
| 2012/0147489 A1 | 6/2012 | Matsuoka |
| 2012/0154929 A1 | 6/2012 | Tsai et al. |
| 2012/0194923 A1 | 8/2012 | Um |
| 2012/0229920 A1 | 9/2012 | Otsu et al. |
| 2012/0262806 A1 | 10/2012 | Lin et al. |
| 2012/0314299 A1 | 12/2012 | Tashiro et al. |
| 2013/0002933 A1 | 1/2013 | Topliss et al. |
| 2013/0057971 A1 | 3/2013 | Zhao et al. |
| 2013/0088788 A1 | 4/2013 | You |
| 2013/0176479 A1 | 7/2013 | Wada |
| 2013/0208178 A1 | 8/2013 | Park |
| 2013/0271852 A1 | 10/2013 | Schuster |
| 2013/0279032 A1 | 10/2013 | Suigetsu et al. |
| 2013/0286488 A1 | 10/2013 | Chae |
| 2014/0022436 A1 | 1/2014 | Kim et al. |
| 2014/0028898 A1 | 1/2014 | Pavithran et al. |
| 2014/0036112 A1 | 2/2014 | Scarff |
| 2014/0063616 A1 | 3/2014 | Okano et al. |
| 2014/0092487 A1 | 4/2014 | Chen et al. |
| 2014/0139719 A1 | 5/2014 | Fukaya et al. |
| 2014/0146216 A1 | 5/2014 | Okumura |
| 2014/0160581 A1 | 6/2014 | Cho et al. |
| 2014/0204480 A1 | 7/2014 | Jo et al. |
| 2014/0240853 A1 | 8/2014 | Kubota et al. |
| 2014/0285907 A1 | 9/2014 | Tang et al. |
| 2014/0293453 A1 | 10/2014 | Ogino et al. |
| 2014/0362274 A1 | 12/2014 | Christie et al. |
| 2015/0022896 A1 | 1/2015 | Cho et al. |
| 2015/0029601 A1 | 1/2015 | Dror et al. |
| 2015/0116569 A1 | 4/2015 | Mercado |
| 2015/0138431 A1 | 5/2015 | Shin et al. |
| 2015/0153548 A1 | 6/2015 | Kim et al. |
| 2015/0160438 A1 | 6/2015 | Okuda |
| 2015/0168667 A1 | 6/2015 | Kudoh |
| 2015/0177496 A1 | 6/2015 | Marks et al. |
| 2015/0205068 A1 | 7/2015 | Sasaki |
| 2015/0244942 A1 | 8/2015 | Shabtay et al. |
| 2015/0253532 A1 | 9/2015 | Lin |
| 2015/0253543 A1 | 9/2015 | Mercado |
| 2015/0253647 A1 | 9/2015 | Mercado |
| 2015/0323757 A1 | 11/2015 | Bone |
| 2015/0373252 A1 | 12/2015 | Georgiev |
| 2015/0373263 A1 | 12/2015 | Georgiev et al. |
| 2016/0007008 A1 | 1/2016 | Molgaard et al. |
| 2016/0033742 A1 | 2/2016 | Huang |
| 2016/0044250 A1 | 2/2016 | Shabtay et al. |
| 2016/0062084 A1 | 3/2016 | Chen et al. |
| 2016/0062136 A1 | 3/2016 | Nomura et al. |
| 2016/0070088 A1 | 3/2016 | Koguchi |
| 2016/0085089 A1 | 3/2016 | Mercado |
| 2016/0105616 A1 | 4/2016 | Shabtay et al. |
| 2016/0187631 A1 | 6/2016 | Choi et al. |
| 2016/0195691 A1 | 7/2016 | Bito et al. |
| 2016/0202455 A1 | 7/2016 | Aschwanden et al. |
| 2016/0212333 A1 | 7/2016 | Liege et al. |
| 2016/0241756 A1 | 8/2016 | Chen |
| 2016/0291295 A1 | 10/2016 | Shabtay et al. |
| 2016/0306161 A1 | 10/2016 | Harada et al. |
| 2016/0313537 A1 | 10/2016 | Mercado |
| 2016/0341931 A1 | 11/2016 | Liu et al. |
| 2016/0349504 A1 | 12/2016 | Kim et al. |
| 2016/0353008 A1 | 12/2016 | Osborne |
| 2017/0023778 A1 | 1/2017 | Inoue |
| 2017/0052350 A1 | 2/2017 | Chen |
| 2017/0094187 A1 | 3/2017 | Sharma et al. |
| 2017/0102522 A1 | 4/2017 | Jo |
| 2017/0115471 A1 | 4/2017 | Shinohara |
| 2017/0153422 A1 | 6/2017 | Tang et al. |
| 2017/0160511 A1 | 6/2017 | Kim et al. |
| 2017/0199360 A1 | 7/2017 | Chang |
| 2017/0276911 A1 | 9/2017 | Huang |
| 2017/0276914 A1 | 9/2017 | Yao et al. |
| 2017/0310952 A1 | 10/2017 | Adomat et al. |
| 2017/0329108 A1 | 11/2017 | Hashimoto et al. |
| 2017/0337703 A1 | 11/2017 | Wu et al. |
| 2018/0024319 A1 | 1/2018 | Lai et al. |
| 2018/0048825 A1 | 2/2018 | Wang |
| 2018/0059365 A1 | 3/2018 | Bone et al. |
| 2018/0059376 A1 | 3/2018 | Lin et al. |
| 2018/0081149 A1 | 3/2018 | Bae et al. |
| 2018/0120674 A1 | 5/2018 | Avivi et al. |
| 2018/0149835 A1 | 5/2018 | Park |
| 2018/0196236 A1 | 7/2018 | Ohashi et al. |
| 2018/0196238 A1 | 7/2018 | Goldenberg et al. |
| 2018/0217475 A1 | 8/2018 | Goldenberg et al. |
| 2018/0218224 A1 | 8/2018 | Olmstead et al. |
| 2018/0224630 A1 | 8/2018 | Lee et al. |
| 2018/0253877 A1 | 9/2018 | Kozub et al. |
| 2018/0268226 A1 | 9/2018 | Shashua et al. |
| 2019/0025549 A1 | 1/2019 | Hsueh et al. |
| 2019/0025554 A1 | 1/2019 | Son |
| 2019/0049687 A1 | 2/2019 | Bachar et al. |
| 2019/0075284 A1 | 3/2019 | Ono |
| 2019/0086638 A1 | 3/2019 | Lee |
| 2019/0094500 A1 | 3/2019 | Tseng et al. |
| 2019/0107651 A1 | 4/2019 | Sade |
| 2019/0121216 A1 | 4/2019 | Shabtay et al. |
| 2019/0155002 A1 | 5/2019 | Shabtay et al. |
| 2019/0170965 A1 | 6/2019 | Shabtay et al. |
| 2019/0187443 A1 | 6/2019 | Jia et al. |
| 2019/0187486 A1 | 6/2019 | Goldenberg et al. |
| 2019/0196148 A1 | 6/2019 | Yao et al. |
| 2019/0215440 A1 | 7/2019 | Rivard et al. |
| 2019/0222758 A1 | 7/2019 | Goldenberg et al. |
| 2019/0235202 A1 | 8/2019 | Smyth et al. |
| 2019/0305403 A1* | 10/2019 | Wang ............. H01Q 1/243 |
| 2019/0353874 A1 | 11/2019 | Yeh et al. |
| 2019/0363498 A1* | 11/2019 | Cox ............. B25J 19/0029 |
| 2020/0057240 A1 | 2/2020 | Yu et al. |
| 2020/0064597 A1 | 2/2020 | Shabtay et al. |
| 2020/0084358 A1 | 3/2020 | Nadamoto |
| 2020/0192069 A1 | 6/2020 | Makeev et al. |
| 2020/0221026 A1 | 7/2020 | Fridman et al. |
| 2020/0241233 A1 | 7/2020 | Shabtay et al. |
| 2020/0333691 A1 | 10/2020 | Shabtay et al. |
| 2020/0400926 A1 | 12/2020 | Bachar |
| 2021/0026117 A1 | 1/2021 | Yao |
| 2021/0048628 A1 | 2/2021 | Shabtay et al. |
| 2021/0048649 A1 | 2/2021 | Goldenberg et al. |
| 2021/0165192 A1 | 6/2021 | Goldenberg et al. |
| 2021/0263276 A1 | 8/2021 | Huang et al. |
| 2021/0364746 A1 | 11/2021 | Chen |
| 2021/0396974 A1 | 12/2021 | Kuo |

(56) References Cited

U.S. PATENT DOCUMENTS

| | | | |
|---|---|---|---|
| 2022/0004085 A1 | 1/2022 | Shabtay et al. | |
| 2022/0046151 A1 | 2/2022 | Shabtay et al. | |
| 2022/0066168 A1 | 3/2022 | Shi | |
| 2022/0113511 A1 | 4/2022 | Chen | |
| 2022/0128886 A1* | 4/2022 | Shabtay | H04N 23/55 |
| 2022/0206264 A1 | 6/2022 | Rudnick et al. | |
| 2022/0232167 A1 | 7/2022 | Shabtay et al. | |
| 2023/0080199 A1 | 3/2023 | Eromaki et al. | |

FOREIGN PATENT DOCUMENTS

| | | | |
|---|---|---|---|
| CN | 102147519 A | 8/2011 | |
| CN | 102193162 A | 9/2011 | |
| CN | 102466865 A | 5/2012 | |
| CN | 102466867 A | 5/2012 | |
| CN | 102147519 B | 1/2013 | |
| CN | 103576290 A | 2/2014 | |
| CN | 103698876 A | 4/2014 | |
| CN | 104297906 A | 1/2015 | |
| CN | 104407432 A | 3/2015 | |
| CN | 105467563 A | 4/2016 | |
| CN | 105657290 A | 6/2016 | |
| CN | 106680974 A | 5/2017 | |
| CN | 104570280 B | 6/2017 | |
| CN | 105467563 B | 2/2019 | |
| CN | 112764200 A | 5/2021 | |
| JP | S54157620 A | 12/1979 | |
| JP | S59121015 A | 7/1984 | |
| JP | 6165212 A | 4/1986 | |
| JP | S6370211 A | 3/1988 | |
| JP | H0233117 A | 2/1990 | |
| JP | 406059195 A | 3/1994 | |
| JP | H06258702 A | 9/1994 | |
| JP | H06347687 A | 12/1994 | |
| JP | H07120673 A | 5/1995 | |
| JP | H07325246 A | 12/1995 | |
| JP | H07333505 A | 12/1995 | |
| JP | H08179215 A | 7/1996 | |
| JP | H09211326 A | 8/1997 | |
| JP | H11223771 A | 8/1999 | |
| JP | 2000131610 A | 5/2000 | |
| JP | 2000292848 A | 10/2000 | |
| JP | 3210242 B2 | 9/2001 | |
| JP | 2002365549 A | 12/2002 | |
| JP | 2003329932 A | 11/2003 | |
| JP | 2004226563 A | 8/2004 | |
| JP | 2004247887 A | 9/2004 | |
| JP | 2004334185 A | 11/2004 | |
| JP | 2006195139 A | 7/2006 | |
| JP | 2007133096 A | 5/2007 | |
| JP | 2007164065 A | 6/2007 | |
| JP | 2007219199 A | 8/2007 | |
| JP | 2007306282 A | 11/2007 | |
| JP | 2008111876 A | 5/2008 | |
| JP | 2008191423 A | 8/2008 | |
| JP | 2010032936 A | 2/2010 | |
| JP | 2010164841 A | 7/2010 | |
| JP | 2011145315 A | 7/2011 | |
| JP | 2011151448 A | 8/2011 | |
| JP | 2012203234 A | 10/2012 | |
| JP | 2012230323 A | 11/2012 | |
| JP | 2013003317 A | 1/2013 | |
| JP | 2013003754 A | 1/2013 | |
| JP | 2013101213 A | 5/2013 | |
| JP | 2013105049 A | 5/2013 | |
| JP | 2013106289 A | 5/2013 | |
| JP | 2013148823 A | 8/2013 | |
| JP | 2014142542 A | 8/2014 | |
| JP | 2017116679 A | 6/2017 | |
| JP | 2018059969 A | 4/2018 | |
| JP | 2019028249 A | 2/2019 | |
| JP | 2019113878 A | 7/2019 | |
| KR | 20080088477 A | 10/2008 | |
| KR | 20090019525 A | 2/2009 | |
| KR | 20090131805 A | 12/2009 | |
| KR | 20110058094 A | 6/2011 | |
| KR | 20110115391 A | 10/2011 | |
| KR | 20120068177 A | 6/2012 | |
| KR | 20140135909 A | 5/2013 | |
| KR | 20140023552 A | 2/2014 | |
| KR | 20160000759 A | 1/2016 | |
| KR | 101632168 B1 | 6/2016 | |
| KR | 20160115359 A | 10/2016 | |
| TW | M602642 U | 10/2020 | |
| WO | 2013058111 A1 | 4/2013 | |
| WO | 2013063097 A1 | 5/2013 | |
| WO | 2018130898 A1 | 7/2018 | |
| WO | WO-2021059097 A2 * | 4/2021 | G02B 13/0015 |

OTHER PUBLICATIONS

Consumer Electronic Optics: How small a lens can be? The case of panomorph lenses, Thibault et al., Sep. 2014, 7 pages.

Optical design of camera optics for mobile phones, Steinich et al., 2012, pp. 51-58 (8 pages).

The Optics of Miniature Digital Camera Modules, Bareau et al., 2006, 11 pages.

Modeling and measuring liquid crystal tunable lenses, Peter P. Clark, 2014, 7 pages.

Mobile Platform Optical Design, Peter P. Clark, 2014, 7 pages.

Boye et al., "Ultrathin Optics for Low-Profile Innocuous Imager", Sandia Report, 2009, pp. 56-56.

"Cheat sheet: how to understand f-stops", Internet article, Digital Camera World, 2017.

Husain Sumra: "Security Camera Field Of View Tips—How To Position Your Camera I Ooma",, Aug. 2, 2019 (Aug. 2, 2019), Internet article, Ooma.

Search Report in related EP patent application 24213123.3, dated Feb. 28, 2025.

* cited by examiner

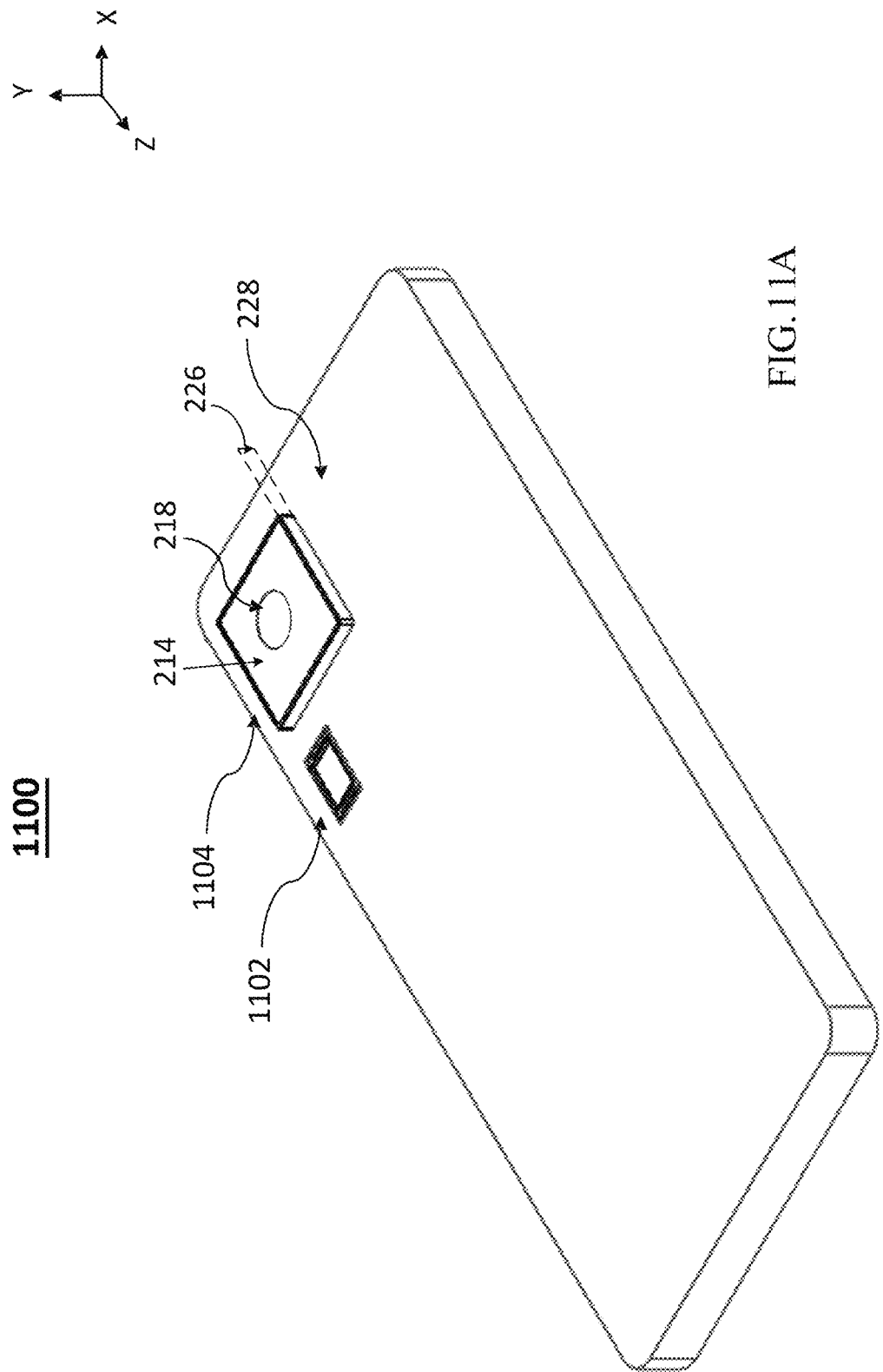

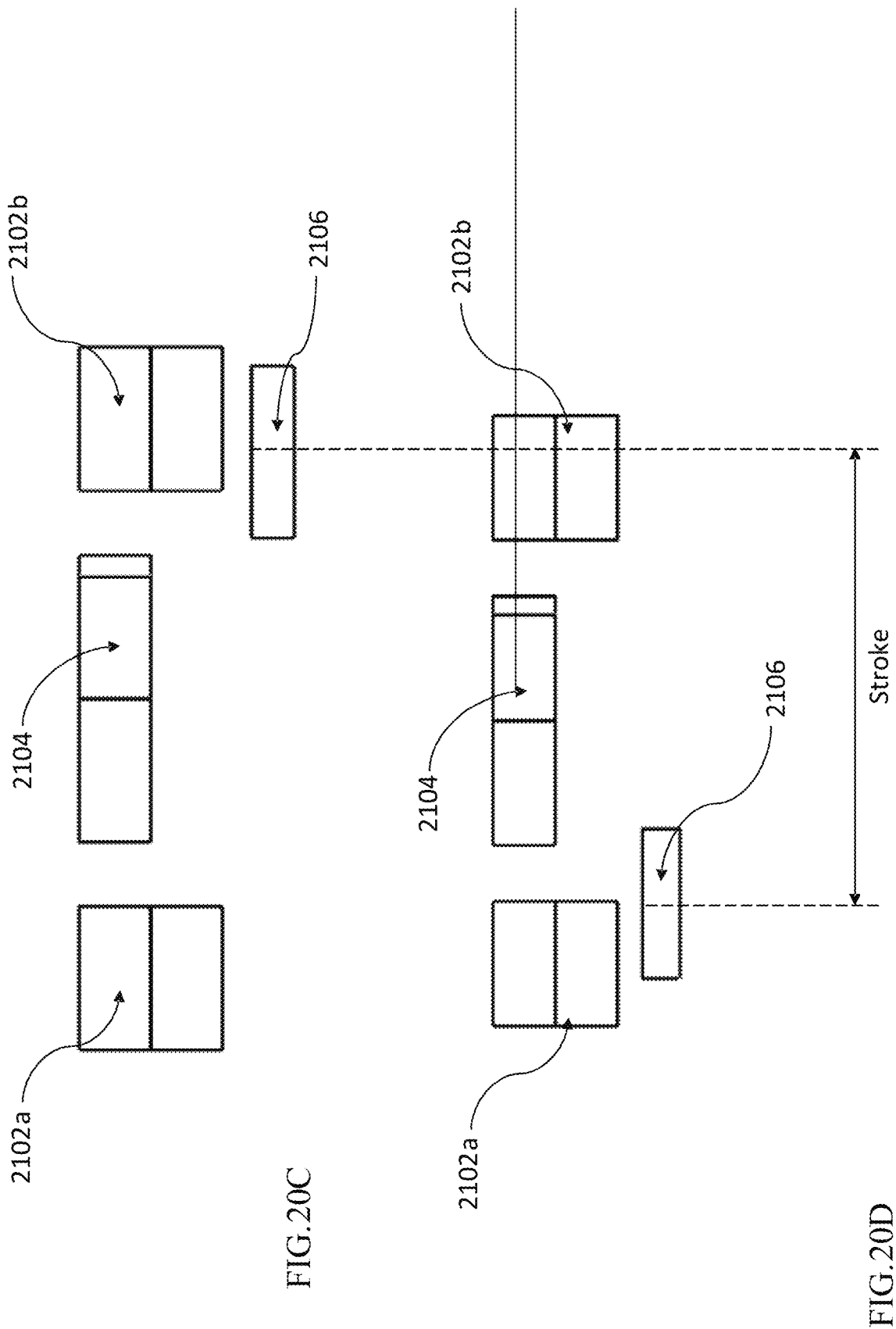

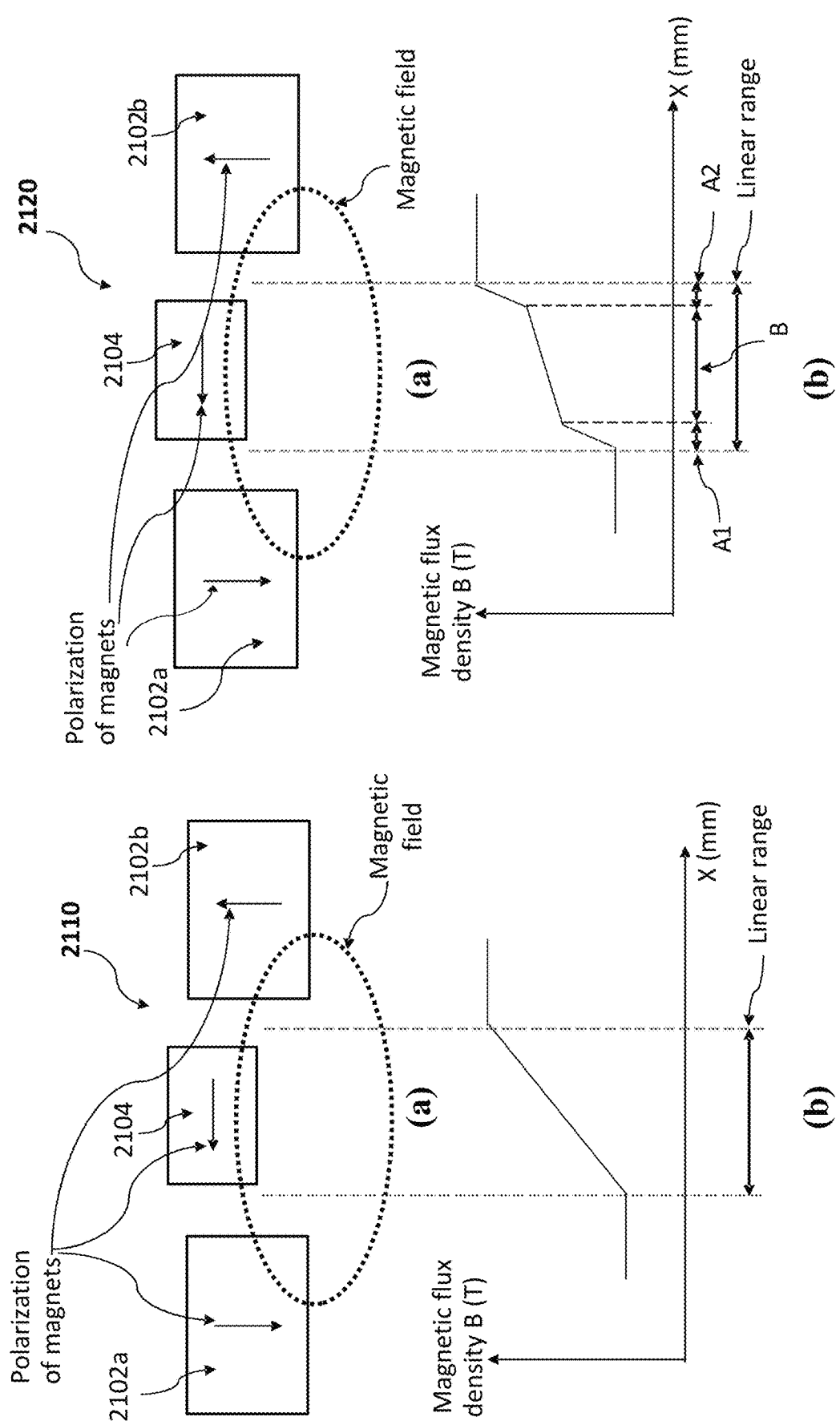

SLIM POP-OUT CAMERAS AND LENSES FOR SUCH CAMERAS

CROSS REFERENCE TO RELATED APPLICATIONS

This is a continuation of U.S. patent application Ser. No. 18/768,244 filed Jul. 10, 2024 (now allowed), which was a continuation of U.S. patent application Ser. No. 17/567,417 filed Jan. 3, 2022 (now U.S. Pat. No. 12,066,747), which was a continuation of U.S. patent application Ser. No. 17/460,231 filed Aug. 29, 2021 (now U.S. Pat. No. 12,072,609), which was a continuation in part (CIP) of U.S. patent application Ser. No. 17/291,475 filed May 5, 2021, which was a 371 from international application PCT/IB2020/058697 filed Sep. 18, 2020, and is related to and claims priority from U.S. Provisional Patent Applications No. 62/904,913 filed Sep. 24, 2019, 63/026,317 filed May 18, 2020 and 63/037,836 filed Jun. 11, 2020, all of which are incorporated herein by reference in their entirety.

FIELD

The present disclosure relates in general to digital cameras, and more particularly, to digital cameras with pop-out mechanisms and lenses.

BACKGROUND

Compact multi-aperture digital cameras (also referred to as "multi-lens cameras" or "multi-cameras") and in particular dual-aperture (or "dual-camera") and triple-aperture (or "triple-camera") digital cameras are known. Miniaturization technologies allow incorporation of such cameras in compact portable electronic devices such as tablets and mobile phones (the latter referred to hereinafter generically as "smartphones"), where they provide advanced imaging capabilities such as zoom, see e.g. co-owned PCT patent application No. PCT/IB2063/060356, which is incorporated herein by reference in its entirety. A typical triple-camera system (exemplarily including an ultra-wide-angle (or "Ultra-Wide" or "UW") camera, wide-angle (or "Wide") camera and a telephoto (or "Tele") camera.

A challenge with dual-aperture zoom cameras relates to camera height and size of image sensor ("Sensor Diagonal" or $S_D$). There is a large difference in the height (and also of the total track length or "TTL") of the Tele and Wide cameras. FIG. 1A illustrates schematically the definition of various entities such as TTL, effective focal length (EFL) and back focal length (BFL). The TTL is defined as the maximal distance between the object-side surface of a first lens element and a camera image sensor plane. The BFL is defined as the minimal distance between the image-side surface of a last lens element and a camera image sensor plane. In the following, "W" and "T" subscripts refer respectively to Wide and Tele cameras. The EFL has a meaning well known in the art. In most miniature lenses, the TTL is larger than the EFL, as in FIG. 1A.

FIG. 1B shows an exemplary camera system having a lens with a field of view (FOV), an EFL and an image sensor with a sensor width S. For fixed width/height ratios of a (normally rectangular) image sensor, the sensor diagonal is proportional to the sensor width and height. The horizontal FOV relates to EFL and sensor width as follows:

$$\tan\left(\frac{FOV}{2}\right) = \frac{S}{2}/EFL$$

This shows that for realizing a camera with a larger image sensor width (i.e. larger sensor diagonal) but same FOV, a larger EFL is required.

In mobile devices, typical Wide cameras have 35 mm equivalent focal lengths ("35 eqFL"). ranging from 22 mm to 28 mm. Image sensors embedded in mobile cameras are smaller than full frame sensors and actual focal lengths in Wide cameras range from 3.2 mm to 7 mm, depending on the sensor size and FOV. In most lenses designed for such cameras, the TTL/EFL ratio is larger than 1.0 and is typically between 1.0 and 1.3. Another characteristic of these lenses is that their TTL-to-sensor diagonal ratio TTL/SD is typically in the range of 0.6 to 0.7. Embedding larger sensors in Wide cameras is desirable, but require larger EFL for maintaining the same FOV, resulting in larger TTL, which is undesirable.

Many mobile devices include now both Tele and Wide cameras. The Tele camera enables optical zoom and other computational photography features such as digital Bokeh. Depending on the Wide camera characteristics and permissible module height, the 35 eqFL of mobile device Tele cameras ranges from 45 mm to 100 mm. The TTL of lenses designed for Tele cameras is smaller than the EFL of such lenses, typically satisfying 0.7<TTL/EFL<1.0. Typical Tele EFL values range from 6 mm to 10 mm (without applying 35 mm equivalence conversion) in vertical (non-folded) Tele cameras and from 10 mm to 30 mm in folded Tele cameras. Larger EFL is desirable for enhancing the optical zoom effect but it results in larger TTL, which is undesirable.

In a continuous attempt to improve the obtained image quality, there is a need to incorporate larger image sensors into the Wide and Tele cameras. Larger sensors allow for improved low-light performance and larger number of pixels, hence improving the spatial resolution as well. Other image quality characteristics, such as noise characteristics, dynamic range and color fidelity may also improve as the sensor size increases.

As the Wide camera sensor becomes larger, the required EFL is larger (for the same 35 mm equivalent focal length), the lens TTL increases and the camera module height becomes larger, resulting in a limit on the permissible sensor size when considering the allowed mobile device thickness or other industrial design constraints. In Wide cameras of most mobile devices, the sensor pixel array size full diagonal ranges from about 4.5 mm (typically referred to as ¼" sensor) to 16 mm (typically referred to 1" sensor).

It would be beneficial to have Wide and/or Tele lens designs that support large EFLs for large sensor diagonals (optical zoom) while still having small TTL for slim design. The latter is presented for example in co-owned U.S. provisional patent application No. 62/904,913.

SUMMARY

In various examples, there are provided digital cameras comprising: an optics module comprising a lens assembly that includes N lens elements $L_1$-$L_N$ starting with $L_1$ on an object side, wherein N≥4; an image sensor having a sensor diagonal $S_D$ in the range of 5-20 mm; and a pop-out mechanism configured to control at least one air-gap between lens elements or between a lens element and the image sensor to bring the camera to an operative pop-out state and to a collapsed state, wherein the lens assembly has a total track length TTL in the operative pop-out state and a collapsed total track length cTTL in the collapsed state, and wherein cTTL/$S_D$<0.6.

For simplicity, in the description below, "lens" may be used instead of "lens assembly".

Henceforth and for simplicity, the use of the term "pop-out" before various components may be skipped, with the understanding that if defined the first time as being a "pop-out" component, that component is such throughout this description.

In various examples of cameras above and below, the window pop-up mechanism includes a window frame engageable with the optics module, wherein the window frame does not touch the optics module in the pop-out state and wherein the window frame is operable to press on the optics module to bring the camera to the collapsed state. The window frame includes a window that is not in direct contact with the lens.

In some examples, the largest air-gap d is between $L_{N-1}$ and $L_N$.

In some examples, the largest air-gap d is between $L_{N-2}$ and $L_{N-1}$ or between $L_{N-1}$ and $L_N$, and the lens assembly has a 35 mm equivalent focal length 35 eqFL between 40 mm and 150 mm. In such an example, d may be larger than TTL/5.

In some examples, $cTTL/S_D<0.55$.

In some examples, $S_D$ is in the range of 10 mm to 15 mm.

In some examples, a camera as above or below is included in a multi-camera together with a second camera having a second total track length $TTL_2$ in the range of 0.9×TTL to 1.1×TTL.

In some examples, the lens assembly has a 35 mm equivalent focal length 35 eqFL larger than 24 mm.

In some examples, the lens assembly has an effective focal length EFL and ratio TTL/EFL is smaller than 1.4 and larger than 1.0.

In various examples, there are provided digital cameras comprising: an optics module comprising a lens assembly that includes N lens elements $L_1$-$L_N$ starting with $L_1$ on an object side, wherein N≥4 and wherein the lens assembly has a back focal length BFL that is larger than any air-gap between lens elements and has an effective focal length EFL in the range of 7 mm to 18 mm; a pop-out mechanism configured to actuate the lens assembly to an operative pop-out state and to a collapsed state, wherein the lens assembly has a total track length TTL in the operative pop-out state and a collapsed total track length cTTL in the collapsed state, and wherein the pop-out mechanism is configured to control the BFL such that cTTL/EFL<0.55; and an image sensor having sensor diagonal $S_D$.

In some examples, a pop-out mechanism includes a window pop-out mechanism based on a pin-groove assembly, and one or more of the pins slide in vertically oriented grooves and one or more pins slide in angled grooves that have an angle of 20-80 degrees, 30-70 degrees or 40-60 degrees with respect to the vertical.

In some examples, a pop-out mechanism includes a barrel pop-out mechanism that comprises springs and a guiding and positioning mechanism that enables sufficient z-decenter and xy-decenter accuracy between lens elements in the operative pop-out state and enables repeatability in switching between operative and collapsed states, wherein the sufficient decenter accuracy is less than 0.1 mm decenter and wherein the repeatability is less than 0.05 mm decenter. In other examples, the sufficient decenter accuracy is less than 0.8 mm decenter and the repeatability is less than 0.04 mm decenter. In yet other examples, the sufficient decenter accuracy is less than 0.6 mm decenter and the repeatability is less than 0.03 mm decenter. The guiding and positioning mechanism may be based on a pin and groove assembly, on a stopper or on a kinematic coupling mechanism. In some examples, a guiding mechanism may be based on a pin-groove assembly and a positioning mechanism based on a magnetic force.

In some examples, $S_D$ is in the range of 4.5 mm to 10 mm and the lens assembly has a 35 eqFL larger than 45 mm and smaller than 180 mm.

In some examples, $S_D$ is in the range of 10 mm to 20 mm and the lens assembly has a 35 eqFL larger than 40 mm and smaller than 180 mm.

In some examples, ratio TTL/EFL is smaller than 1.0 and larger than 0.7.

In some examples, BFL is larger than TTL/3 and smaller than TTL/1.5.

In some examples of cameras as above or below, the lens has a lens element with a largest lens diameter $d_L$, wherein a penalty between a largest diameter $d_{module}$ of the optics module and the largest lens diameter $d_L$ is smaller than 4 mm, than 2 mm or even than 1 mm.

In various examples, there are provided multi-cameras comprising: a first camera that includes a first lens assembly with a first field of view $FOV_1$ and N lens elements $L_1$-$L_N$ starting with $L_1$ on an object side wherein N≥4, a first image sensor having a sensor diagonal $S_{D1}$, and a pop-out mechanism that controls a largest air-gap d between two consecutive lens elements to bring the first camera to an operative pop-out state and a collapsed state, wherein the first lens assembly has a first 35 mm equivalent focal length 35 eqFL$_1$, a total track length $TTL_1$ in the operative state and a collapsed total track length $cTTL_1$ in the collapsed state, wherein $S_{D1}$ is in the range 7-20 mm and wherein $cTTL_1/S_{D1}<0.6$; and a second camera having a second camera effective focal length $EFL_2$ of 7-18 mm and including a second lens assembly with a second field of view $FOV_2$ smaller than $FOV_1$, the second lens assembly comprising M lens elements $L_1$-$L_M$ starting with $L_1$ on an object side wherein M≥4, and a pop-out mechanism configured to actuate the second camera to an operative state and a collapsed state, wherein the second lens assembly has a second 35 mm equivalent focal length 35 eqFL$_2$, a total track length $TTL_2$ in the operative state and a collapsed total track length $cTTL_2$ in the collapsed state, and wherein cTTL/EFL<0.55.

In some examples, $cTTL_1=cTTL_2\pm10\%$.

In some examples, 35 eqFL$_2$≥1.5×35 eqFL$_1$.

In some examples, 35 eqFL$_1$ is larger than 24 mm.

In some examples, 35 eqFL$_2$ is larger than 45 mm.

In various examples, there are provided multi-cameras comprising: a Wide camera comprising a lens barrel carrying a Wide lens assembly comprising N≥4 lens elements $L_1$-$L_N$ starting with $L_1$ on an object side, an image sensor having a Wide sensor diagonal $S_{DW}$, and a first pop-out mechanism that controls an air-gap $d_{N-1}$ between lens elements $L_N$ and $L_{N-1}$ to bring the camera to an operative state and a collapsed state, wherein the Wide lens assembly has a field of view $FOV_W$, a total track length $TTL_W$ in the operative state and a collapsed total track length $cTTL_W$ in the collapsed state, wherein if $S_{DW}$ is in the range 10-16 mm then $cTTL_W/S_{DW}<0.6$; and a Tele camera comprising a lens barrel carrying a Tele lens assembly comprising N is ≥4 lens elements $L_1$-$L_N$ starting with $L_1$ on an object side, a Tele image sensor having a sensor diagonal $S_{DT}$ and a second pop-out mechanism that controls an air-gap between lens element $L_N$ and the Tele image sensor to bring the camera to an operative state and a collapsed state, wherein the Tele lens assembly has a field of view $FOV_T$ smaller than $FOV_W$, a $TTL_T$ in the operative state and a $cTTL_T$ in the collapsed state, wherein if $S_{DT}$ is in the range 4.5-10 mm then $cTTL_T<EFL_T<0.55$, and wherein $cTTL_W=cTTL_T\pm10\%$.

In some examples, the multi-camera is embedded in a device having a device exterior surface, and in an operative state the camera extends beyond the device exterior surface by 2 mm-7 mm and in a non-operative state the cameras extends beyond the device exterior surface by less than 2 mm.

In some examples, 7 mm$<TTL_W<$13 mm, $1.0<TTL_W/EFL_W<1.3$ and $d_{N-1}$ is greater than TTL/4.

In some examples, there is provided a camera comprising: a lens assembly comprising N lens elements $L_1$-$L_N$ starting with $L_1$ on an object side wherein N≥4; a curved image sensor having a sensor diagonal $S_D$ in the range of 7-20 mm; and a pop-out mechanism that controls an air-gap d between $L_N$ and the image sensor to bring the camera to an operative pop-out state and a collapsed state, wherein the lens assembly has a total track length TTL in the operative pop-out state and a collapsed total track length cTTL in the collapsed state, wherein $cTTL/S_D<0.6$ and wherein the lens assembly has a 35 mm equivalent focal length 35 eqFL that is smaller than 18 mm.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. If identical elements are shown but numbered in only one figure, it is assumed that they have the same number in all figures in which they appear. The drawings and descriptions are meant to illuminate and clarify embodiments disclosed herein and should not be considered limiting in any way. In the drawings:

FIG. 11A shows an example of a smartphone with a dual-camera that includes a regular folded Tele camera and an upright pop-out Wide camera;

FIG. 20C shows a side view of 3 magnets and a Hall sensor of the window position measurement mechanism of FIG. 20A in a collapsed state;

FIG. 20D shows a side view of the 3 magnets and the Hall sensor of the window position measurement mechanism of FIG. 20A in a pop-out state;

FIG. 20F shows an example of a magnet configuration that may be included in the position measurement mechanism;

FIG. 20G shows another example of another magnet configuration that may be included in a position measurement mechanism.

DETAILED DESCRIPTION

Figure 1A:
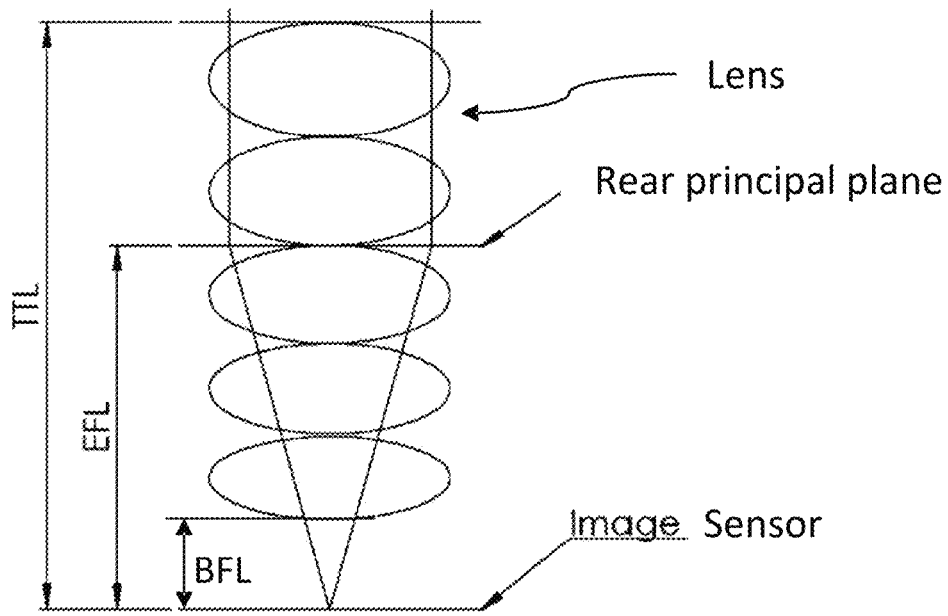
FIG. 1A illustrates schematically the definition of various entities such as TTL and EFL.
Figure 1B:
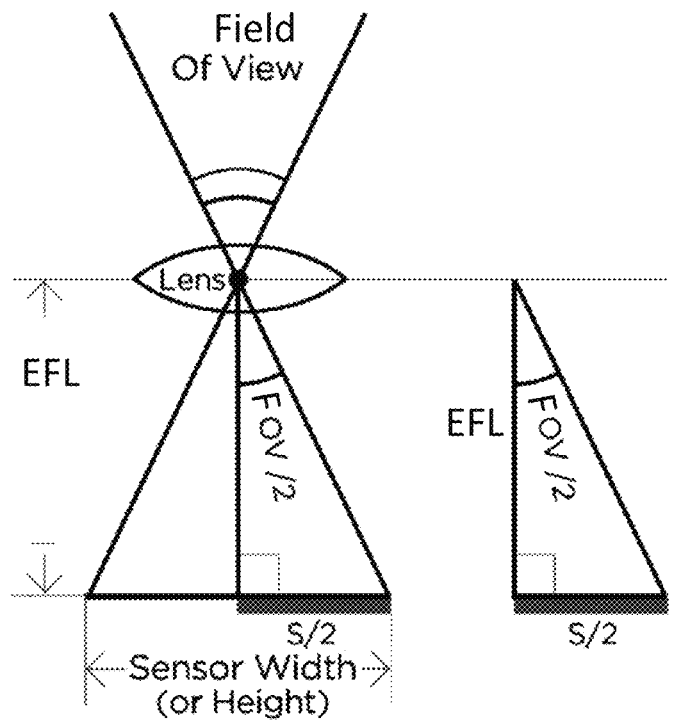
FIG. 1B shows definitions of FOV, EFL and S for a thin lens approximation or equivalence.
Figure 2A:
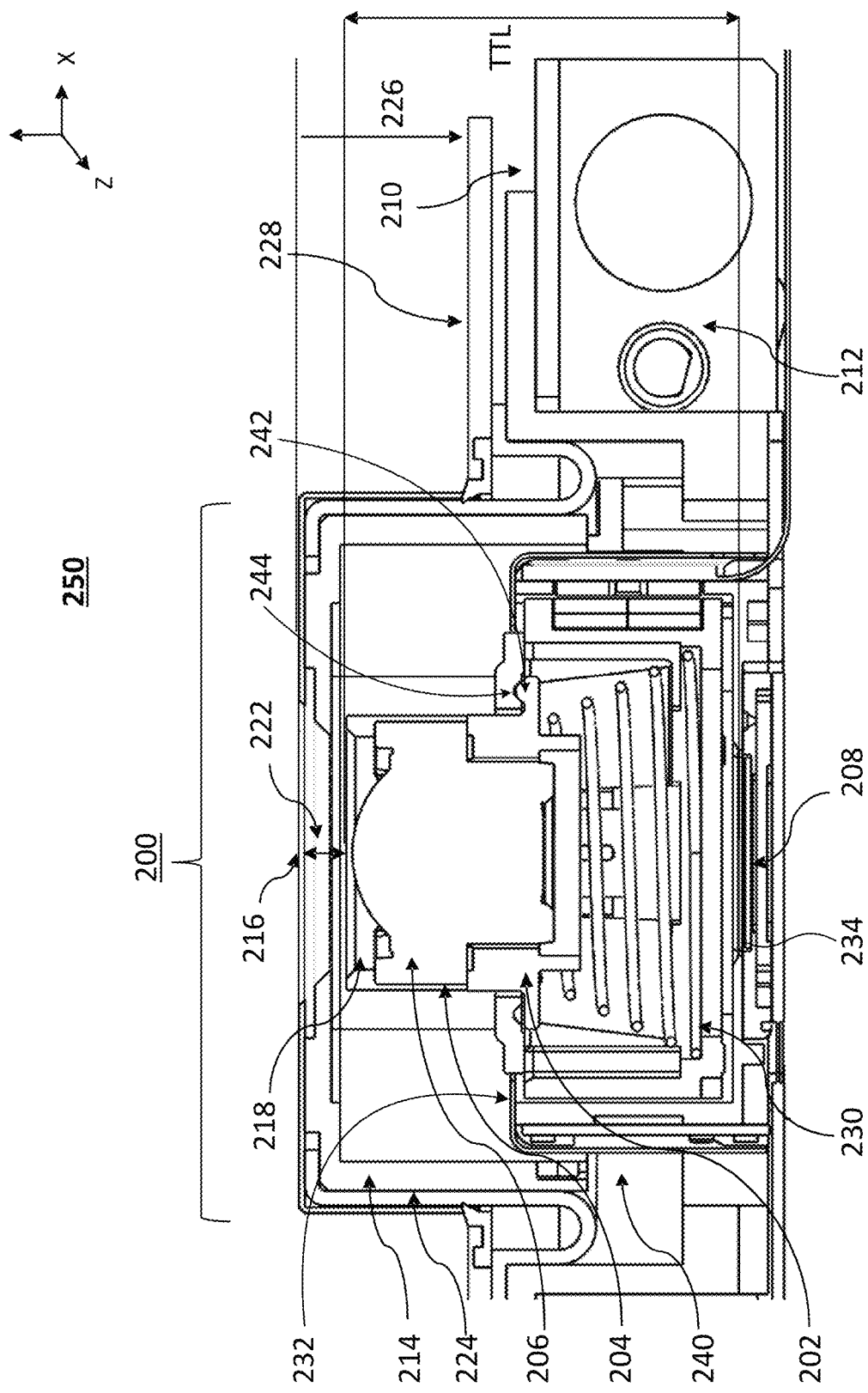
FIG. 2A shows a cross sectional view of a pop-out camera disclosed herein in an in a pop-out state and incorporated in a host device.
Figure 2C:
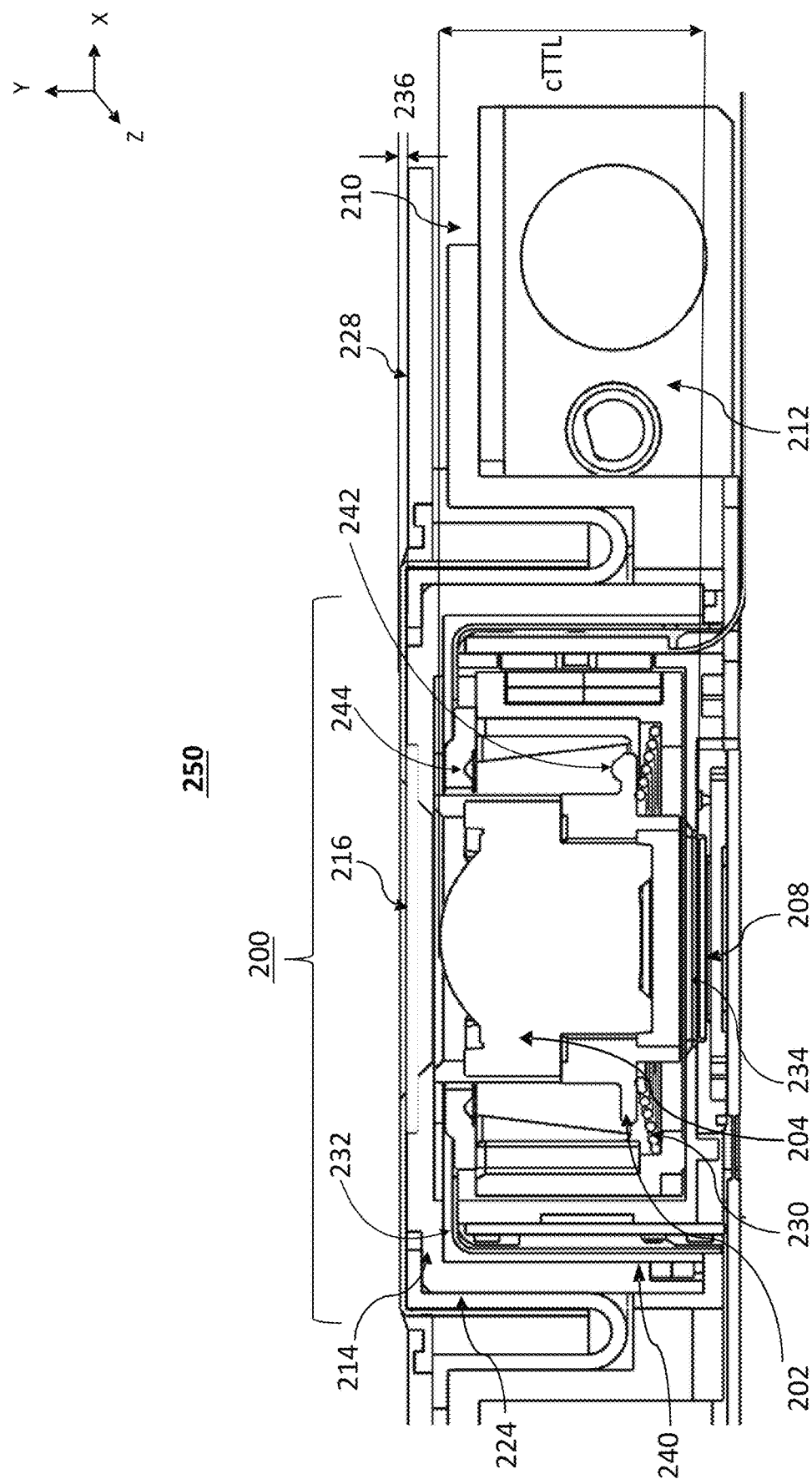
FIG. 2C shows a cross sectional view of the camera of FIG. 2A in a collapsed state.
Figure 3A:
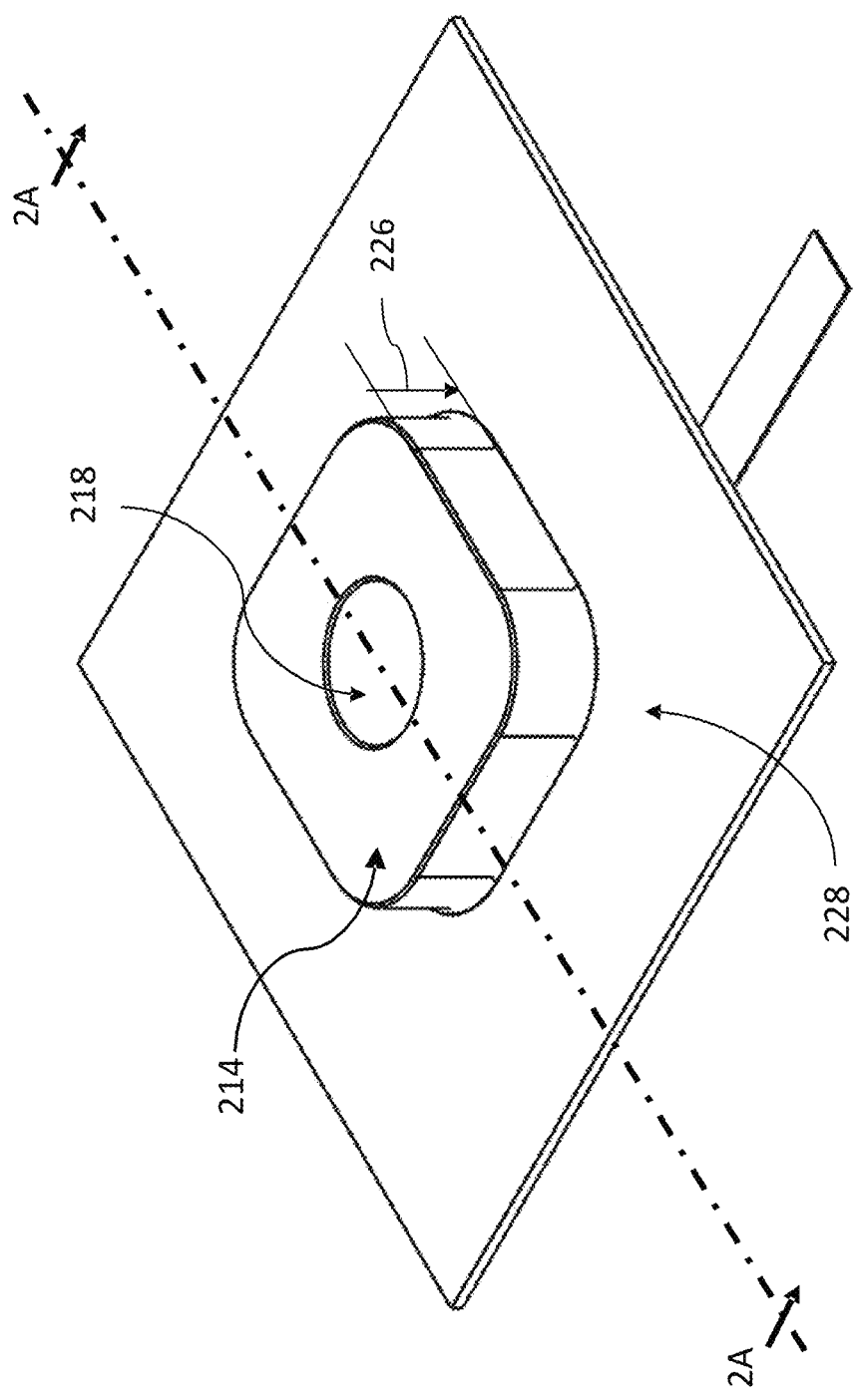
FIG. 3A shows a perspective view of the camera of FIG. 2A in the pop-out state.
Figure 3B:
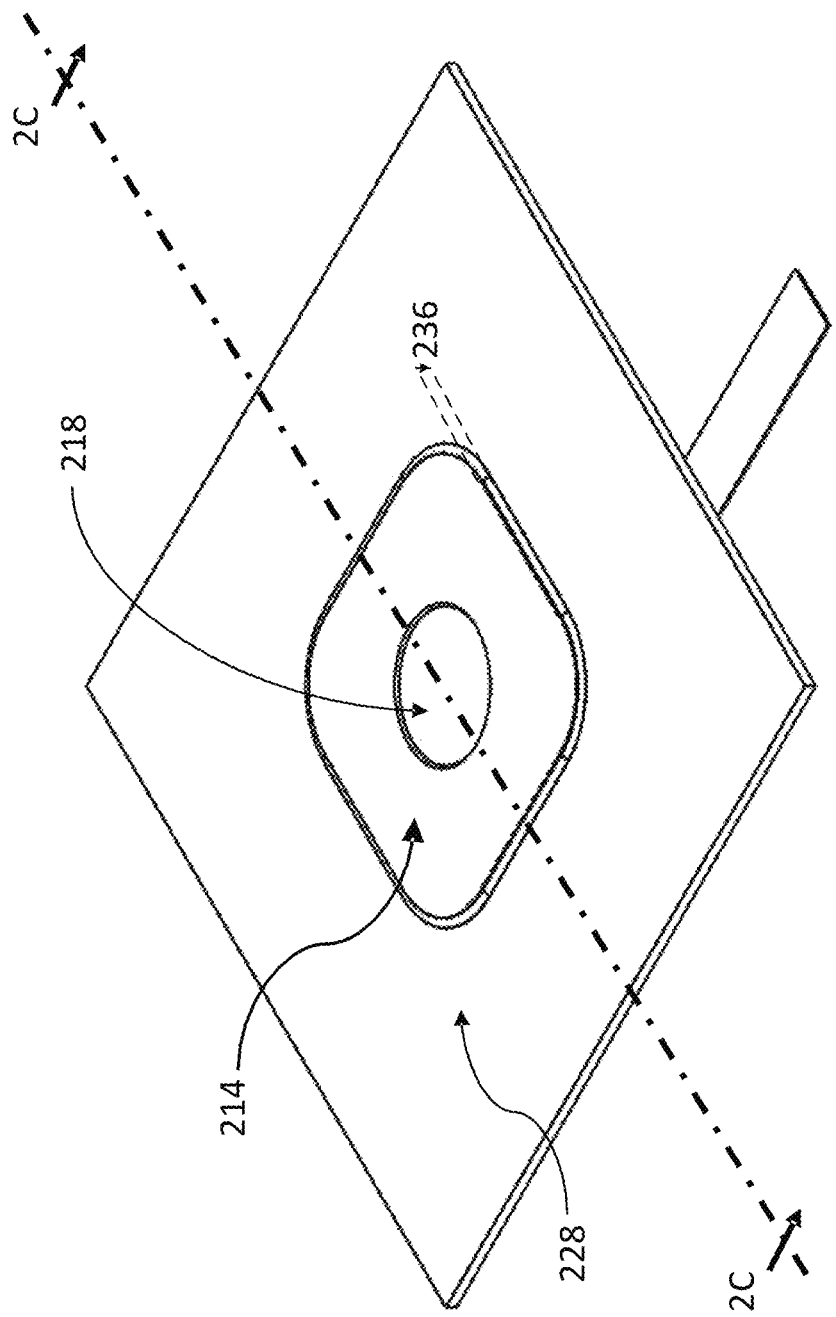
FIG. 3B shows a perspective view of the camera of FIG. 2A in the collapsed state.

FIG. 2A shows in cross sectional view (through cross section marked 2A-2A in FIG. 3A) an example numbered 200 of a pop-out camera disclosed herein incorporated in a "host" device 250 (e.g. a smartphone, tablet, etc.). In FIG. 2A, camera 200 is shown in an operative or "pop-out" state (and thus referred to as a "camera in pop-out state"). Camera 200 has also a collapsed ("c" or "non-operative") state, shown in FIG. 2C. In this state, the camera is not operative as a camera in pop-out state. FIG. 3A shows camera 200 in the pop-out state and FIG. 3B shows camera 200 in the collapsed state, both in perspective views.

Camera 200 comprises a general pop-out mechanism 210 and a pop-out optics module 240. Optics module 240 comprises a lens barrel holder 202 carrying a pop-out lens barrel 204 with a pop-out lens assembly 206, and in some cases ("examples") an image sensor 208. In some examples, the image sensor may be separate from the optics module. Lens barrel 204 and window 216 are separated by an air-gap 222 of, for example, 0.15-3 mm. Air-gap 222 allows for a movement of the lens barrel by 0.1-3 mm for performing auto-focus (AF) and optical image stabilization (OIS) by moving the lens as known in the art. Optics module 240 is covered by a cover 232. In some examples, the pop-out lens barrel (e.g. a lens barrel 602) may be divided into two or more sections, e.g. in a fixed lens barrel section and a collapsible barrel section.

General pop-out mechanism 210 comprises a "window" pop-out mechanism (external to the optics module) and a "barrel" pop-out mechanism with some parts external to and some parts internal to the optics module. The window pop-out mechanism raises and lowers the window. The barrel pop-out mechanism enables the pop-out and collapsed lens barrel states.

The window pop-out mechanism includes parts shown in detail for example in FIG. 9A-B, FIG. 14B, FIG. 14D, FIGS. 15A-B, FIGS. 20A-F. Specifically, the window pop-out mechanism comprises an actuator like 212 or 212', a pop-out frame 220 (see e.g. FIG. 2B) that includes a window frame 214 carrying a window 216 that covers an aperture 218 of the camera, and an external module seal 224. External module seal 224 prevents particles and fluids from entering the camera and host device 250. In some embodiments (e.g. in a frame 220' described with reference to FIGS. 14A-D), a pop-out frame may include additional parts such as a cam follower (e.g. 1402 in FIG. 14A), a side limiter (e.g. 1406 in FIG. 14A) and a window position measurement mechanism (e.g. 1420 in FIG. 14B).

The barrel pop-out mechanism includes parts shown in detail for example in FIGS. 4A, 5A, 6A-B, 14A, 14C, 16A, 17A-B, 18A-F and 19A-F. Specifically, the barrel pop-out mechanism may include one or more springs 230, pop-out lens barrel 204 with pop-out lens assembly 206, one or more springs 230 and a guiding and positioning mechanism (see e.g. FIGS. 19A-19B and description below). The one or more springs push optics module 240 towards frame 220, i.e. when frame 220 moves upwards for switching from a collapsed state to a pop-out state, no further actuation mechanism within the optics module is required.

The guiding and positioning mechanism positions the lens groups and optical components in fixed distance and orientation. In an example, the guiding and positioning mechanism comprises a pin 242 and a groove 244 (see FIG. 2C, FIG. 4A and FIG. 5A). In some examples, the guiding and positioning mechanism may include a stopper 618 (see FIG. 6A-B), a kinematic coupling mechanism (see FIG. 18A-D) or a magnet-yoke assembly (see FIGS. 19A-F). In some examples, the guiding and positioning mechanism works by means of an interplay between an optics module and another component of a camera such as camera 200 (see e.g. FIGS. 6A-B and FIGS. 19A-F). Pin 242 and groove 244 provide a first example of a pin-groove assembly. Groove 244 may comprise a v-shaped groove or another groove, with groove 244 having legs at an angle of e.g. 30-150 degrees. Other pin-groove assemblies are described below. In some examples, the guiding and positioning mechanism is included in an optics module in its entirety (see e.g. FIG. 4A and FIG. 5A and FIG. 18A-D).

The pin-groove assembly with pin 242 and groove 244 provides mechanical stability and repeatability in the X-Z plane and in the Y plane of the coordinate system shown. Stopper 618 provides mechanical stability and repeatability in Y plane. In some examples, other pins such as pins 1206 (see FIG. 12B and FIG. 12D) may be used for providing mechanical stability and repeatability in the X-Z plane.

Figure 4A:
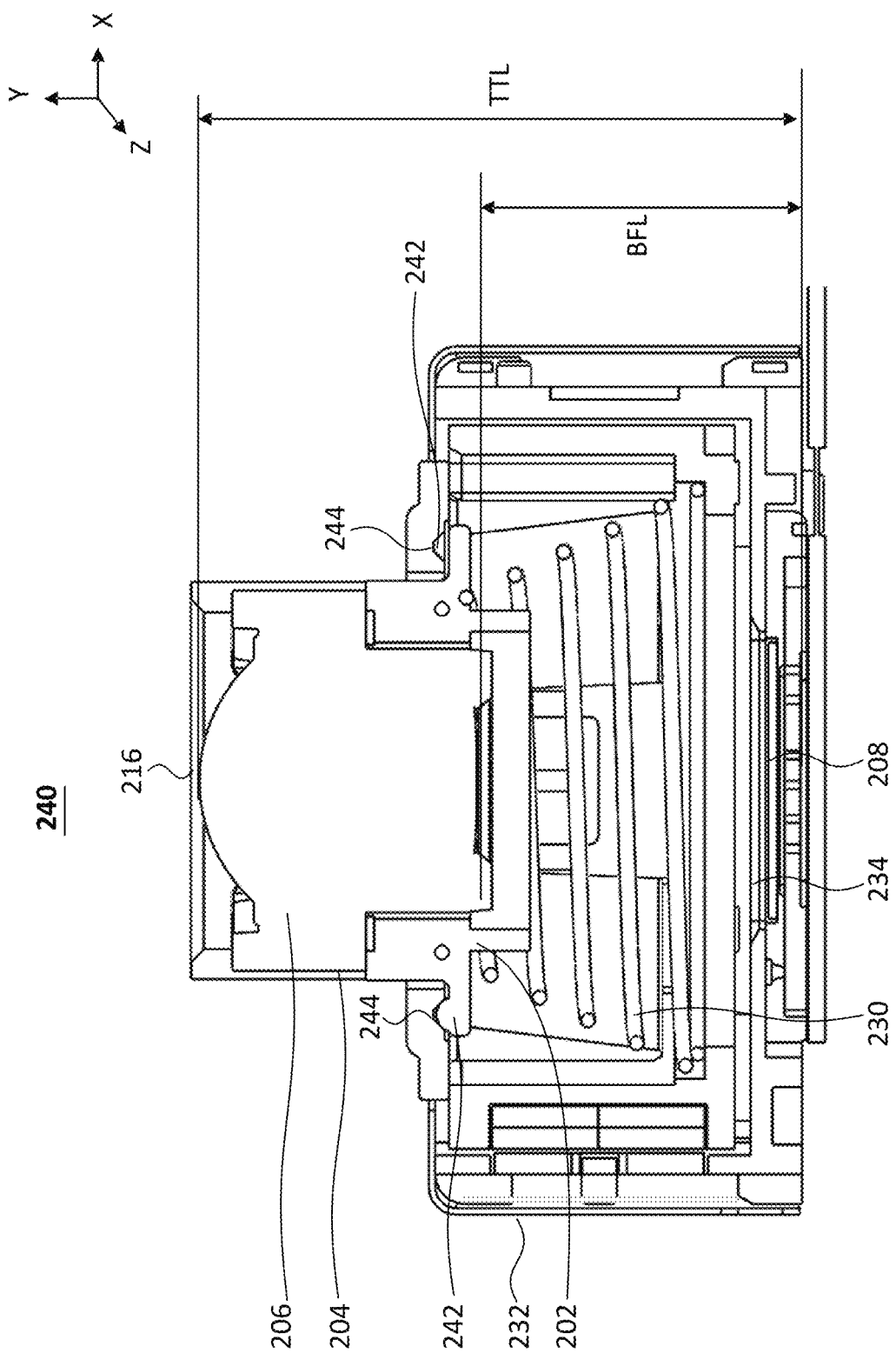
FIG. 4A shows in cross section a lens module in the camera of FIG. 2A.
Figure 4B:
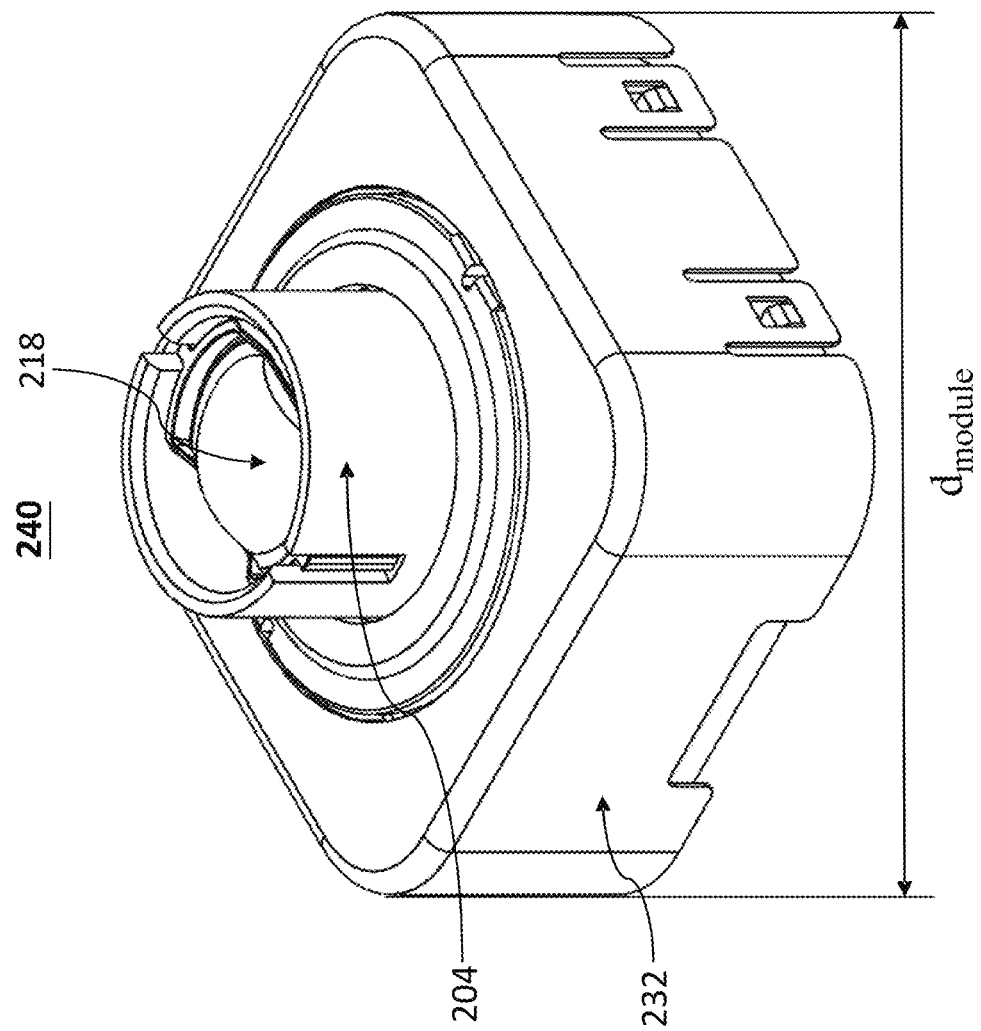
FIG. 4B shows the same as FIG. 4A in a perspective view.
Figure 4C:
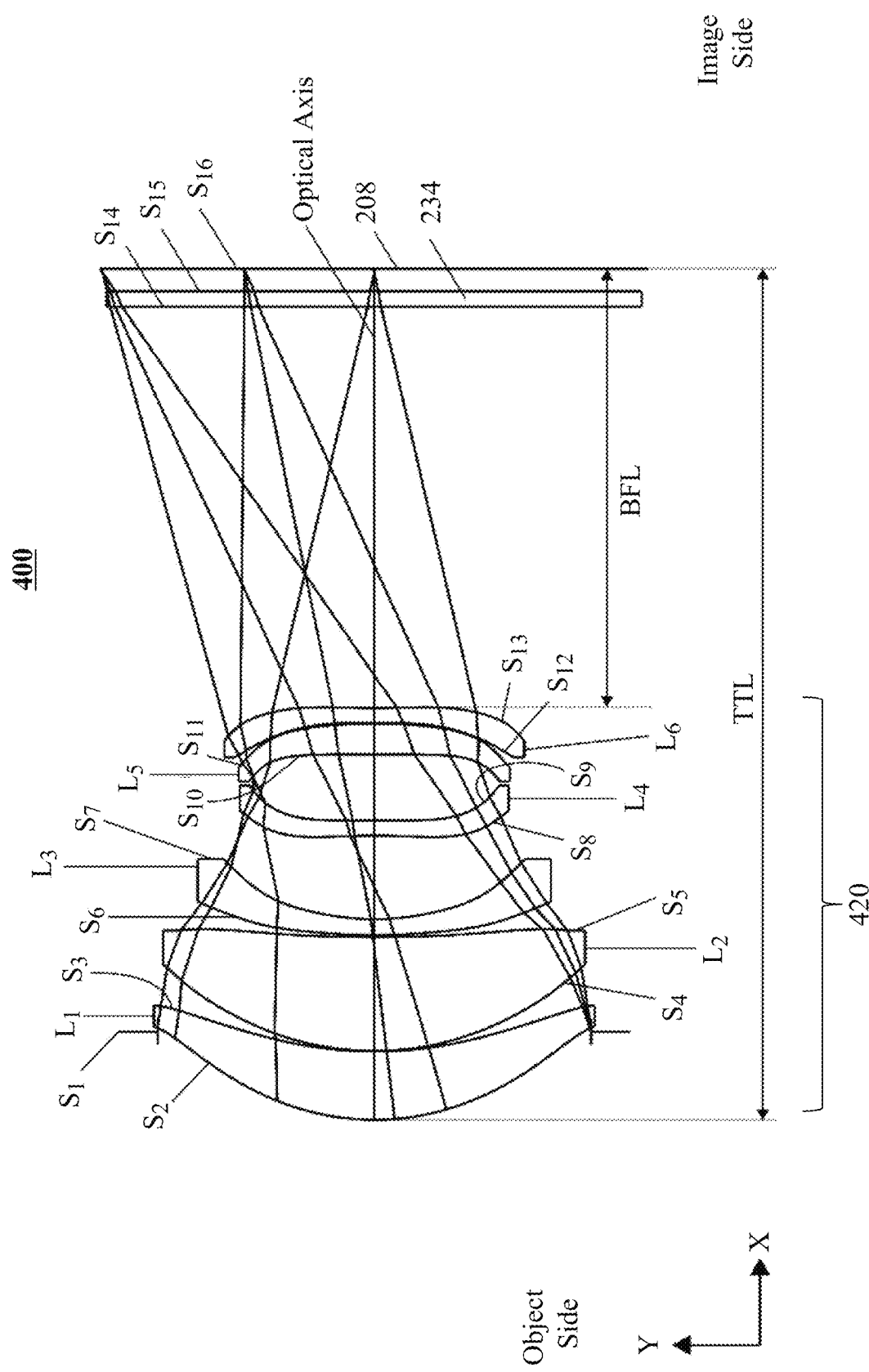
FIG. 4C shows an example of an optical lens system that may be used in a pop-out camera disclosed herein.

The lens, the image sensor and (optionally) an optical window or "filter" (e.g. IR filter) 234 form a pop-out optical lens system 260 (see e.g. FIG. 4C). The image sensor may have a sensor diagonal $S_D$ in the range 3.5-30 mm. For a lens having an EFL of 5 mm to 25 mm, this typically represents a 35 eqFL in the range 10-300 mm. Sensor diagonal $S_D$ connects to a sensor width W and a height H via $S_D = \sqrt{(W^2+H^2)}$. In other examples EFL may be 8 mm to 28 mm.

To switch between pop-out and collapsed states, pop-out mechanism 210 causes the following movements in frame 220 (where all movements are defined relative to the host device and the coordinate systems shown): a horizontal (i.e.

in the X-Z plane) movement of the cam follower and a vertical (i.e. in the Y direction) movement of the window frame. The movement in frame 220 causes a vertical (Y direction) movement of the lens barrel (for a single group or "1G" lens) or of a collapsible section of the lens barrel (in a two group or "2G" lens) in optics module 240. The image sensor and the side limiter do not move. Importantly, the barrel pop-out mechanism does not include an actuator.

Figure 2B:
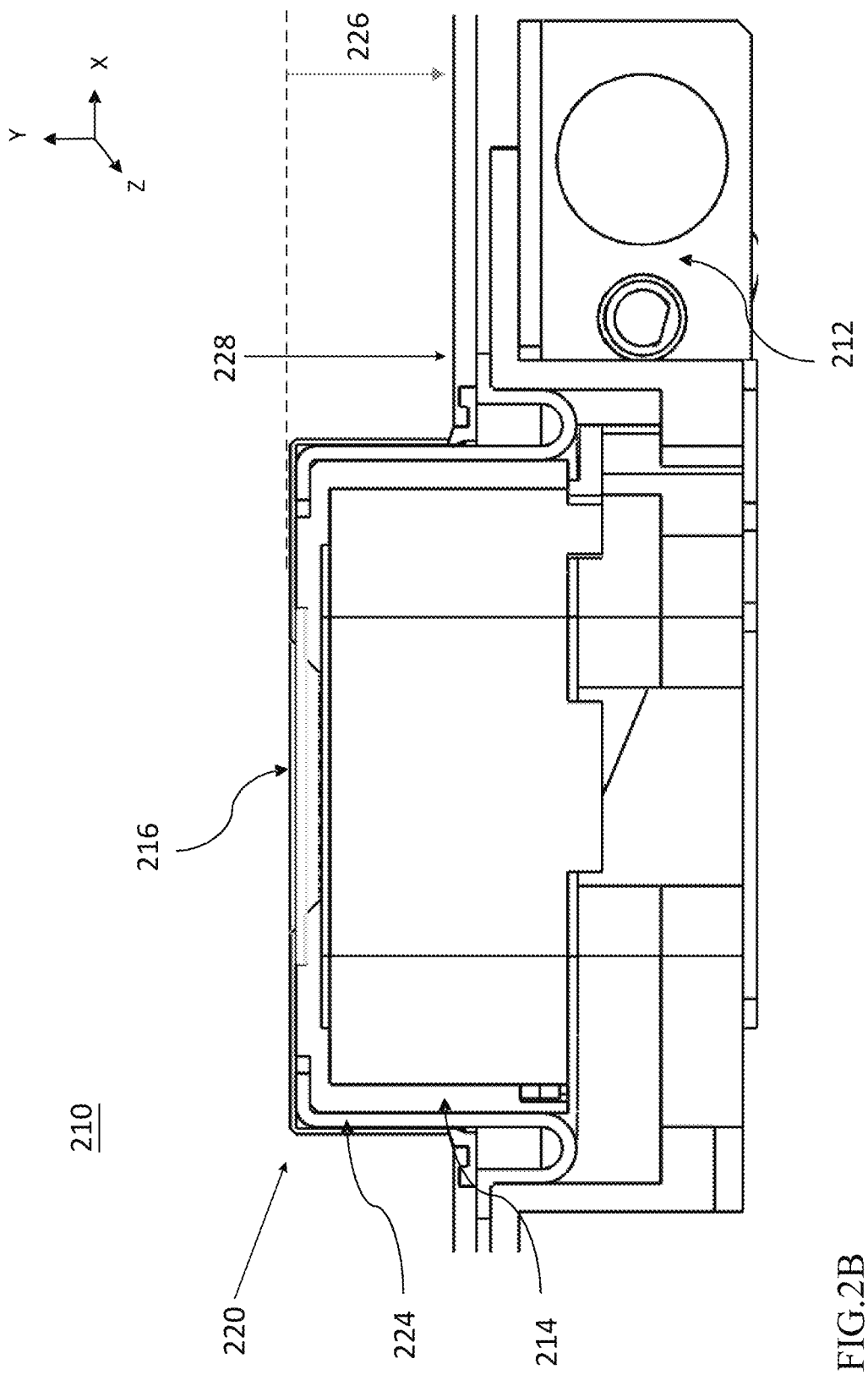
FIG. 2B shows a cross sectional view of a pop-out frame of the camera of FIG. 2A.

In the pop-out state shown in FIG. 2B, camera 200 forms a significant pop-out bump 226 with respect to an exterior surface 228 of host device 250. Here, "significant" may be for example 1.5 mm-8 mm. In the pop-out state, camera 200 increases the height of host device 250 to a "height in a pop-out state".

Figure 6A:
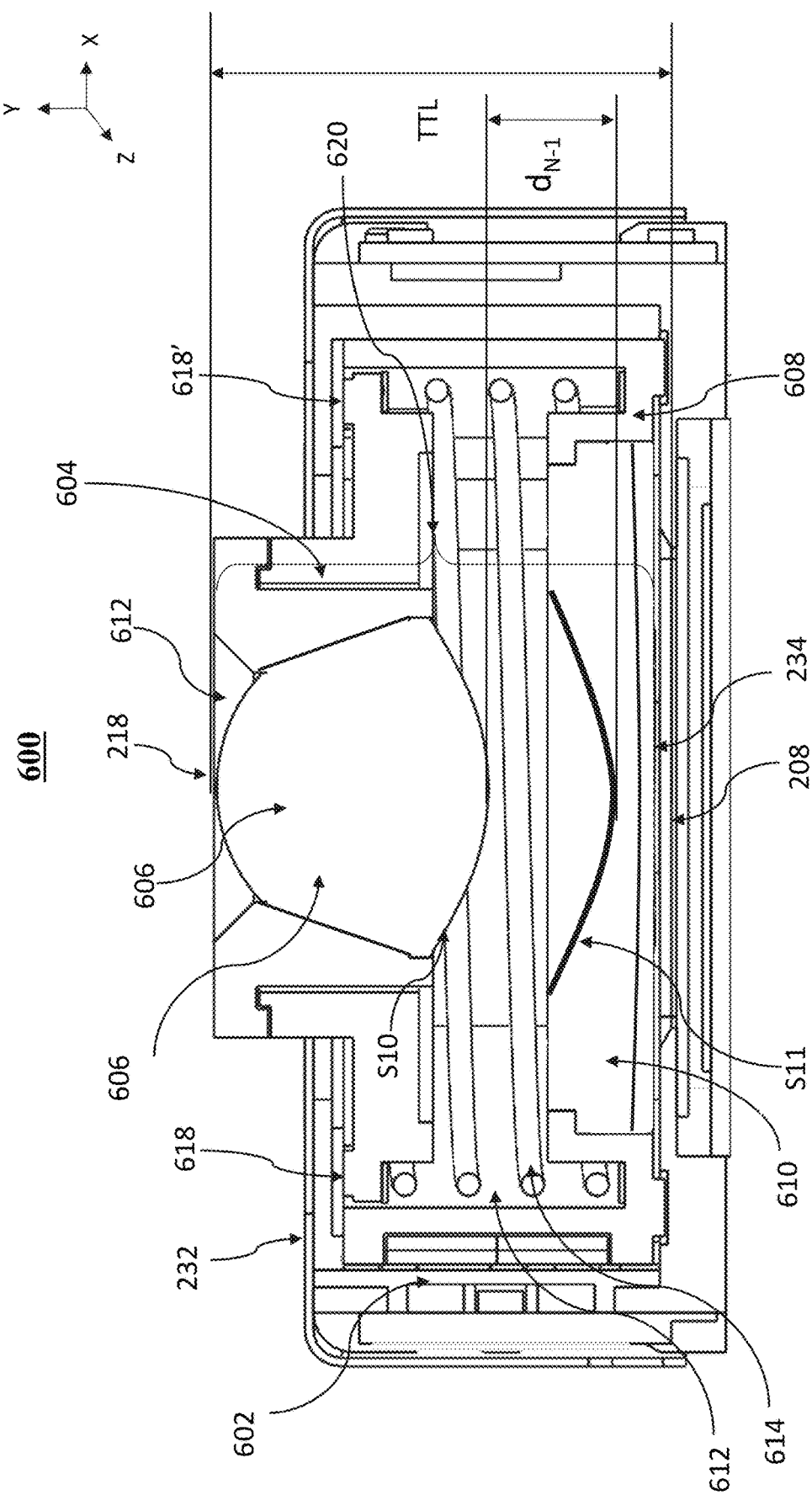
FIG. 6A shows in cross section another example of a lens module in a pop-out state.
Figure 6B:
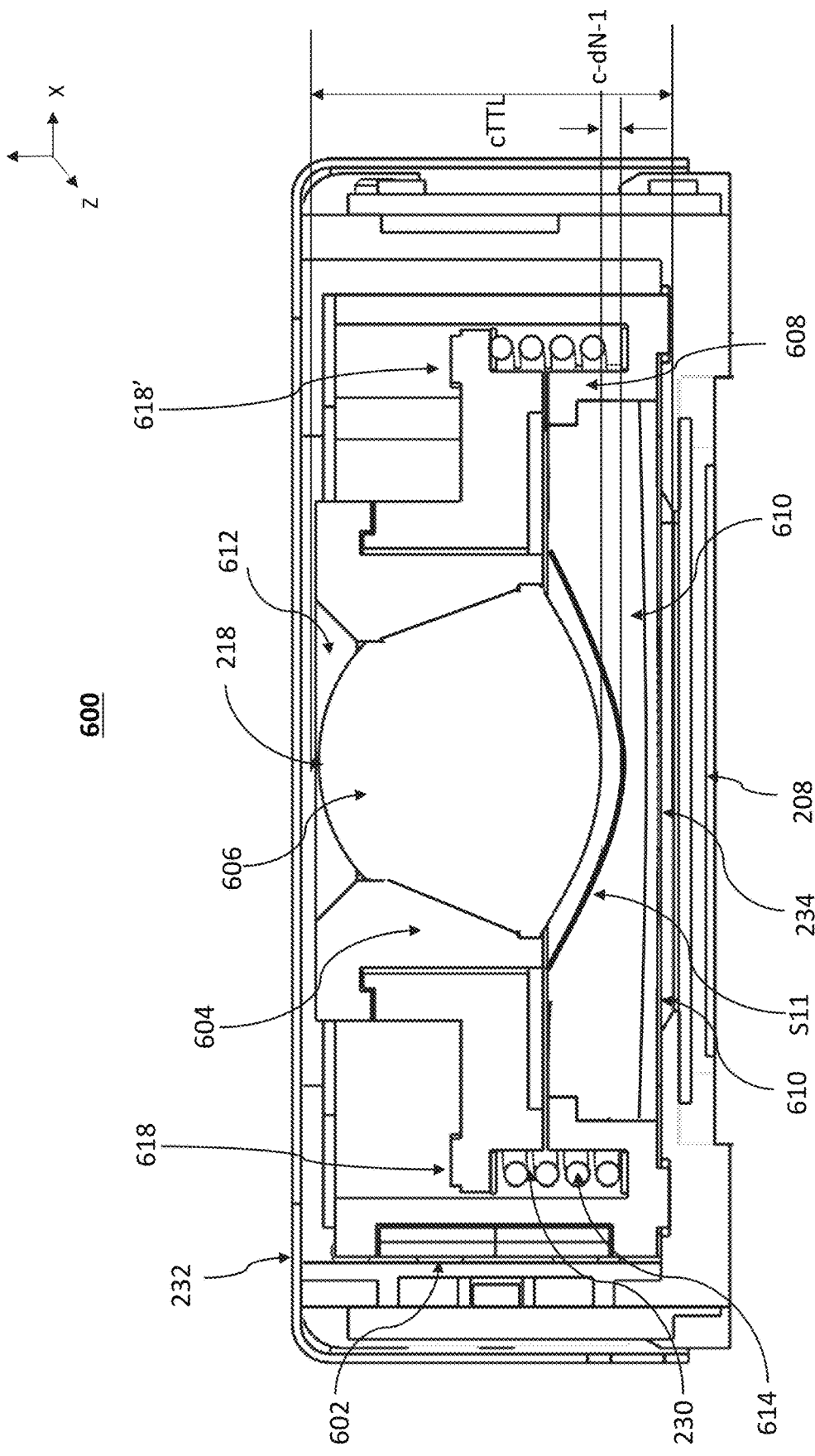
FIG. 6B shows in cross section the pop-out lens module of FIG. 6A in a collapsed state.
Figure 6C:
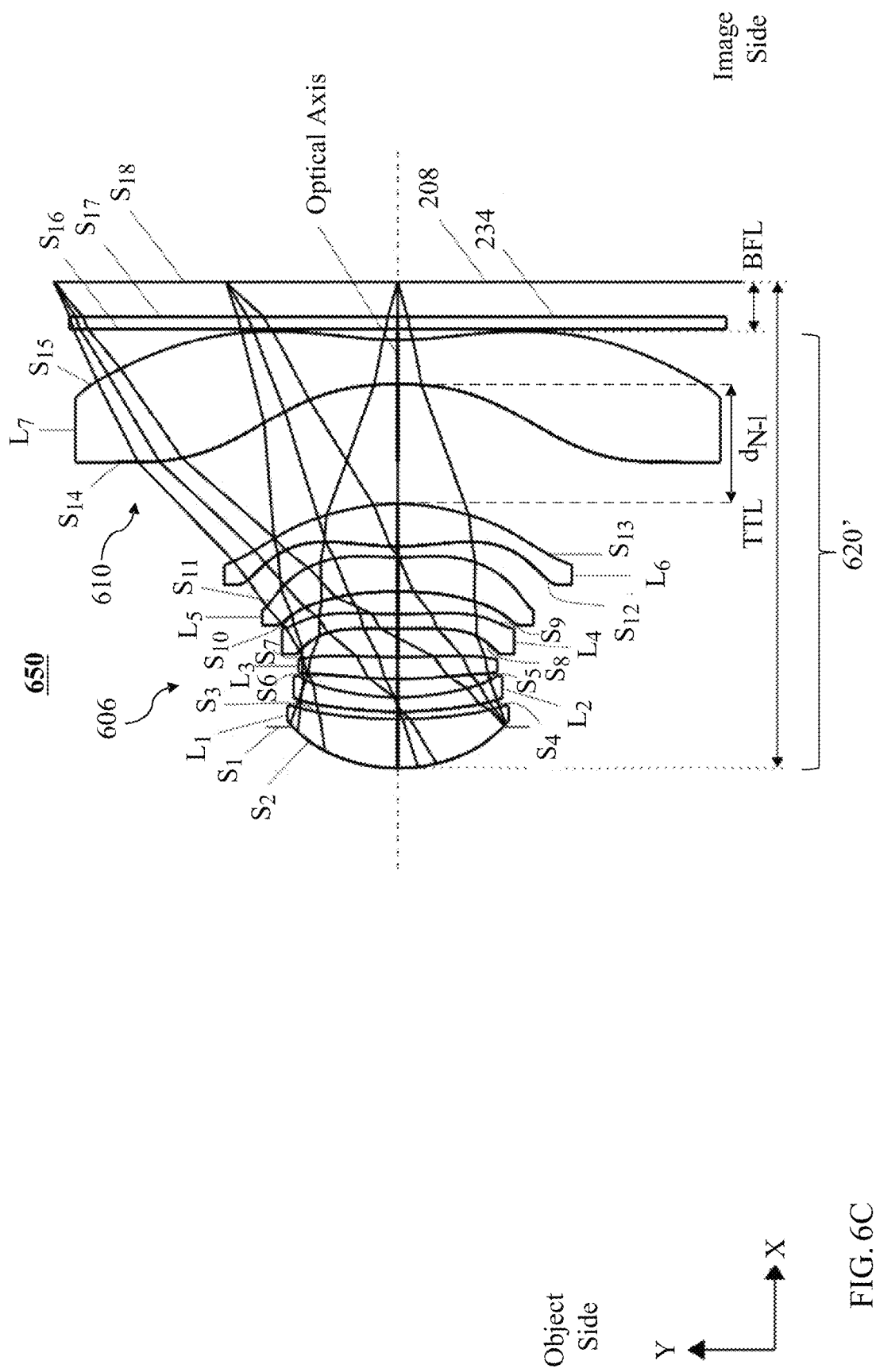
FIGS. 6C and 6D shows other examples of an optical lens system that may be used in a pop-out camera disclosed herein.
Figure 6D:
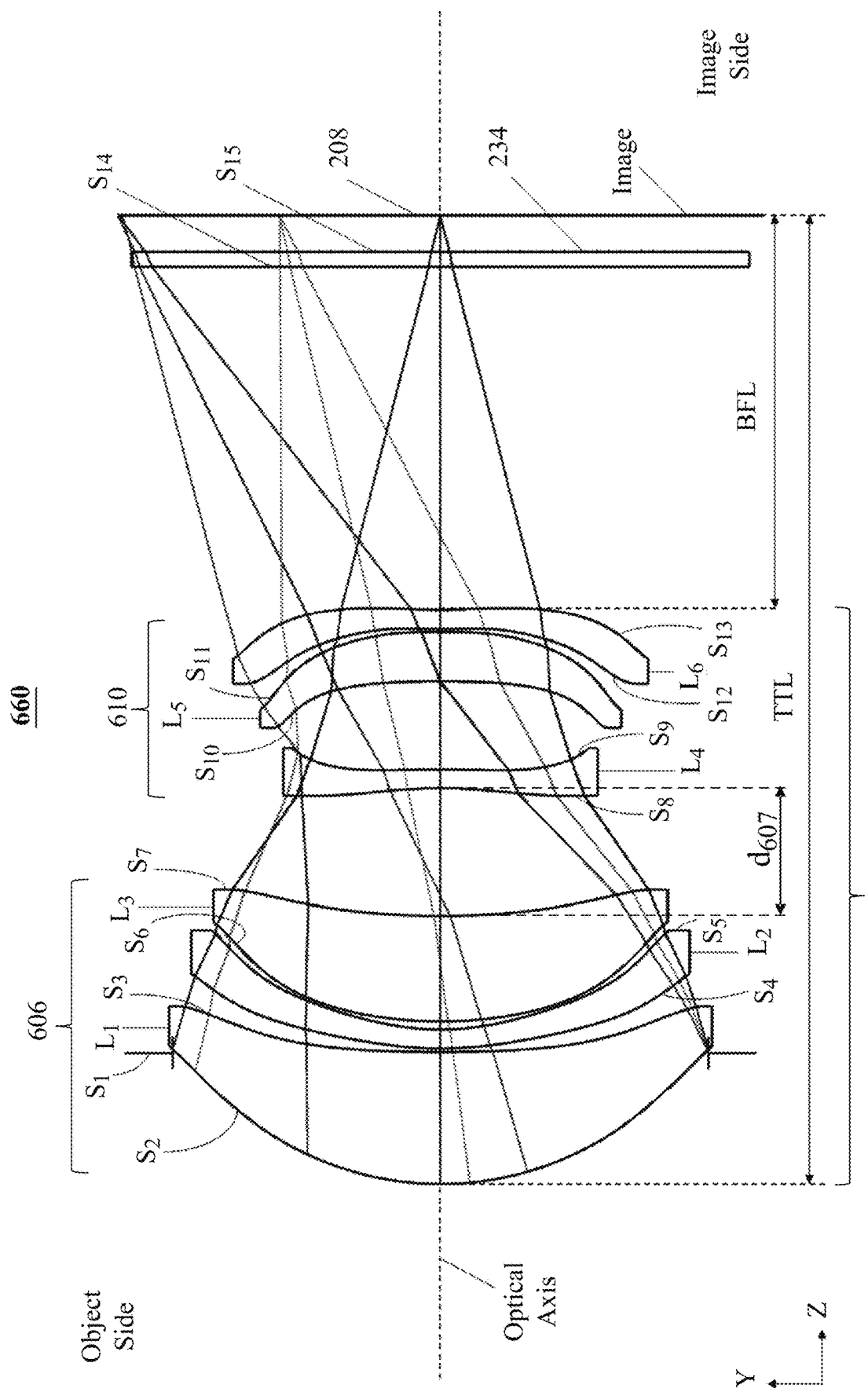
Figure 10:
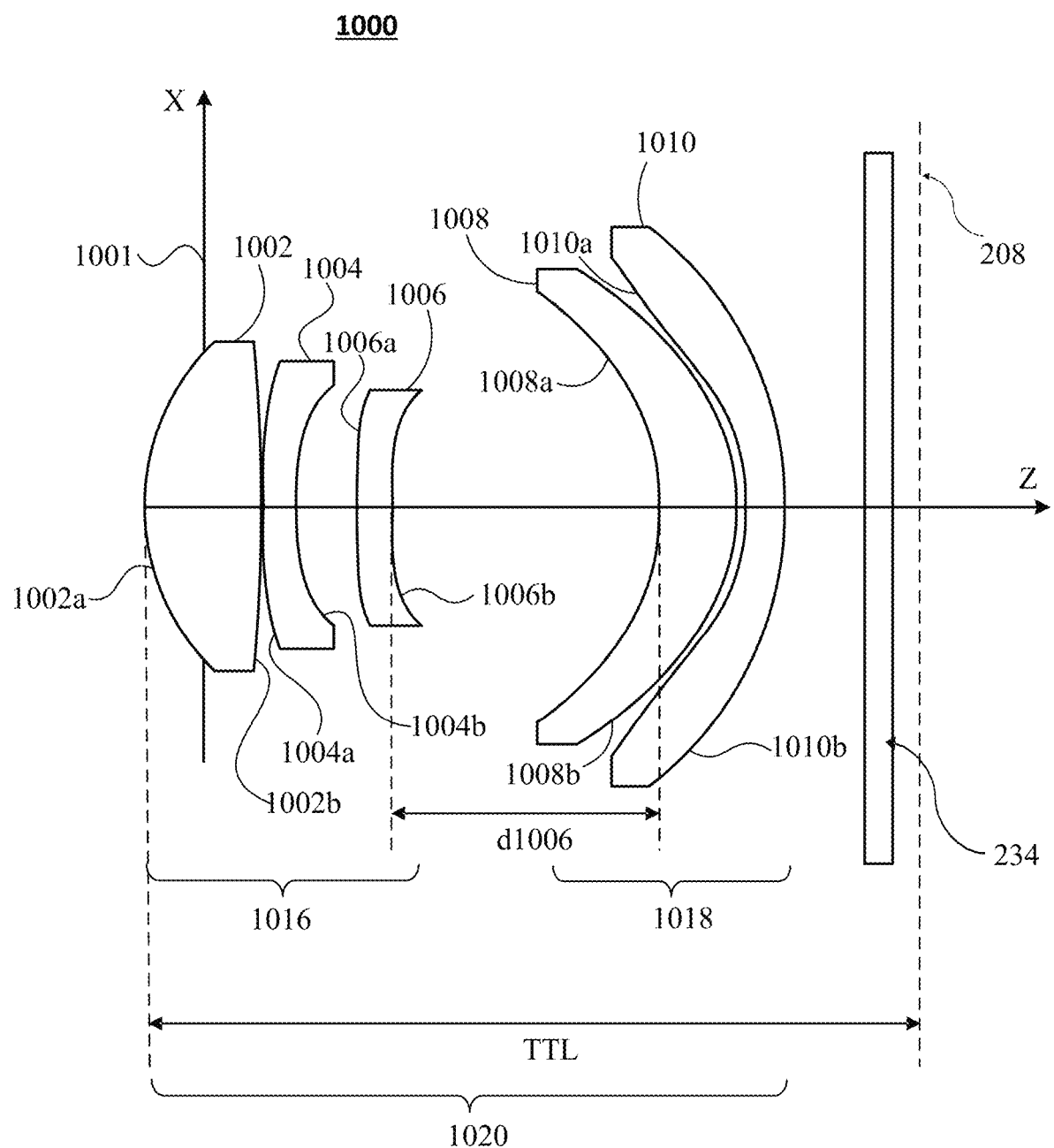
FIG. 10 shows yet another example of an optical lens system that may be used in a pop-out camera disclosed herein.
Figure 13:
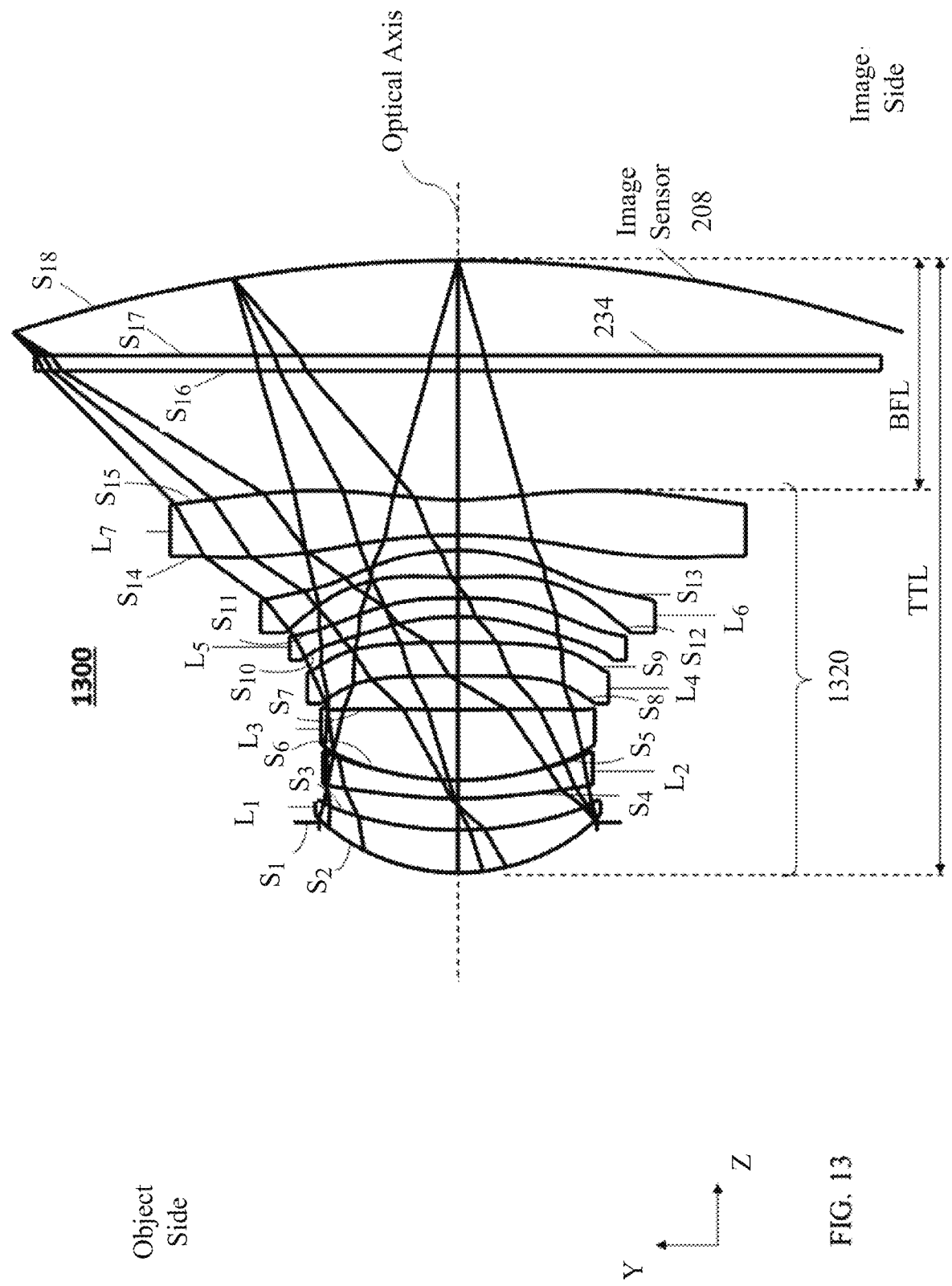
FIG. 13 shows yet another example of an optical lens system can be included in a pop-out camera disclosed herein.

The pop-out lens may be a Tele lens, for example as in FIG. 4C or FIG. 10 or FIG. 6D, or a Wide lens as in FIG. 6C or FIG. 13. Depending on the type of lens, a pop-out camera operates as a pop-out Tele camera or as a pop-out Wide camera. A pop-out Tele camera may have a $FOV_T$ of 20-50 deg. A pop-out Wide camera may have a $FOV_W$ of 50-120 deg. The TTL of the lens, measured from the first surface of the first lens element in the lens to the image sensor may be for example 6 mm-18 mm.

Figure 2D:
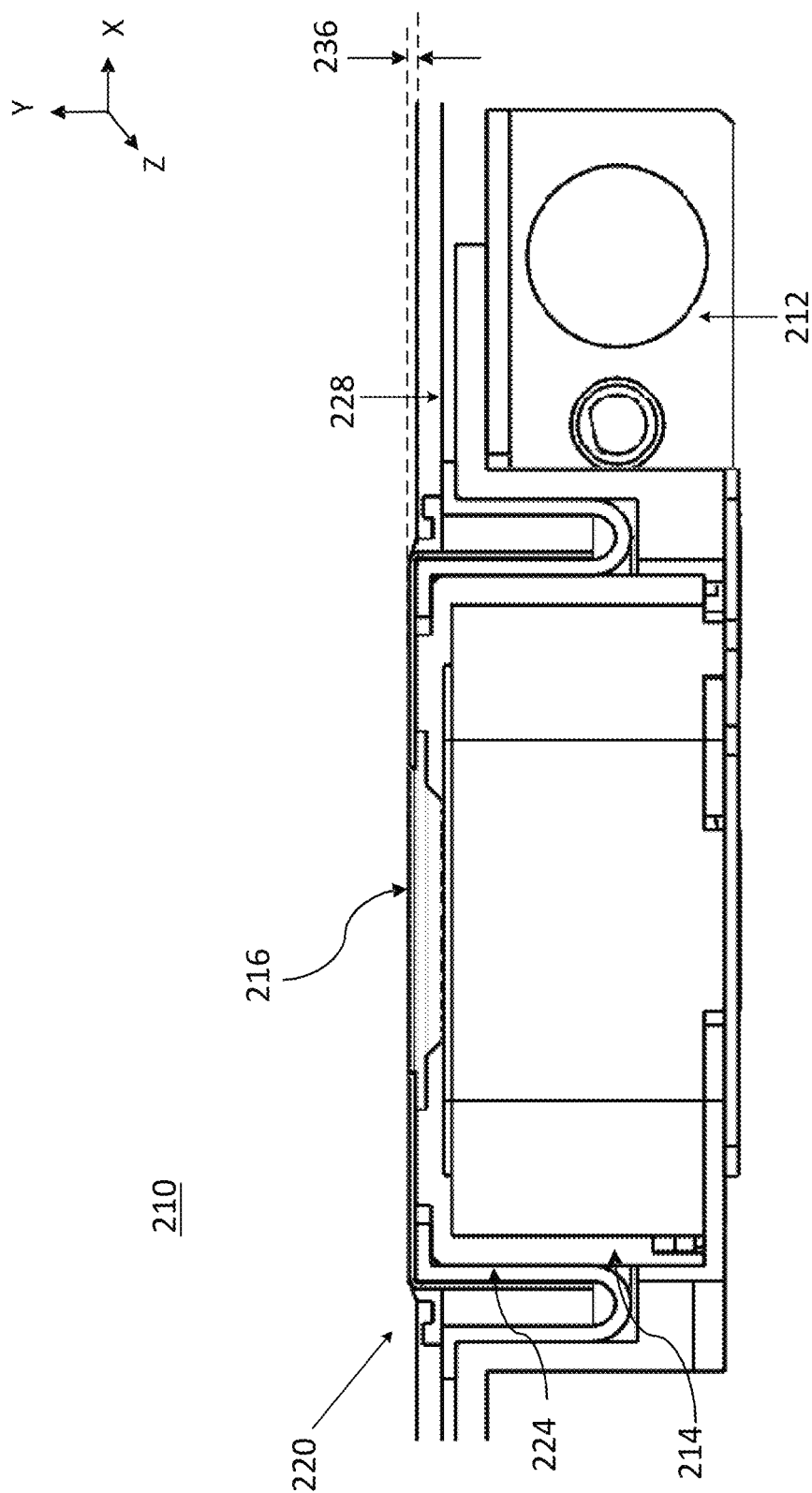
FIG. 2D shows a cross sectional view of the frame shown in FIG. 2B in a collapsed state.

FIG. 2D shows a cross sectional view of frame 220 in the collapsed state. Actuator 212 brings the camera to a collapsed state by performing work against the spring. In the collapsed state, the spring is in a compressed state, see also FIG. 4B. To switch camera 200 to the collapsed state, actuator 212 moves window frame 214 to apply pressure on lens barrel 204. This translates into a movement of lens barrel 204 towards the image sensor. In the collapsed state, the TTL is a collapsed TTL (cTTL) and may be for example 5-12 mm. cTTL is always measured between a first surface of lens element L1 on the image side (marked S2) and an imaging surface of the image sensor along the optical axis marked S16. The difference between cTTL and TTL stems from a modified BFL with respect to the pop-out state. Camera 200 is designed such that there is a large BFL in the operative state. This large BFL can be collapsed to bring the camera to a collapsed state, achieving a slim camera design. In the collapsed state, the camera forms a collapsed bump (c-bump) 236 with respect to device exterior surface 228. The c-bump may have for example a size (height) of 0-3 mm. In the collapsed state, the height of host device 250 is a "height in the collapsed state" that is much smaller than the height in the pop-out state but still larger than the host device height by the c-bump 236.

Camera 200 may be designed to support, in some examples, accuracy tolerances for decenter of e.g. ±20 μm in the X-Z plane and of e.g. ±10 μm in the Y direction, as well as for a tilt of ±0.5°. The planes and directions are as in the coordinate systems shown in the figures. Repeatability tolerances for decenter may be e.g. ±10 μm in the X-Z plane and of e.g. ±5 μm in the Y direction, as well as for a tilt of ±0.25°. In other examples, accuracy tolerances for decenter may be e.g. ±10 μm in the X-Z plane and of e.g. ±5 μm in the Y direction, as well as e.g. ±0.15°. Repeatability tolerances for decenter may be e.g. ±5 μm in the X-Z plane and of e.g. ±2.5 μm in the Y direction, as well as for a tilt of ±0.08°. In yet other examples, accuracy tolerances for decenter may be e.g. ±5 μm in the X-Z plane and of e.g. ±2.5 μm in the Y direction, as well as e.g. ±0.1°. Repeatability tolerances for decenter may be e.g. ±1.5 μm in the X-Z plane and of e.g. ±0.8 μm in the Y direction, as well as for a tilt of ±0.05°.

Figure 19B:
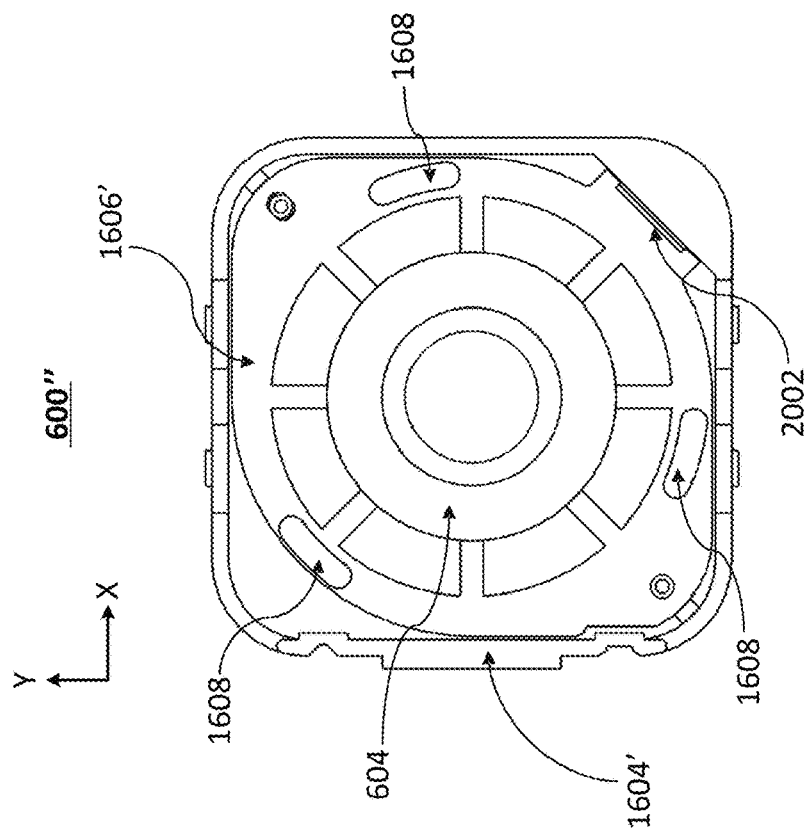
FIG. 19B shows the optics module of FIG. 19A in a top view.
Figure 19A:
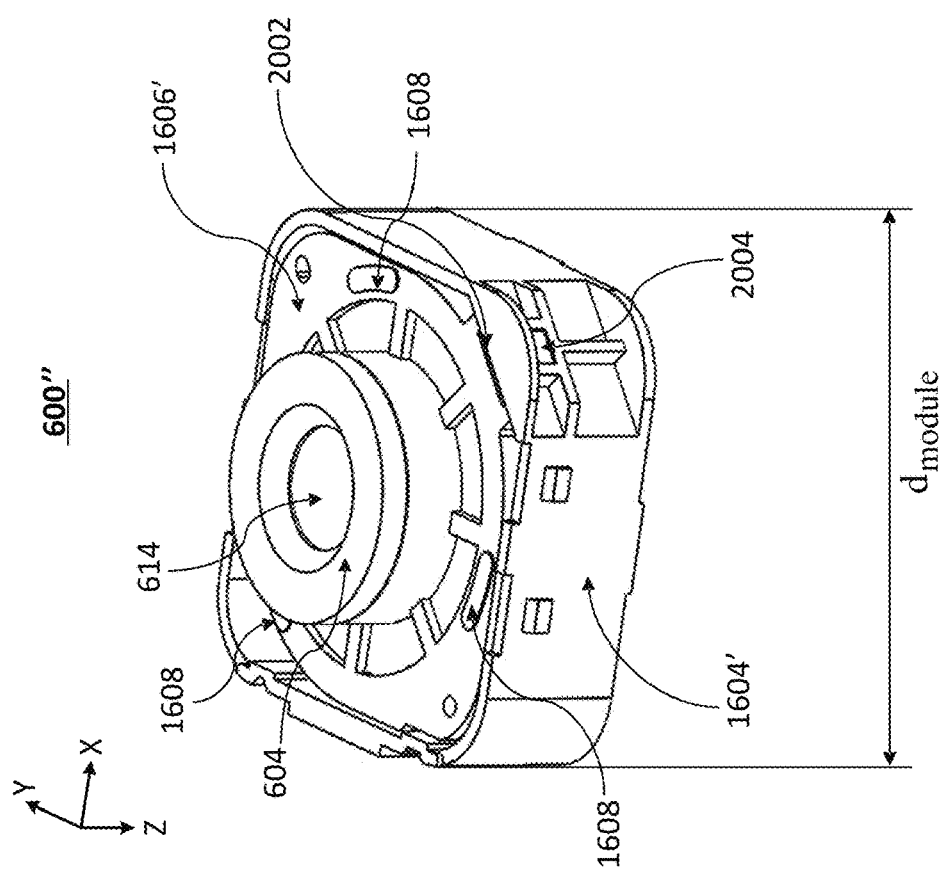
FIG. 19A shows a perspective view of yet another example of an optics module in a pop-out state.

Similar accuracy tolerances and repeatability tolerances hold for optics frame 1650 (see e.g. FIG. 16A) and optics module 600" (see e.g. FIG. 19A).

"Accuracy tolerances" refer here to a maximum variation of the distances between optical elements and between mechanical elements. "Repeatability tolerances" refer here to a maximum variation of the distances between optical elements and between mechanical elements in different pop-out cycles, i.e. the capability of the mechanical and optical elements to return to their prior positions after one or many pop-out (or collapse) events.

Tolerances in the Y direction may be less important, as variations in Y can be compensated by optical feedback and moving the lens for auto-focus.

FIG. 4A shows in cross section optics module 240 in the pop-out state. FIG. 4B shows optics module 240 in the same state in perspective. The diameter of the smallest circle that entirely surrounds the optics module defines a "largest diameter" "$d_{module}$" of the optics module. That is "$d_{module}$" marks the largest diagonal of an optics module (here and in e.g. FIGS. 7, 17B, 18A, 18B, 18E and 19A) except when stated otherwise (e.g. as re. FIG. 16A).

FIG. 4C shows details of a first exemplary lens system 400 that can be used in camera 200 in a pop-out state. Lens system 400 comprises a lens 420 that includes, in order from an object side to an image side, a first lens element L1 with object-side surface S2 and image-side surface S3; a second lens element L2 with object-side surface S4, with an image side surface marked S5; a third lens element L3 with object-side surface S6 with image-side surface S7; a fourth lens element L4 object-side surface marked S8 and an image-side surface marked S9; a fifth lens element L5 with object-side surface marked S10 and an image-side surface marked S11; and a sixth lens element L6 with object-side surface marked S12 and an image-side surface marked S13. S1 marks a stop. Lens system 400 further comprises optical window 234 disposed between surface S13 and image sensor 208. Distances between lens elements and other elements are given in tables below along an optical axis of the lens and lens system.

In lens system 400, TTL=11.55 mm, BFL=5.96 mm, EFL=13 mm, F number=2.20 and the FOV=29.7 deg. A ratio of TTL/EFL=0.89. The optical properties of lens 420 do not change when switching between a pop-out state and a collapsed state (i. e. gaps between lens elements are constant).

In the collapsed state (see FIG. 5A), cTTL may be 5.64-8.09 mm. The difference between cTTL and TTL stems from a modified BFL which is now a collapsed BFL, "c-BFL" (see FIG. 5A). c-BFL may be 0.051-2.5 mm. All distances between lens elements L1-L6 and lens surfaces S2-S13 remain unchanged.

Detailed optical data of lens system 400 is given in Table 1, and the aspheric surface data is given in Table 2 and Table 3, wherein the units of the radius of curvature (R), lens element thickness and/or distances between elements along the optical axis and diameter are expressed in mm. "Index" is the refraction index. The equation of the aspheric surface profiles is expressed by:

$$z(r) = \frac{cr^2}{1 + \sqrt{1-(1+k)c^2r^2}} + D_{con}(u)$$

$$D_{con}(u) = u^4 \sum_{n=0}^{N} A_n Q_n^{con}(u^2)$$

-continued $$u = \frac{r}{r_{norm}}, x = u^2$$

$$Q_0^{con}(x) = 1 \quad Q_1^{con} = -(5-6x) \quad Q_2^{con} = 15 - 14x(3-2x)$$

$$Q_3^{con} = -\{35 - 12x[14 - x(21 - 10x)]\}$$

$$Q_4^{con} = 70 - 3x\{168 - 5x[84 - 11x(8 - 3x)]\}$$

$$Q_5^{con} = -[126 - x(1260 - 11x\{420 - x[720 - 13x(45 - 14x)]\})]$$

where $\{z, r\}$ are the standard cylindrical polar coordinates, $c=1/R$ is the paraxial curvature of the surface, k is the conic parameter, and $r_{norm}$ is generally one half of the surface's clear aperture. An are the polynomial coefficients shown in lens data Table 2 and Table 3 (as well as in Table 5 and Table 6, and in Table 10 and Table 11). The Z-axis is defined to be positive towards the image. Also note that in Table 1 (as well as in Table 4 and Table 9), the distances between various elements (and/or surfaces) refer to the element thickness and are measured on the optical axis Z, wherein the stop is at z=0. Each number is measured from the previous surface. Thus, the first distance −1.197 mm is measured from the stop to surface S2. The reference wavelength is 555.0 nm. Units are in mm (except for refraction index "Index" and Abbe #). The largest lens diameter $d_L$ of a lens such as lens 240 is given by the largest diameter present among all the lens elements of a lens such as lens 240.

TABLE 1

Lens system 400
EFL = 13.00 mm, F number = 2.20, FOV = 29.7 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S | Plano | Infinity | −1.197 | 2.940 | | | | |
| 2 | Lens 1 | QT1 | 3.453 | 0.927 | 2.940 | Plastic | 1.54 | 56.18 | 14.80 |
| 3 | | | 5.463 | 0.008 | 2.895 | | | | |
| 4 | Lens 2 | QT1 | 4.054 | 1.545 | 2.811 | Plastic | 1.54 | 56.18 | 8.78 |
| 5 | | | 22.988 | 0.025 | 2.620 | | | | |
| 6 | Lens 3 | QT1 | 6.508 | 0.218 | 2.346 | Plastic | 1.67 | 19.4 | −9.67 |
| 7 | | | 3.215 | 1.134 | 2.003 | | | | |
| 8 | Lens 4 | QT1 | −9.074 | 0.206 | 1.774 | Plastic | 1.64 | 23.53 | −17.62 |
| 9 | | | −45.557 | 0.902 | 1.648 | | | | |
| 10 | Lens 5 | QT1 | 66.987 | 0.417 | 1.665 | Plastic | 1.67 | 19.44 | 9.93 |
| 11 | | | −7.435 | 0.009 | 1.788 | | | | |
| 12 | Lens 6 | QT1 | −19.713 | 0.197 | 1.845 | Plastic | 1.54 | 56.18 | −10.85 |
| 13 | | | 8.487 | 5.450 | 1.984 | | | | |
| 14 | Filter | Plano | Infinity | 0.210 | — | Glass | 1.52 | 64.2 | |
| 15 | | | Infinity | 0.300 | — | | | | |
| 16 | Image | Plano | Infinity | — | — | | | | |

TABLE 2

Aspheric Coefficients

| Surface # | $R_{norm}$ | A0 | A1 | A2 | A3 |
|---|---|---|---|---|---|
| 2 | 2.385 | −6.99E−02 | −1.08E−02 | −1.52E−03 | −4.14E−04 |
| 3 | 2.385 | −6.86E−02 | −1.05E−02 | 2.44E−03 | −3.81E−04 |
| 4 | 2.385 | 9.39E−03 | −1.24E−02 | 2.84E−03 | 8.52E−04 |
| 5 | 2.385 | 1.26E−02 | −2.19E−02 | 1.12E−03 | 8.76E−04 |
| 6 | 1.692 | −5.76E−02 | 2.59E−02 | −4.13E−03 | −2.03E−05 |
| 7 | 1.692 | −2.94E−02 | 3.95E−02 | −5.32E−03 | −6.02E−04 |
| 8 | 1.648 | 3.50E−01 | 8.82E−03 | −2.47E−03 | 6.30E−04 |
| 9 | 1.648 | 4.12E−01 | 2.61E−02 | 2.43E−03 | 2.06E−03 |
| 10 | 1.587 | −2.16E−01 | −3.53E−02 | −8.04E−03 | 4.41E−04 |
| 11 | 1.587 | −1.36E−01 | −2.45E−02 | −2.51E−03 | 1.25E−03 |
| 12 | 1.609 | −2.58E−01 | 2.37E−02 | −1.19E−03 | 2.12E−04 |
| 13 | 1.609 | −2.99E−01 | 2.60E−02 | −4.30E−03 | −2.04E−04 |

TABLE 3

| Surface # | A4 | A5 | A6 |
|---|---|---|---|
| 2 | −4.91E−05 | 6.04E−06 | −7.27E−07 |
| 3 | 8.15E−05 | −5.60E−05 | 6.51E−06 |
| 4 | 1.04E−04 | −1.60E−04 | 1.22E−05 |
| 5 | −4.30E−04 | 9.99E−05 | −1.20E−05 |
| 6 | 6.30E−05 | −4.83E−06 | 1.65E−07 |
| 7 | 2.23E−05 | 2.33E−05 | 2.32E−07 |
| 8 | −2.32E−04 | −1.73E−05 | −4.47E−05 |
| 9 | −4.98E−05 | −1.12E−04 | −7.34E−05 |
| 10 | 1.23E−04 | 1.53E−04 | 7.13E−05 |
| 11 | −6.11E−04 | 1.56E−04 | 1.39E−05 |
| 12 | −5.99E−04 | 1.37E−04 | 7.47E−06 |
| 13 | 5.73E−05 | −1.33E−05 | 1.30E−06 |

Figure 5A:
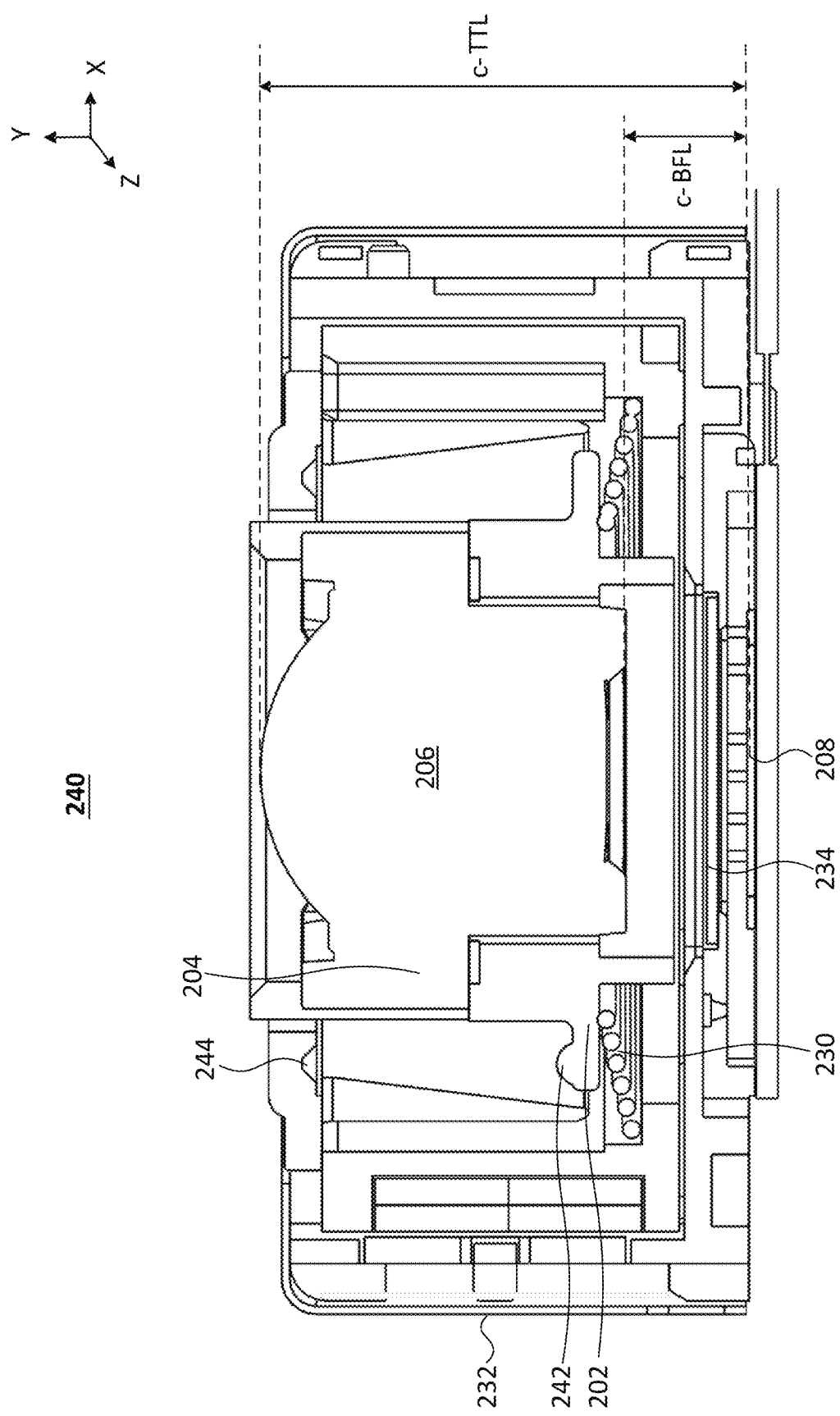
FIG. 5A shows in cross section a lens module in the camera of FIG. 2A in the collapsed state.
Figure 5B:
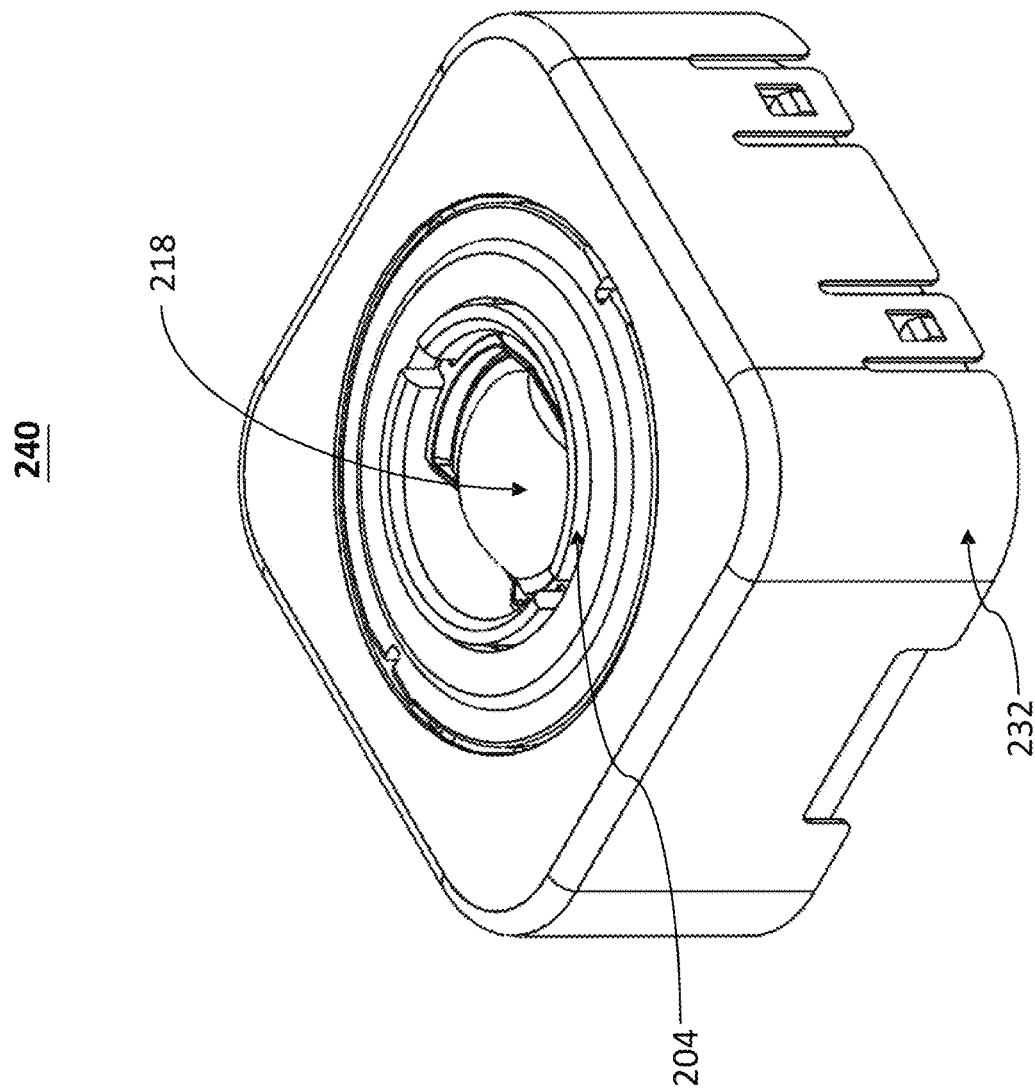
FIG. 5B shows the same as FIG. 5A in a perspective view.

FIG. 5A shows a pop-out optics module 240 in a collapsed state in a cross sectional view. FIG. 5B shows a perspective view of the same.

FIG. 6A shows a cross sectional view (through cross section marked 6A-6A in FIG. 7) of another example numbered 600 of a pop-out optics module in a pop-out state. Optics module 600 may be integrated into a pop-out mechanism such as 210 (not shown here). Optics module 600 includes a lens barrel 602 with a collapsible lens barrel section (first barrel section) 604 carrying a first lens group 606, and a fixed lens barrel section (second barrel section) 608 carrying a second lens group 610. The two lens groups form a lens 620 that includes altogether N lens elements L1-LN, arranged with a first lens element L1 on an object side and a last lens element LN on an image side. Optics module 600 is covered by cover 232. Lens 620, and optional optical window 234 and an image sensor 208 form a lens system 630.

In general, N≥4. In other examples, the lens barrel may comprise more than two barrel sections with more lens groups each, e.g. 3, 4, 5 lens barrel sections with each barrel section carrying a lens group. The lens barrel sections may be divided into fixed barrel sections and movable barrel sections. Air-gaps may be formed between lens groups according to their relative movement. In examples with more than two barrel sections, some or all barrel sections may be movable and have respective air-gaps formed between the lens groups. The air-gaps between lens groups may collapse in a non-operative camera state. The sum of such air-gaps may be 1-8.5 mm. The largest air-gaps present between two consecutive lens elements may be used to define lens groups. For example, the largest air-gap present between two consecutive lens elements may be used to divide a lens into two lens groups, the largest air-gap and the second largest air-gap present between two consecutive lens elements may be used to define three lens groups, etc. This statement is true for all lens and camera examples below. In the pop-out state, air-gap $d_{N-1}$ may be 1-3.5 mm. A spring 614 pushes the first lens barrel section 604 towards a window frame like frame 214. In the operative state, stopper 618 and another stopper 618' may act as a stopper mechanism that keeps the lens groups in fixed distance and orientation. In some examples, an camera in pop-out state disclosed herein may be designed to support tolerances for decenter of e.g. ±20 μm in the X-Z plane and of e.g. ±10 μm in the Y direction, as well as for a tilt of ±0.2° of the lens barrel with respect to image sensor 208. In other examples tolerances for decenter may be e.g. ±3-10 μm in the X-Z plane and of e.g. ±3-10 μm in the Y direction, as well as e.g. ±0.05°-0.15° for a tilt of lens barrel with respect to the image sensor Y. In yet other examples, tolerances for decenter may be smaller than 1 μm in the X-Z plane, e.g. 0.8 μm. In yet other examples, tolerances for decenter in a Y plane may be smaller than 1 μm, e.g. 0.8 μm, to support the properties of a lens system like system 630, 650 or 1000, especially for air-gaps between lens elements such as $d_{N-1}$ (see FIG. 6C) or $d_{1006}$ (see FIG. 10). In some examples, pins such as pins 1208 (see FIG. 12B and FIG. 12D) may be used for providing mechanical stability and repeatability in X-Z plane.

The TTL of the lens, measured from the first (object side) surface of L1 to the image sensor may be 5-18 mm. The image sensor diagonal may be 6 mm<sensor diagonal<30 mm. The 35 eqFL may be 15 mm<equivalent focal length<200 mm. The TTL/EFL ratio may vary in the range 0.7<TTL/EFL<1.5.

FIG. 6B shows a cross sectional view (through cross section marked 6B-6B in FIG. 8) of optics module 600 in a collapsed state. To switch optics module 600 to the collapsed state, actuator 212 decreases the air-gap between the first surface of LN and the second surface of LN-1 by moving the window frame (not shown here) to apply pressure to the lens barrel that translates into a movement of the collapsible lens barrel section towards the image sensor. In the collapsed state, cTTL may be 5-12 mm, and collapsed air-gap $c-d_{N-1}$ may be 0.05-0.85 mm. The difference between cTTL and TTL stems from a modified distance between the first lens group 606 in first collapsible lens barrel section 604 and second lens group 610 in second fixed lens barrel section 608. The distance between first lens group 606 and the image sensor changed with respect to the pop-out state, but the distance between second lens group 610 and the image sensor did not change. The optical properties of lens 620 change when switching between a pop-out state and a collapsed state.

FIG. 6C shows an example of another lens system 650 that may be used in optics module 600 or another pop-out optics module 600' below. Lens system 650 is shown in a pop-out state. The design data is given in Tables 4-6. Lens system 650 includes a lens 620' with seven lens elements L1-L7 arranged as shown, optical window 234 and image sensor 208. Lens elements L1-L6 form the first lens group 606, and lens element L7 forms the second lens group 610. The TTL is 8.49 mm and the BFL is 1.01 mm. Focal length is EFL=6.75 mm, F number=1.80 and the FOV=80.6 deg. Air-gap $d_{N-1}$ is 2.1 mm.

TABLE 4

Lens system 650
EFL = 6.75 mm, F number = 1.80, FOV = 80.6 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S | Plano | Infinity | −0.727 | 1.880 | | | | |
| 2 | Lens 1 | QT1 | 2.844 | 0.861 | 1.880 | Plastic | 1.54 | 55.9 | 7.55 |
| 3 | | | 8.156 | 0.128 | 1.797 | | | | |
| 4 | Lens 2 | QT1 | 6.089 | 0.250 | 1.769 | Plastic | 1.67 | 19.4 | −19.67 |
| 5 | | | 4.106 | 0.323 | 1.677 | | | | |
| 6 | Lens 3 | QT1 | 7.530 | 0.384 | 1.678 | Plastic | 1.54 | 55.9 | 26.14 |
| 7 | | | 15.633 | 0.489 | 1.685 | | | | |
| 8 | Lens 4 | QT1 | 19.241 | 0.257 | 1.726 | Plastic | 1.66 | 20.4 | −34.80 |
| 9 | | | 10.465 | 0.397 | 1.974 | | | | |
| 10 | Lens 5 | QT1 | −9.931 | 0.601 | 2.060 | Plastic | 1.57 | 37.4 | −6.53 |
| 11 | | | 6.067 | 0.187 | 2.315 | | | | |
| 12 | Lens 6 | QT1 | 4.294 | 0.738 | 2.725 | Plastic | 1.54 | 55.9 | 3.66 |
| 13 | | | −3.522 | 2.097 | 2.984 | | | | |
| 14 | Lens 7 | QT1 | −5.605 | 0.770 | 4.901 | Plastic | 1.54 | 55.9 | −5.10 |
| 15 | | | 5.824 | 0.188 | 5.579 | | | | |
| 16 | Filter | Plano | Infinity | 0.2100 | — | Glass | 1.52 | 64.2 | |
| 17 | | | Infinity | 0.610 | — | | | | |
| 18 | Image | Plano | Infinity | — | — | | | | |

In the collapsed state (see FIG. 6B or FIG. 14C), cTTL may be 6.44-7.24 mm. The difference between cTTL and TTL stems from a modified air-gap between L6 and L7, which is a collapsed air-gap $c-d_{N-1}$ and which may be 0.05-0.85 mm. The BFL did not change with respect to the pop-out state.

The optical properties of lens 620' change when switching between a pop-out state and the collapsed state. The optical properties presented here refer to the lens elements in a "maximal" pop-out state, i.e. when the lens has the largest TTL.

TABLE 5

Aspheric Coefficients

| Surface # | $R_{norm}$ | A0 | A1 | A2 | A3 | A4 |
|---|---|---|---|---|---|---|
| 2 | 2.03E+00 | 8.98E−02 | 1.91E−02 | 4.39E−03 | 8.23E−04 | 1.41E−04 |
| 3 | 1.88E+00 | 1.36E−02 | 1.31E−02 | 1.21E−03 | 2.44E−04 | 8.58E−05 |
| 4 | 1.87E+00 | −6.37E−02 | 3.51E−02 | 1.73E−03 | 6.81E−04 | 1.38E−04 |
| 5 | 1.85E+00 | −1.16E−01 | 5.94E−02 | 1.65E−03 | 6.10E−03 | 1.62E−03 |
| 6 | 1.85E+00 | −1.04E−01 | 1.94E−02 | 1.51E−02 | 4.62E−03 | 9.45E−04 |
| 7 | 1.78E+00 | −1.51E−01 | −4.96E−03 | 3.05E−03 | 1.05E−03 | 2.14E−04 |
| 8 | 1.78E+00 | −5.18E−01 | −1.59E−02 | 5.30E−03 | 2.48E−03 | 8.04E−04 |
| 9 | 2.10E+00 | −5.53E−01 | 7.15E−02 | 3.81E−02 | 1.81E−02 | 6.25E−03 |
| 10 | 2.30E+00 | −3.60E−01 | 2.33E−01 | 1.57E−01 | 1.29E−01 | 5.32E−02 |
| 11 | 2.42E+00 | −1.68E+00 | 1.98E−01 | −4.68E−03 | 5.58E−02 | 2.62E−02 |
| 12 | 2.59E+00 | −1.52E+00 | 8.24E−02 | −8.59E−03 | 1.18E−02 | 2.67E−04 |
| 13 | 2.86E+00 | 4.37E−01 | 2.30E−03 | 4.67E−02 | −1.08E−02 | −3.33E−03 |
| 14 | 5.06E+00 | 1.44E+00 | 5.66E−01 | −2.72E−01 | 1.01E−01 | −2.51E−02 |
| 15 | 5.55E+00 | −5.28E+00 | 5.59E−01 | −2.71E−01 | 4.18E−02 | −4.23E−02 |

TABLE 6

Aspheric Coefficients

| Surface # | A5 | A6 | A7 | A8 | A9 |
|---|---|---|---|---|---|
| 2 | 0.00E+00 | 0.00E+00 | 0.00E+00 | 0.00E+00 | 0.00E+00 |
| 3 | −2.45E−05 | 0.00E+00 | 0.00E+00 | 0.00E+00 | 0.00E+00 |
| 4 | −7.03E−05 | 0.00E+00 | 0.00E+00 | 0.00E+00 | 0.00E+00 |
| 5 | 2.33E−04 | 0.00E+00 | 0.00E+00 | 0.00E+00 | 0.00E+00 |
| 6 | 5.32E−05 | 0.00E+00 | 0.00E+00 | 0.00E+00 | 0.00E+00 |
| 7 | 3.84E−05 | 0.00E+00 | 0.00E+00 | 0.00E+00 | 0.00E+00 |
| 8 | 3.66E−04 | 0.00E+00 | 0.00E+00 | 0.00E+00 | 0.00E+00 |
| 9 | 1.49E−03 | −2.63E−04 | 0.00E+00 | 0.00E+00 | 0.00E+00 |
| 10 | 1.64E−02 | 1.44E−03 | 0.00E+00 | 0.00E+00 | 0.00E+00 |
| 11 | 1.59E−02 | 3.54E−03 | 1.08E−03 | 0.00E+00 | 0.00E+00 |
| 12 | 3.18E−03 | −5.00E−04 | −3.15E−04 | 0.00E+00 | 0.00E+00 |
| 13 | 2.65E−03 | 2.67E−05 | −4.87E−04 | 1.84E−04 | 0.00E+00 |
| 14 | −2.21E−04 | −1.68E−05 | 6.75E−04 | −6.40E−04 | 2.77E−04 |
| 15 | 5.53E−03 | −7.30E−03 | −2.11E−04 | −1.38E−03 | 2.11E−04 |

FIG. 6D shows an example of yet another lens system 660 that may be used in optics module 600 or 600'. Lens system 660' is shown in a pop-out state. The design data is given in Tables 7-9. Lens system 660 includes a lens 620" with six lens elements L1-L6 arranged as shown, optical window 234 and image sensor 208. Lens elements L1-L3 form the first lens group 606, and lens elements L4-L6 form the second lens group 610. The TTL is 13.5 mm and the BFL is 5.49 mm. Focal length is EFL=15.15 mm, F number=2.0 and the FOV=32.56 deg. Air-gap $d_{607}$ is 1.78 mm. A ratio of TTL/EFL=0.89.

In the collapsed state (see FIG. 6B), cTTL may be 5-11 mm. The difference between cTTL and TTL stems from a modified air-gap between L3 and L4, which is a collapsed air-gap c-$d_{607}$ and which may be 0.05-1.0 mm and a modified BFL which is a c-BFL and may be 0.1-1.5 mm. The optical properties of lens 620" change when switching between a pop-out state and the collapsed state. For lens system 660, a ratio TTL/EFL is 0.89, i.e. EFL>TTL. The ratio cTTL/EFL may be 0.35-0.75.

TABLE 7

Lens system 660
EFL = 15.15 mm, F number = 2.0, FOV = 32.56 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S | Plano | Infinity | −1.823 | 3.731 | | | | |
| 2 | Lens 1 | ASP | 4.314 | 1.837 | 3.731 | Plastic | 1.54 | 55.91 | 9.50 |
| 3 | | | 21.571 | 0.048 | 3.560 | | | | |
| 4 | Lens 2 | ASP | 4.978 | 0.265 | 3.419 | Plastic | 1.67 | 19.44 | −17.41 |
| 5 | | | 3.422 | 0.113 | 3.139 | | | | |
| 6 | Lens 3 | ASP | 5.764 | 1.473 | 3.113 | Plastic | 1.67 | 19.44 | 20.20 |
| 7 | | | 11.201 | 1.780 | 2.909 | | | | |
| 8 | Lens 4 | ASP | −6.075 | 0.260 | 2.143 | Plastic | 1.67 | 19.44 | −14.33 |
| 9 | | | −17.446 | 1.230 | 2.008 | | | | |
| 10 | Lens 5 | ASP | −18.298 | 0.688 | 2.264 | Plastic | 1.54 | 55.91 | 184.98 |
| 11 | | | −16.202 | 0.040 | 2.468 | | | | |
| 12 | Lens 6 | ASP | 10.235 | 0.273 | 2.679 | Plastic | 1.54 | 55.91 | −93.97 |
| 13 | | | 8.454 | 4.783 | 2.848 | | | | |
| 14 | Filter | Plano | Infinity | 0.210 | — | Glass | 1.52 | 64.17 | |
| 15 | | | Infinity | 0.500 | — | | | | |
| 16 | Image | Plano | Infinity | — | — | | | | |

TABLE 8

Aspheric Coefficients

| Surface # | Conic | A4 | A6 | A8 | A10 |
|---|---|---|---|---|---|
| 2 | 0 | −4.57E−04 | −5.55E−05 | 2.46E−05 | −4.65E−06 |
| 3 | 0 | 8.55E−04 | 7.37E−04 | −1.07E−04 | 9.78E−06 |
| 4 | 0 | −1.51E−02 | 3.43E−03 | −6.33E−04 | 8.54E−05 |
| 5 | 0 | −2.21E−02 | 5.71E−03 | −1.50E−03 | 2.85E−04 |
| 6 | 0 | −3.61E−03 | 3.56E−03 | −1.08E−03 | 2.29E−04 |
| 7 | 0 | −1.74E−04 | 2.47E−04 | 5.66E−05 | −3.21E−05 |
| 8 | 0 | 1.75E−02 | 2.27E−03 | −2.24E−03 | 7.99E−04 |
| 9 | 0 | 1.79E−02 | 5.45E−03 | −3.71E−03 | 1.37E−03 |
| 10 | 0 | −4.37E−03 | −1.59E−02 | 1.33E−02 | −6.54E−03 |
| 11 | 0 | −7.77E−02 | 4.02E−02 | −1.21E−02 | 1.65E−03 |
| 12 | 0 | −1.39E−01 | 7.50E−02 | −2.44E−02 | 4.78E−03 |
| 13 | 0 | −5.32E−02 | 1.90E−02 | −4.73E−03 | 6.11E−04 |

TABLE 9

Aspheric Coefficients

| Surface # | A12 | A14 | A16 |
|---|---|---|---|
| 2 | 4.92E−07 | −2.88E−08 | 5.71E−10 |
| 3 | −6.44E−07 | 1.90E−08 | −1.21E−10 |
| 4 | −6.96E−06 | 3.18E−07 | −6.61E−09 |
| 5 | −3.28E−05 | 2.13E−06 | −6.25E−08 |
| 6 | −2.83E−05 | 1.87E−06 | −5.35E−08 |
| 7 | 5.30E−06 | −4.54E−07 | 1.54E−08 |
| 8 | −1.70E−04 | 1.94E−05 | −9.28E−07 |
| 9 | −2.64E−04 | 2.29E−05 | −1.78E−07 |
| 10 | 1.83E−03 | −2.76E−04 | 1.73E−05 |
| 11 | −8.43E−06 | −2.54E−05 | 2.18E−06 |
| 12 | −5.86E−04 | 4.30E−05 | −1.42E−06 |
| 13 | −2.86E−05 | −1.51E−06 | 1.53E−07 |

Figure 7:
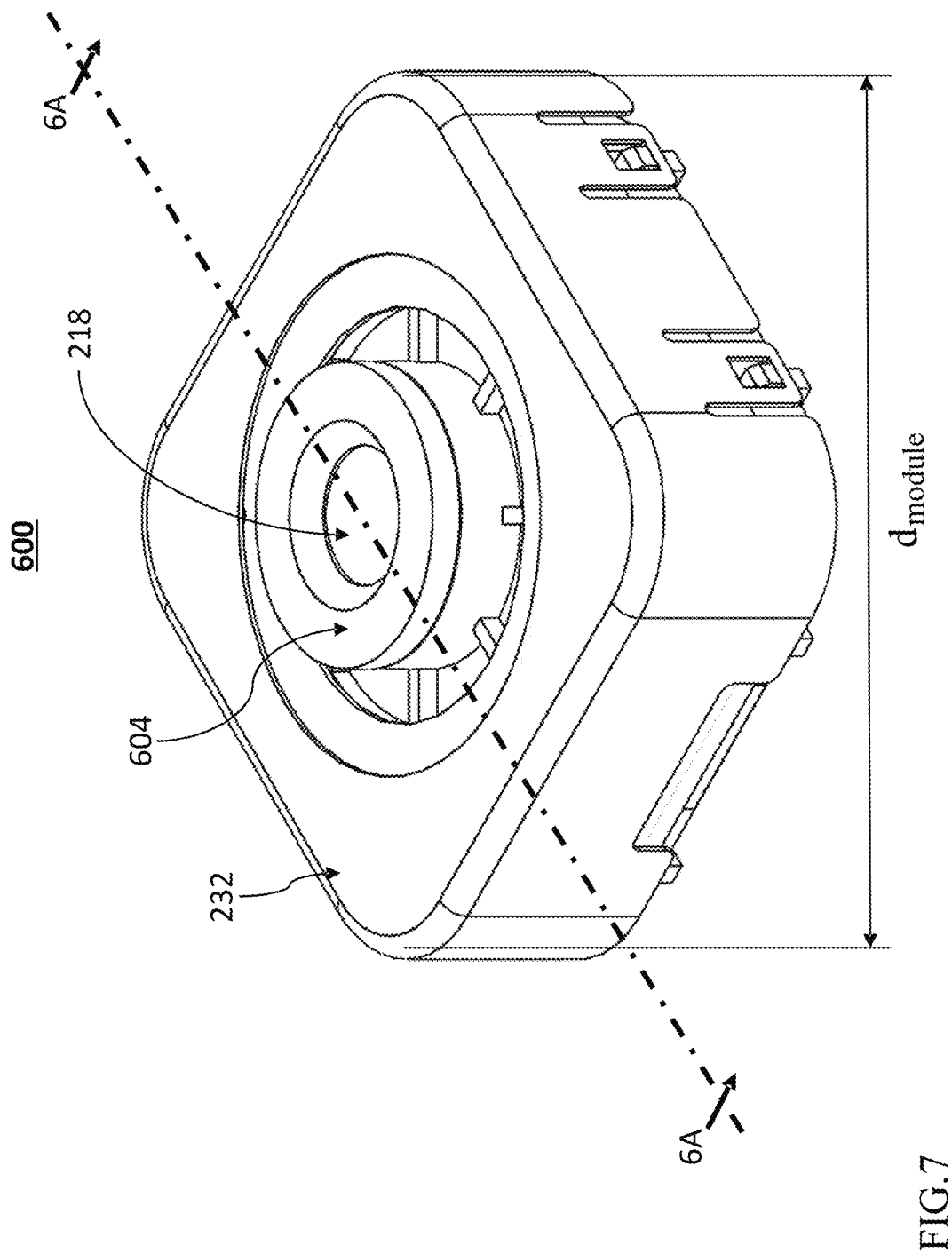
FIG. 7 shows a perspective view of the lens module of FIG. 6A.
Figure 8:
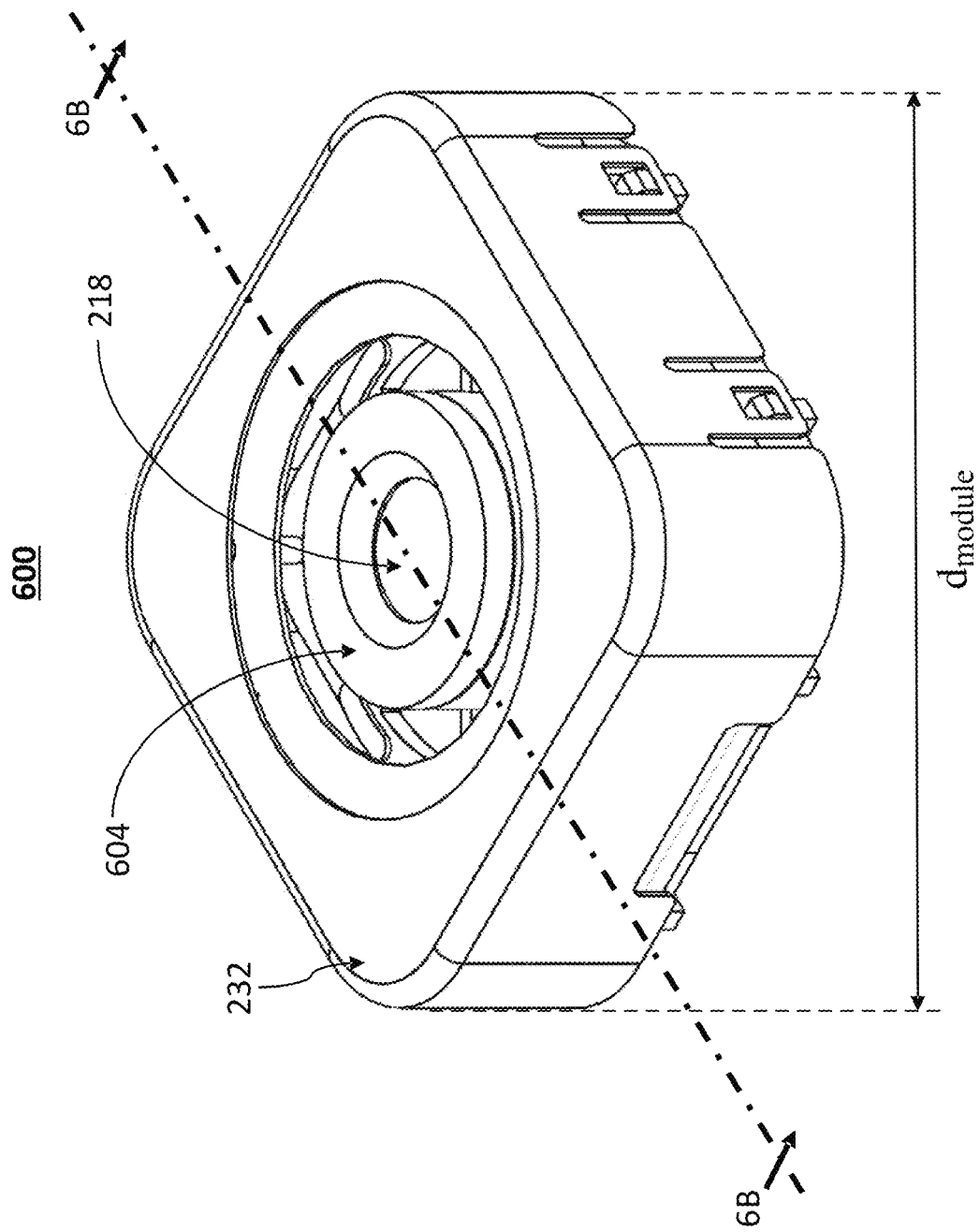
FIG. 8 shows a perspective view of the lens module of FIG. 6B.

FIG. 7 shows a perspective view of optics module 600 in a pop-out state. FIG. 8 shows a perspective view of optics module 600 in a collapsed state.

Figure 9A:
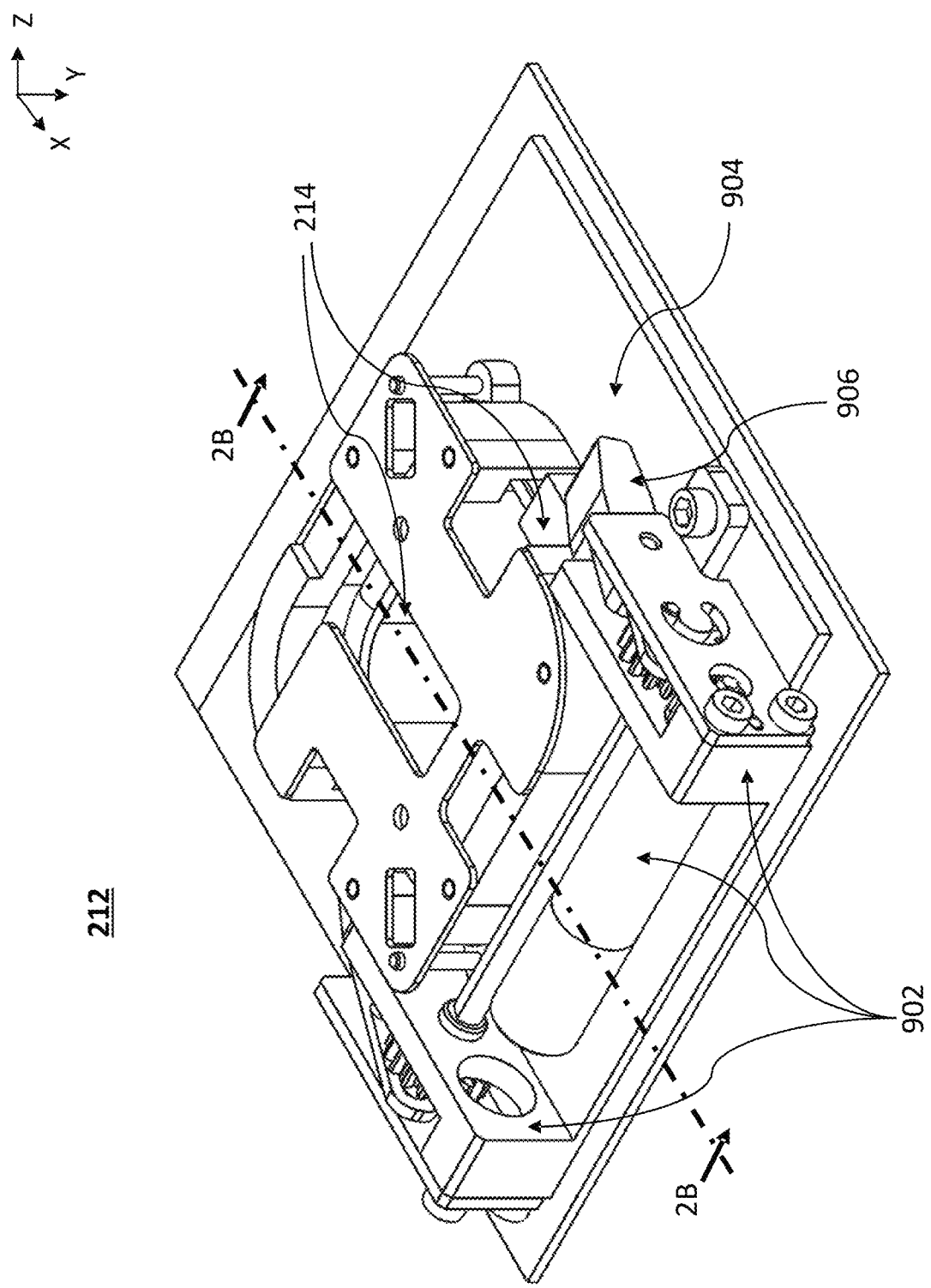
FIG. 9A shows a perspective view of an actuator of the pop-out mechanism in a pop-out state.
Figure 9B:
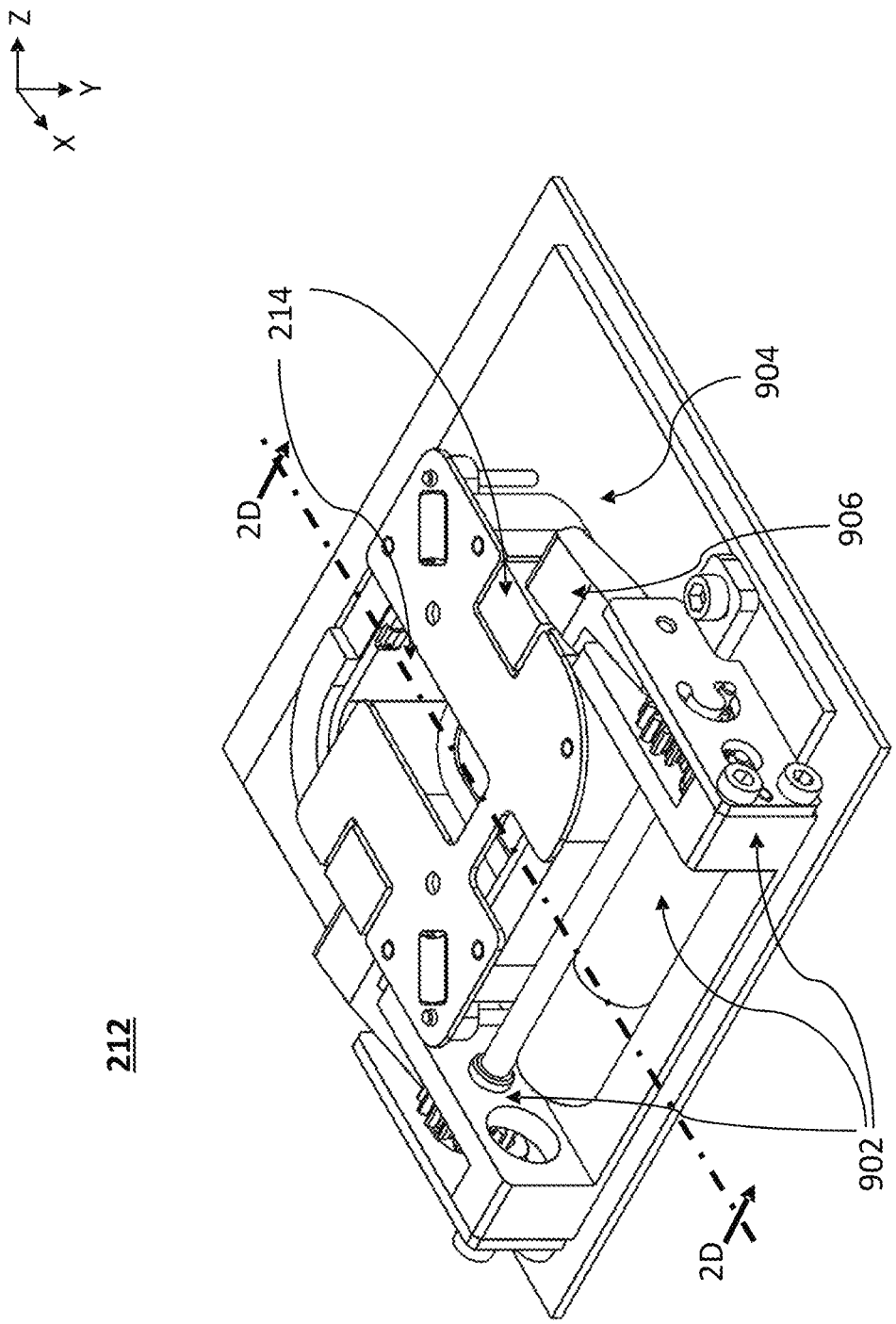
FIG. 9B shows a perspective view of the actuator of FIG. 9A in a collapsed state.

FIG. 9A shows a perspective view of actuator 212 in a pop-out state. FIG. 9B shows a perspective view of actuator 212 in a collapsed state. Cross sections 2B-2B and 2D-2D refer to respectively FIGS. 2B and 2D. Actuator 212 comprises a pop-out actuator 902 with moving parts for actuation. A pop-out actuator—window frame coupling 904 with a switch 906 translates the pop-out actuation to a movement of the window frame. Switch 906 couples actuator 902 with window frame 214. As indicated above, the window frame movement is used to switch the camera to the collapsed state. In FIG. 9A, switch 906 is "down" to provide the pop-out state. In FIG. 9B, switch 906 is "up" to provide the collapsed state.

FIG. 10 shows another lens system numbered 1000 that can be included in a pop-out Tele camera in a maximal pop-out state. Lens system 1000 includes a lens 1020 with five lens elements as shown, optical window 234 and image sensor 208. The Tele pop-out camera with lens system 1000 may be incorporated in a host device (e.g. a smartphone, tablet, etc., not shown here). Similar to the shown in FIG. 6A and FIG. 6B, in lens system 1000 switching between the pop-out and the collapsed states is obtained by modifying an air-gap d1006 between a first lens group 1016 and a second lens group 1018.

In lens system 1000, a first lens group 1016 includes lens elements 1002, 1004 and 1006 and a second lens group 1018 includes lens elements 1008 and 1010. In the pop-out state, air-gap d1006 between surface 1008a of lens element 1008 and surface 1006b of the immediately preceding lens element 1006 is 2.020 mm (see Table 10). The TTL of the lens system is 5.904 mm. The division into a first lens group and a second lens group is done according to the largest air-gap between two consecutive lens elements.

Lens system 1000 may provide a FOV of 25-50 degrees, and EFL=6.9 mm, a F number=2.80 and a TTL=5.904 mm. The ratio TTL/EFL is 0.86, i.e. EFL>TTL. The ratio cTTL/EFL may be 0.58-0.69. For air-gap d1006=TTL/2.95, so d1006>TTL/3. In other examples, for a largest air-gap that divides the lens elements into first and a second lens groups the air-gap may fulfill air-gap>TTL/5 and EFL>TTL.

The optical properties of lens system 1000 change when switching to the collapsed state (not shown). In the collapsed state, cTTL may be 3.97-10 mm and collapsed air-gap c-d1006 may be 0.05-0.85 mm. The difference between cTTL and TTL stems from a modified distance between first lens group 1016 and second lens group 1018. The distance between first lens group 1016 and image sensor 208 changed with respect to the pop-out state, but distance between second lens group 1016 and the image sensor 1014 did not change.

In lens system 1000, all lens element surfaces are aspheric. Detailed optical data is given in Table 10, and the aspheric surface data is given in Table 11, wherein the units of the radius of curvature (R), lens element thickness and/or distances between elements along the optical axis and diameter are expressed in mm. "Nd" is the refraction index. The equation of the aspheric surface profiles is expressed by:

$$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14}$$

where r is distance from (and perpendicular to) the optical axis, k is the conic coefficient, c=1/R where R is the radius of curvature, and $\alpha$ are coefficients given in Table 2. In the equation above as applied to examples of a lens assembly disclosed herein, coefficients $\alpha_1$ and $\alpha_7$ are zero. Note that the maximum value of r "max r"=Diameter/2. Also note that Table 1 the distances between various elements (and/or surfaces) are marked "Lmn" (where m refers to the lens element number, n=1 refers to the element thickness and n=2 refers to the air-gap to the next element) and are measured on the optical axis z, wherein the stop is at z=0. Each number is measured from the previous surface. Thus, the first distance −0.466 mm is measured from the stop to surface 1002a, the distance L11 from surface 1002a to surface 1002b (i.e. the thickness of first lens element 1002) is 0.894 mm, the gap L12 between surfaces 1002b and 1004a is 0.020 mm, the distance L21 between surfaces 1004a and 1004b (i.e. thickness d2 of second lens element 1004) is 0.246 mm, etc. Also, L21=$d_2$ and L51=$d_5$.

TABLE 10

Lens system 1000
EFL = 6.9 mm, F number = 2.80, FOV = 44 degrees

| # | Comment | Radius R [mm] | Distances [mm] | Nd/Vd | Diameter [mm] |
|---|---|---|---|---|---|
| 1 | Stop | Infinite | −0.466 | | 2.4 |
| 2 | L11 | 1.5800 | 0.894 | 1.5345/57.095 | 2.5 |
| 3 | L12 | −11.2003 | 0.020 | | 2.4 |
| 4 | L21 | 33.8670 | 0.246 | 1.63549/23.91 | 2.2 |
| 5 | L22 | 3.2281 | 0.449 | | 1.9 |
| 6 | L31 | −12.2843 | 0.290 | 1.5345/57.095 | 1.9 |

TABLE 10-continued

Lens system 1000
EFL = 6.9 mm, F number = 2.80, FOV = 44 degrees

| # | Comment | Radius R [mm] | Distances [mm] | Nd/Vd | Diameter [mm] |
|---|---------|---------------|----------------|-------|---------------|
| 7 | L32 | 7.7138 | 2.020 | | 1.8 |
| 8 | L41 | −2.3755 | 0.597 | 1.63549/23.91 | 3.3 |
| 9 | L42 | −1.8801 | 0.068 | | 3.6 |
| 10 | L51 | −1.8100 | 0.293 | 1.5345/57.095 | 3.9 |
| 11 | L52 | −5.2768 | 0.617 | | 4.3 |
| 12 | | Infinite | 0.410 | | 3.0 |

TABLE 11

| # | Conic coefficient k | $\alpha_2$ | $\alpha_3$ | $\alpha_4$ | $\alpha_5$ | $\alpha_6$ |
|---|---|---|---|---|---|---|
| 2 | −0.4668 | 7.9218E−03 | 2.3146E−02 | −3.3436E−02 | 2.3650E−02 | −9.2437E−03 |
| 3 | −9.8525 | 2.0102E−02 | 2.0647E−04 | 7.4394E−03 | −1.7529E−02 | 4.5206E−03 |
| 4 | 10.7569 | −1.9248E−03 | 8.6003E−02 | 1.1676E−02 | −4.0607E−02 | 1.3545E−02 |
| 5 | 1.4395 | 5.1029E−03 | 2.4578E−01 | −1.7734E−01 | 2.9848E−01 | −1.3320E−01 |
| 6 | 0.0000 | 2.1629E−01 | 4.0134E−02 | 1.3615E−02 | 2.5914E−03 | −1.2292E−02 |
| 7 | −9.8953 | 2.3297E−01 | 8.2917E−02 | −1.2725E−01 | 1.5691E−01 | −5.9624E−02 |
| 8 | 0.9938 | −1.3522E−02 | −7.0395E−03 | 1.4569E−02 | −1.5336E−02 | 4.3707E−03 |
| 9 | −6.8097 | −1.0654E−01 | 1.2933E−02 | 2.9548E−04 | −1.8317E−03 | 5.0111E−04 |
| 10 | −7.3161 | −1.8636E−01 | 8.3105E−02 | −1.8632E−02 | 2.4012E−03 | −1.2816E−04 |
| 11 | 0.0000 | −1.1927E−01 | 7.0245E−02 | −2.0735E−02 | 2.6418E−03 | −1.1576E−04 |

Advantageously, the Abbe number of the first, third and fifth lens element is 57.095. Advantageously, the first air-gap between lens elements 1002 and 1004 (the gap between surfaces 1002*b* and 1004*a*) has a thickness (0.020 mm) which is less than a tenth of thickness $d_2$ (0.246 mm). Advantageously, the Abbe number of the second and fourth lens elements is 23.91. Advantageously, the third air-gap between lens elements 1006 and 1008 has a thickness (2.020 mm) greater than TTL/5 (5.904/5 mm). Advantageously, the fourth air-gap between lens elements 108 and 110 has a thickness (0.068 mm) which is smaller than $d_5/2$ (0.293/2 mm).

The focal length (in mm) of each lens element in lens system 1000 is as follows: f1=2.645, f2=−5.578, f3=−8.784, f4=9.550 and f5=−5.290. The condition 1.2×|f3|>|f2|<1.5× f1 is clearly satisfied, as 1.2×8.787>5.578>1.5×2.645. f1 also fulfills the condition f1<TTL/2, as 2.645<2.952.

FIG. 11A shows an example of a host device 1100 such as a smartphone with a dual-camera comprising a regular (non pop-up) folded Tele camera 1102 and a Wide pop-out camera 1104. The Wide camera 1104 is in an operative pop-out state and extends the device's exterior surface 228. Bump 226 is visible. A large image sensor such as 208 (not visible here) and a pop-out frame such as frame 220 (not fully visible here) required for switching between a collapsed and a pop-out camera state define a minimum area of the device's exterior surface 228 that is covered by the pop-out camera (in X-Z). The minimum pop-out camera area may be larger than that of folded Tele cameras or that of regular (i.e. non pop-out) upright Wide cameras that are typically included in a device.

Figure 11B:
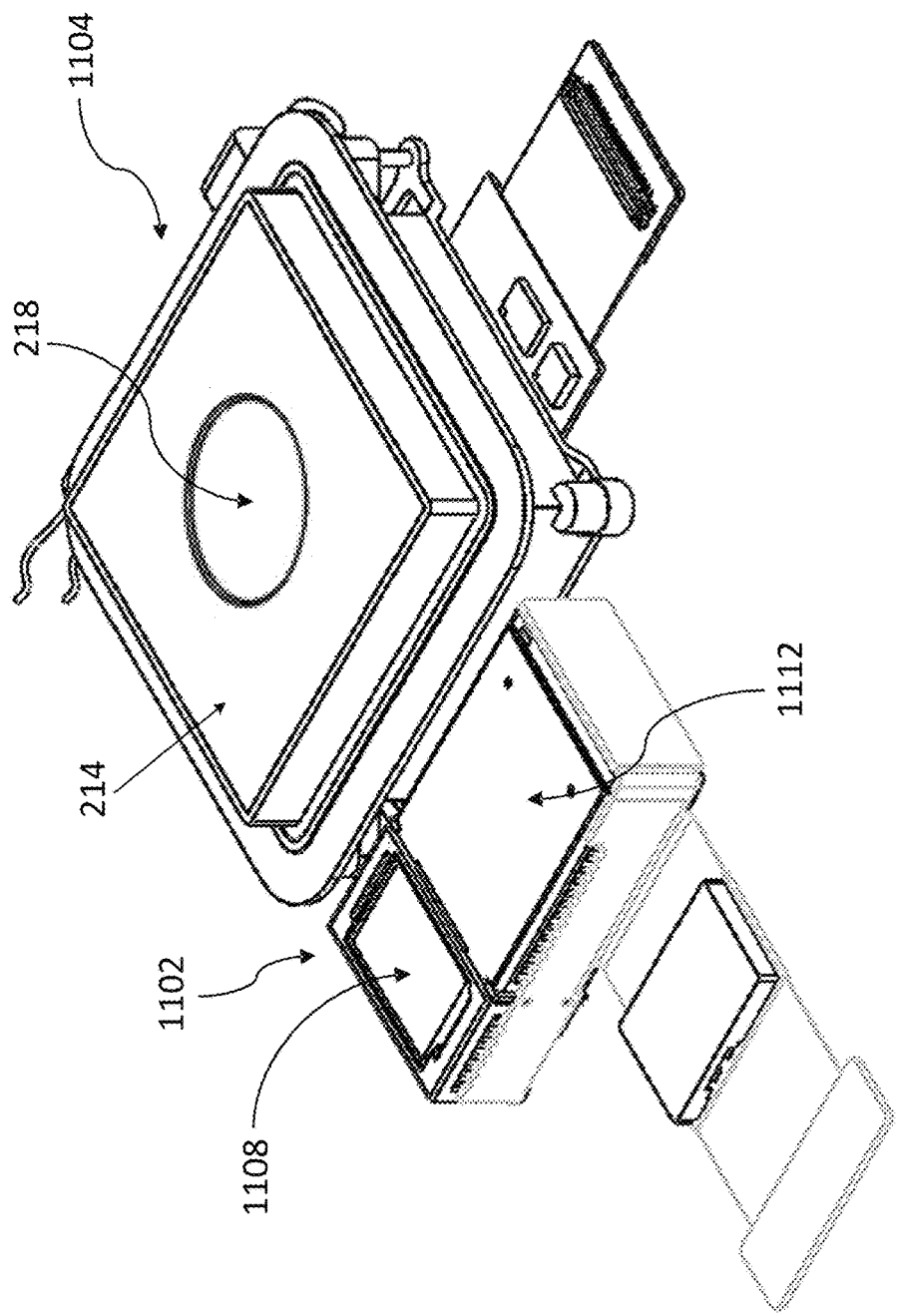
FIG. 11B shows details of the cameras of FIG. 11A with the Wide pop-out camera being in a pop out state.

FIG. 11B shows details of folded Tele camera 1102 and the upright Wide camera 1104 in a pop out state. The folded Tele camera comprises a prism 1108 and a folded Tele lens and sensor module 1112. In FIG. 11A and FIG. 11B only prism 1108 is visible.

Figure 11C:
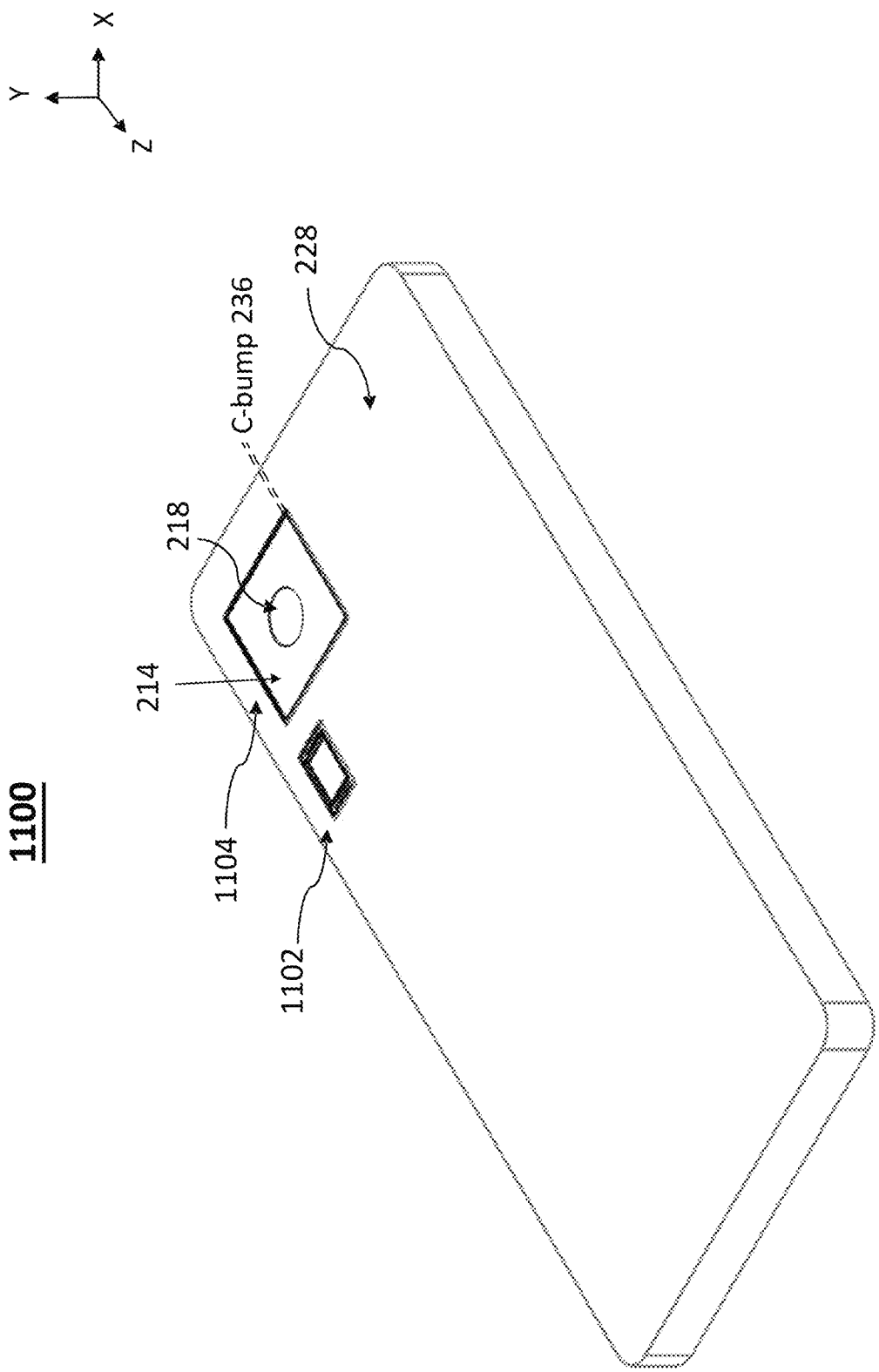
FIG. 11C shows the smartphone of FIG. 11A with the Wide pop-out camera in a collapsed state.

FIG. 11C shows host device 1100 with Wide camera 1104 in a collapsed state, illustrating the small height of the c-bump.

Figure 11D:
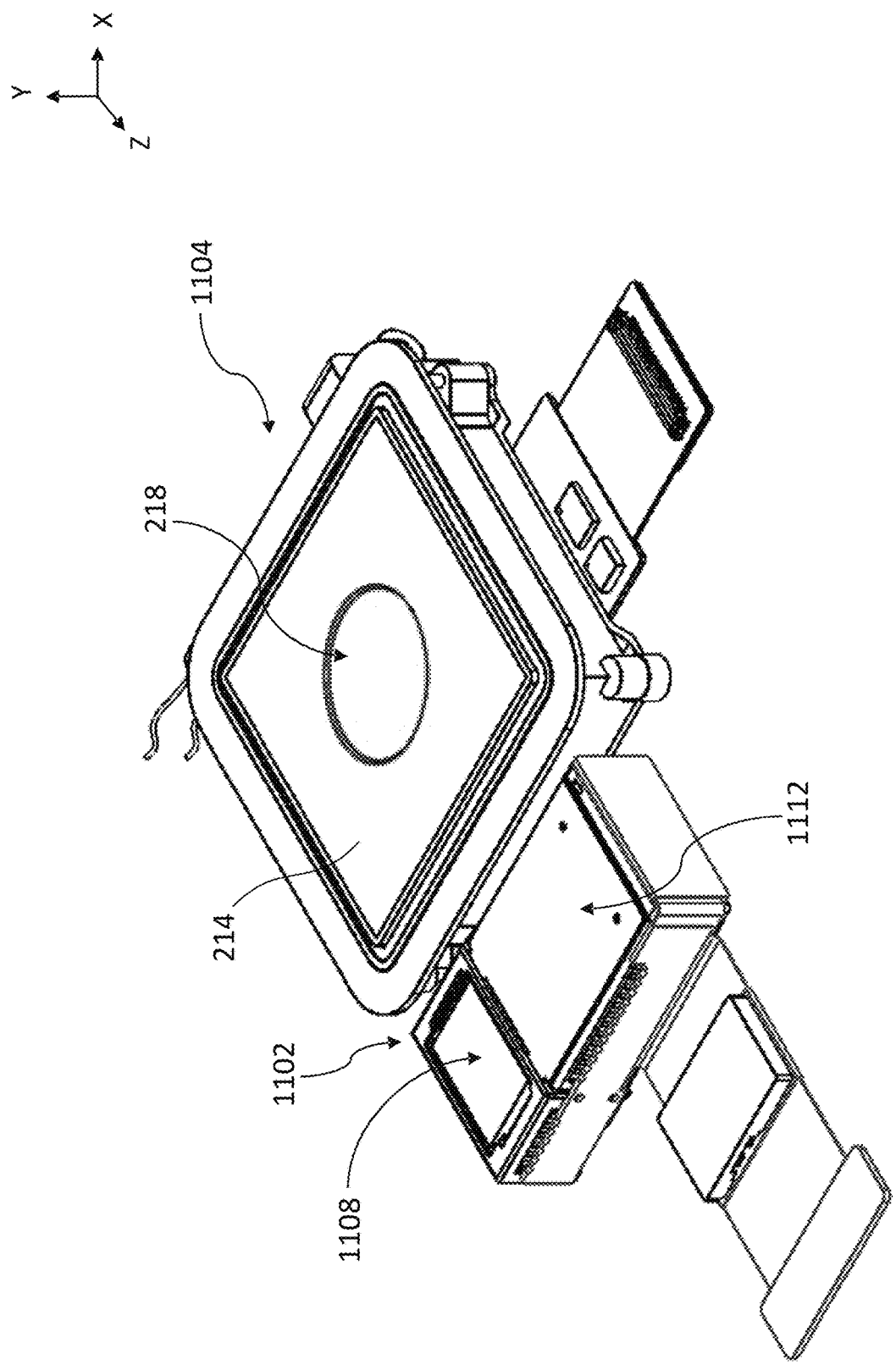
FIG. 11D shows details of the cameras of FIG. 11A, with the Wide pop-out camera being in a collapsed state.

FIG. 11D shows details of the folded Tele camera and the upright Wide camera in a collapsed state.

Figure 12A:
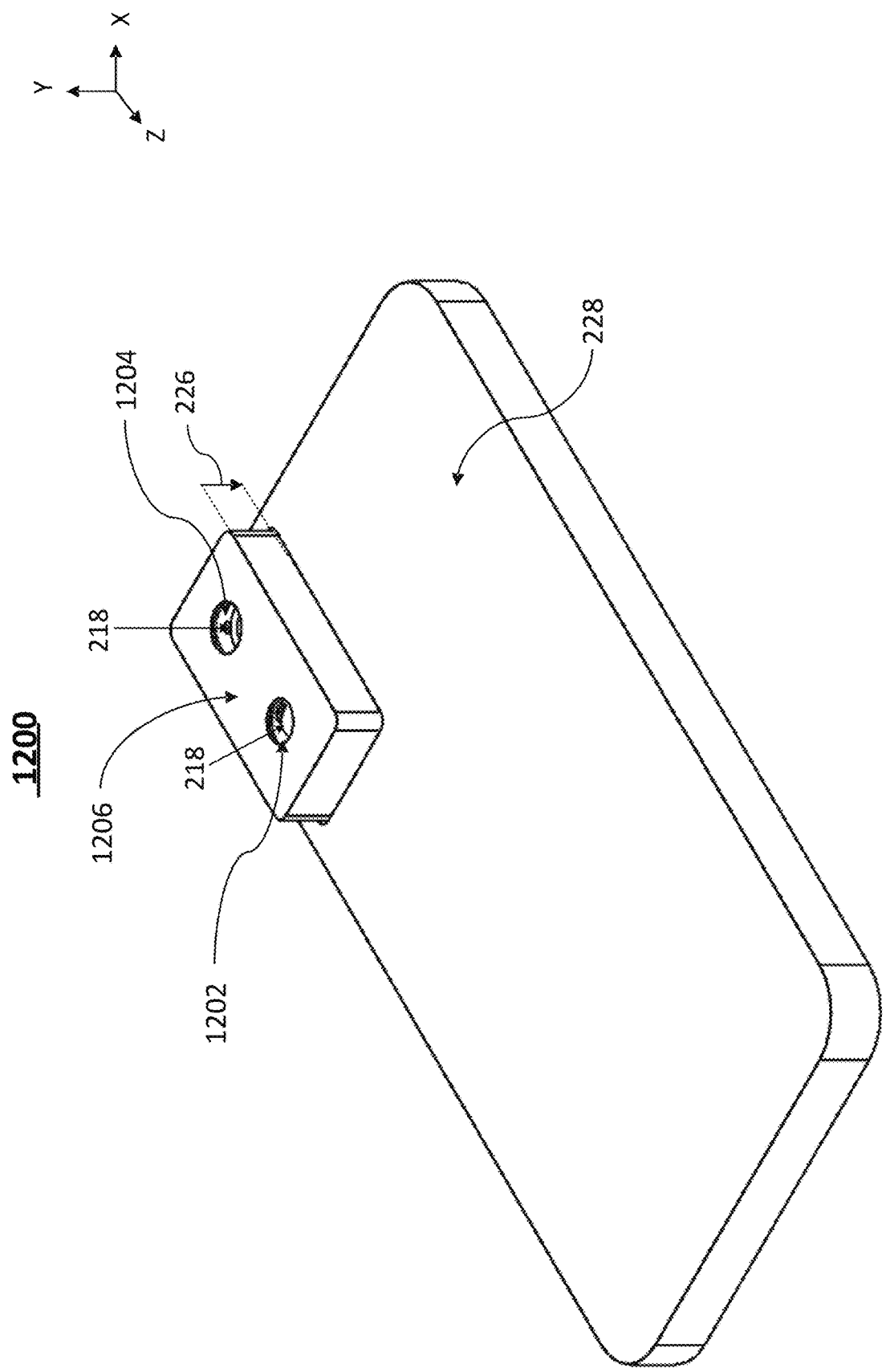
FIG. 12A shows another example of a smartphone with a dual-camera comprising an upright Tele camera and an upright Wide camera, with both cameras in a pop-out state.

FIG. 12A shows another example of a host device 1200 such as a smartphone with a dual-camera comprising a Tele pop-out camera 1202 as disclosed herein and a Wide pop-out camera 1204 in an operative pop-out state. Pop-out bump 226 is visible. A pop-out mechanism cover 1206 covers both the Tele and the Wide camera. A frame like 220 (not shown) switches the Tele and the Wide camera between a pop-out state and a collapsed state together and simultaneously. Pins 1208 may provide mechanical stability and repeatability in the X-Z plane. In some examples, 2 pins may be included. In other examples, 3 or more pins may be used.

Figure 12B:
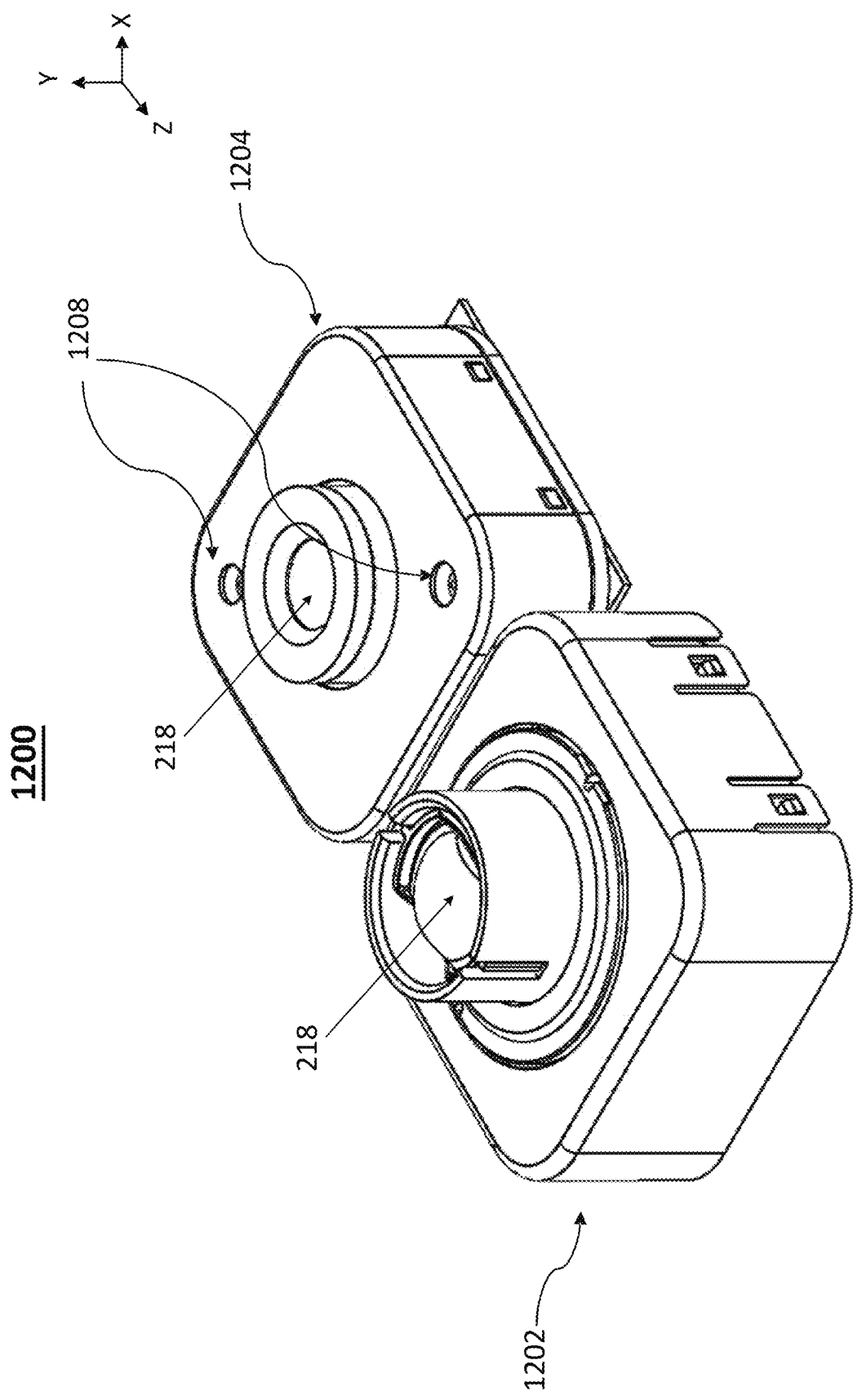
FIG. 12B shows details of the cameras of the smartphone in FIG. 12A in a pop-out state.

FIG. 12B shows details of upright Tele camera 1202 and upright Wide camera 1204, with both cameras in the pop-out state.

Figure 12C:
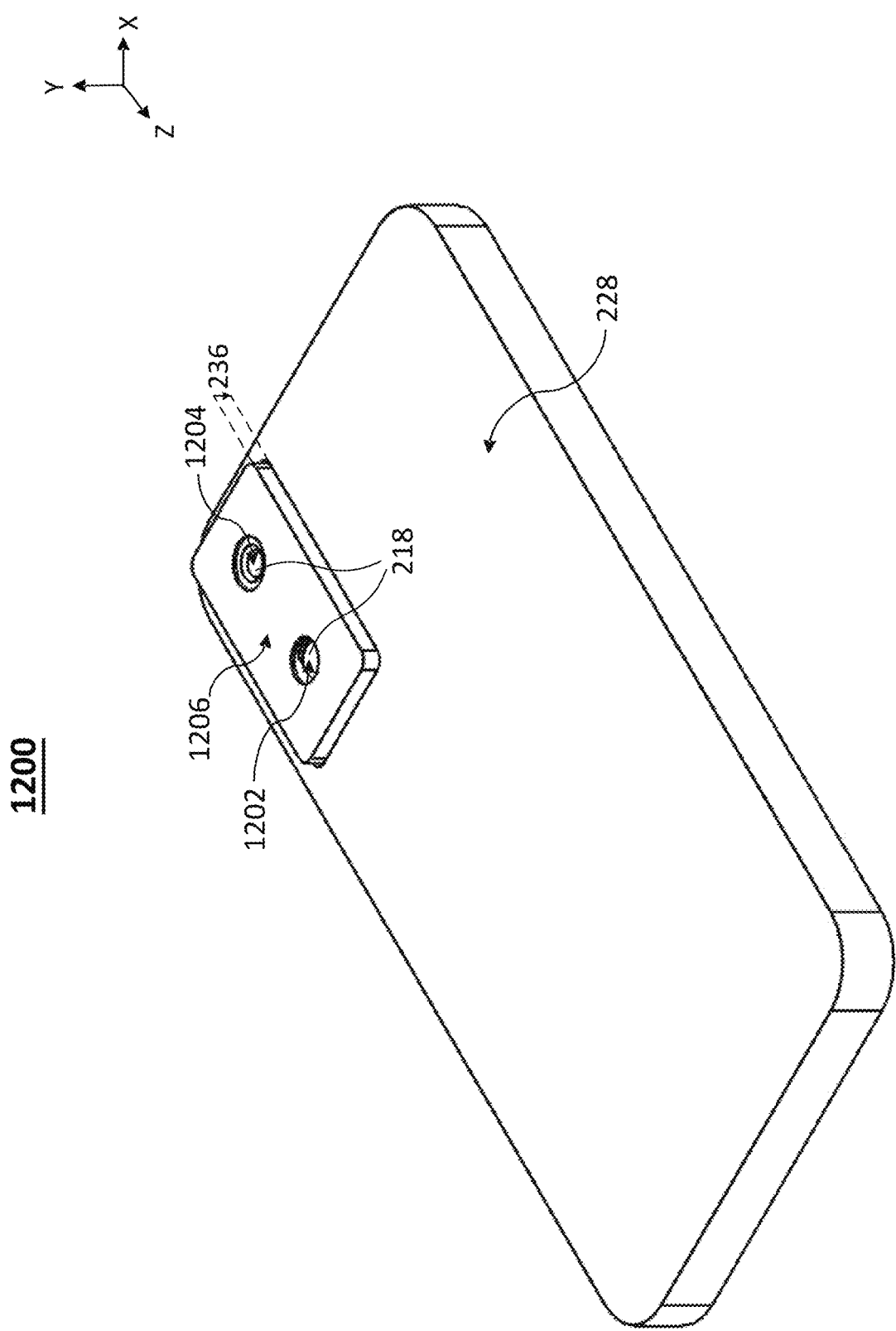
FIG. 12C shows the smartphone of FIG. 12A with both cameras in a collapsed state.
Figure 12D:
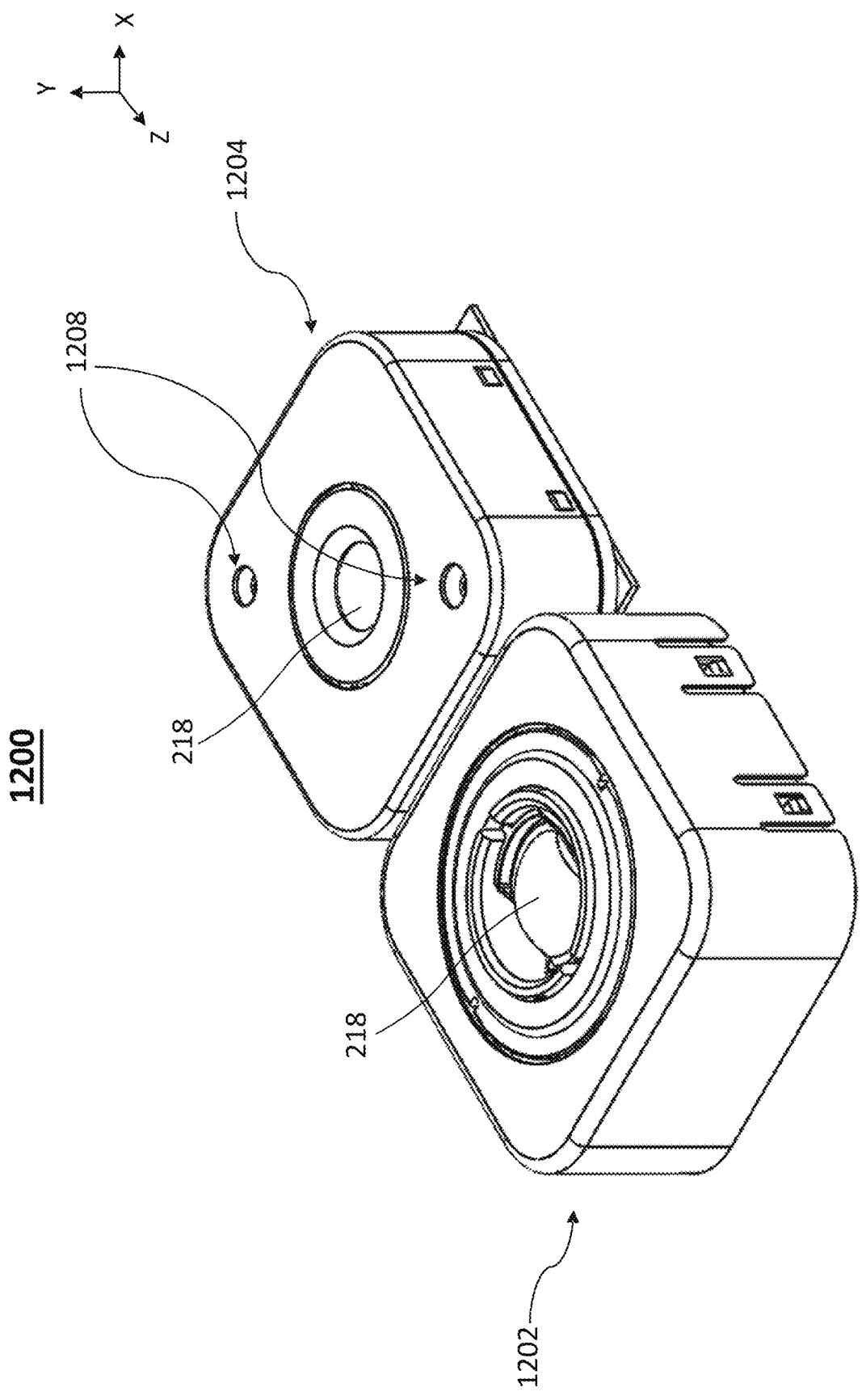
FIG. 12D shows details of the cameras of the smartphone in FIG. 12A in a collapsed state.

FIG. 12C shows host device 1200 with the cameras in a collapsed state. A c-bump 236 is shown. FIG. 12E shows details of upright Tele camera 1202 and upright Wide camera 1204, with both cameras in the collapsed state.

FIG. 13 shows yet another example of a lens system numbered 1300 comprising a lens 1320 including seven lens elements L1-L7, optionally optical window 234, and an image sensor 208. Here, image sensor 208 is a curved image sensor, meaning that its light collecting surface is curved with a radius of curvature R=−19.026 mm wherein the "−" sign refers to a curvature with center at the object side of the image sensor. Use of a curved image sensor may be beneficial as undesired effects such as field curvature and shading toward the sensor edges may be less than for a planar image sensor. Lens system 1300 may be used in a camera such camera 200 in a pop-out state. The design data is given in Tables 12-14.

In lens system 1300, TTL=8.28 mm, BFL=3.24 mm, EFL=6.95 mm, F number=1.85 and the FOV=80.52 deg.

In the collapsed state (see FIG. 2C), cTTL may be 6.54-10 mm. The difference between cTTL and TTL stems from a modified BFL which is now a collapsed "c-BFL" (see FIG. 5A). c-BFL may be 1.494-2.5 mm. The optical properties of lens 1320 do not change when switching between a pop-out state and a collapsed state (i.e. all distances between the lens elements L1-L7 and the lens surfaces S2-S15 did not change).

TABLE 12

Lens system 1300
EFL = 6.95 mm, F number = 1.85, FOV = 80.52 deg.

| Surface # | Comment | Type | Curvature Radius | Thickness | Aperture Radius (D/2) | Material | Index | Abbe # | Focal Length |
|---|---|---|---|---|---|---|---|---|---|
| | A.S | Plano | Infinity | −0.681 | 1.879 | | | | |
| | Lens 1 | QT1 | 2.791 | 0.577 | 1.879 | Plastic | 1.54 | 55.9 | 11.01 |
| | | | 4.824 | 0.426 | 1.824 | | | | |
| | Lens 2 | QT1 | 5.964 | 0.244 | 1.824 | Plastic | 1.67 | 19.4 | −12.73 |
| | | | 3.463 | 0.005 | 1.795 | | | | |
| | Lens 3 | QT1 | 3.871 | 0.959 | 1.814 | Plastic | 1.54 | 55.9 | 7.85 |
| | | | 35.947 | 0.452 | 1.783 | | | | |
| | Lens 4 | QT1 | −134.398 | 0.458 | 1.812 | Plastic | 1.66 | 20.37 | 63.02 |
| | | | −32.072 | 0.342 | 2.004 | | | | |
| | Lens 5 | QT1 | −4.466 | 0.252 | 2.096 | Plastic | 1.57 | 37.4 | −10.23 |
| | | | −19.576 | 0.286 | 2.280 | | | | |
| | Lens 6 | QT1 | 7.072 | 0.364 | 2.336 | Plastic | 1.54 | 55.9 | 3.95 |
| | | | −3.047 | 0.203 | 2.714 | | | | |
| | Lens 7 | QT1 | −7.929 | 0.478 | 3.717 | Plastic | 1.54 | 55.9 | −5.59 |
| | | | 5.074 | 1.744 | 4.108 | | | | |
| | Filter | Plano | Infinity | 0.2100 | — | Glass | 1.52 | 64.2 | |
| | | | Infinity | 1.284 | — | | | | |
| | Image | Plano | −19.026 | — | — | | | | |

TABLE 13

Aspheric Coefficients

| Surface # | $R_{norm}$ | A0 | A1 | A2 | A3 |
|---|---|---|---|---|---|
| 2 | 2.170 | 6.97E−02 | 6.81E−02 | 4.19E−02 | 1.88E−02 |
| 3 | 2.170 | 1.92E−01 | 1.54E−01 | 7.45E−02 | 2.62E−02 |
| 4 | 1.891 | −1.23E−01 | 2.32E−02 | −4.13E−04 | −3.43E−04 |
| 5 | 1.891 | −1.59E−01 | 2.59E−02 | −6.88E−03 | −1.68E−03 |
| 6 | 1.891 | −3.55E−03 | 3.14E−02 | 3.10E−03 | 1.53E−03 |
| 7 | 1.891 | −4.64E−02 | 2.24E−02 | 1.31E−02 | 5.48E−03 |
| 8 | 2.225 | −5.98E−01 | 1.18E−01 | 8.64E−02 | 1.98E−02 |
| 9 | 2.225 | −4.13E−01 | 9.40E−02 | 1.01E−01 | 5.25E−02 |
| 10 | 2.670 | −3.70E−01 | −1.57E−01 | −7.49E−02 | 3.70E−02 |
| 11 | 2.670 | −6.73E−01 | 2.51E−01 | −1.90E−01 | −1.12E−02 |
| 12 | 3.671 | −3.40E+00 | 9.02E−01 | −4.45E−01 | 5.39E−02 |
| 13 | 3.671 | 3.45E+00 | 5.97E−02 | −2.00E−01 | −2.88E−02 |
| 14 | 5.340 | 2.76E+00 | 7.29E−02 | 5.26E−04 | −1.83E−01 |
| 15 | 5.340 | −6.08E+00 | 7.69E−02 | −7.67E−01 | −1.27E−01 |

TABLE 14

Aspheric Coefficients

| Surface # | A4 | A5 | A6 | A7 | A8 |
|---|---|---|---|---|---|
| 2 | 6.08E−03 | 1.29E−03 | 1.49E−04 | 0.00E+00 | 0.00E+00 |
| 3 | 6.42E−03 | 1.10E−03 | 1.85E−04 | 0.00E+00 | 0.00E+00 |
| 4 | −6.39E−04 | −2.45E−04 | −7.91E−05 | 0.00E+00 | 0.00E+00 |
| 5 | −1.32E−03 | −9.94E−06 | 1.50E−04 | 0.00E+00 | 0.00E+00 |
| 6 | −4.90E−05 | 3.53E−04 | 2.69E−04 | 0.00E+00 | 0.00E+00 |
| 7 | 2.07E−03 | 6.57E−04 | 1.36E−04 | 0.00E+00 | 0.00E+00 |
| 8 | 3.42E−04 | −1.45E−03 | −8.99E−04 | 0.00E+00 | 0.00E+00 |
| 9 | 1.74E−02 | 5.33E−03 | 4.89E−04 | 0.00E+00 | 0.00E+00 |
| 10 | −3.53E−02 | −1.64E−02 | −1.34E−02 | 0.00E+00 | 0.00E+00 |
| 11 | −4.40E−02 | −4.87E−03 | −1.09E−02 | 0.00E+00 | 0.00E+00 |
| 12 | −1.00E−02 | −3.74E−02 | −5.14E−02 | 9.87E−03 | 1.02E−02 |
| 13 | −2.41E−02 | 5.41E−02 | 4.32E−02 | 1.11E−02 | 7.56E−03 |
| 14 | −2.94E−01 | −1.73E−01 | −8.86E−02 | −1.66E−02 | −2.06E−03 |
| 15 | −1.78E−01 | −7.01E−02 | −5.97E−02 | −2.09E−02 | −8.43E−03 |

In other examples, optical window 234 may be curved. A radius of curvature $R_W$ of the optical window may be of same sign as the radius of curvature R of curved image sensor 208 (i.e. with a center at the object side of the optical window) and may be curved in a similar way, so $R_W$ may e.g. be $R_W$=−15 to −25 mm. In another example may be $R_W$=R, with R being radius of curvature of the curved image sensor. This may allow for a smaller cTTL. cTTL may be 5.64-7.54 mm and c-BFL may be 0.594-2.5 mm.

Figure 14A:
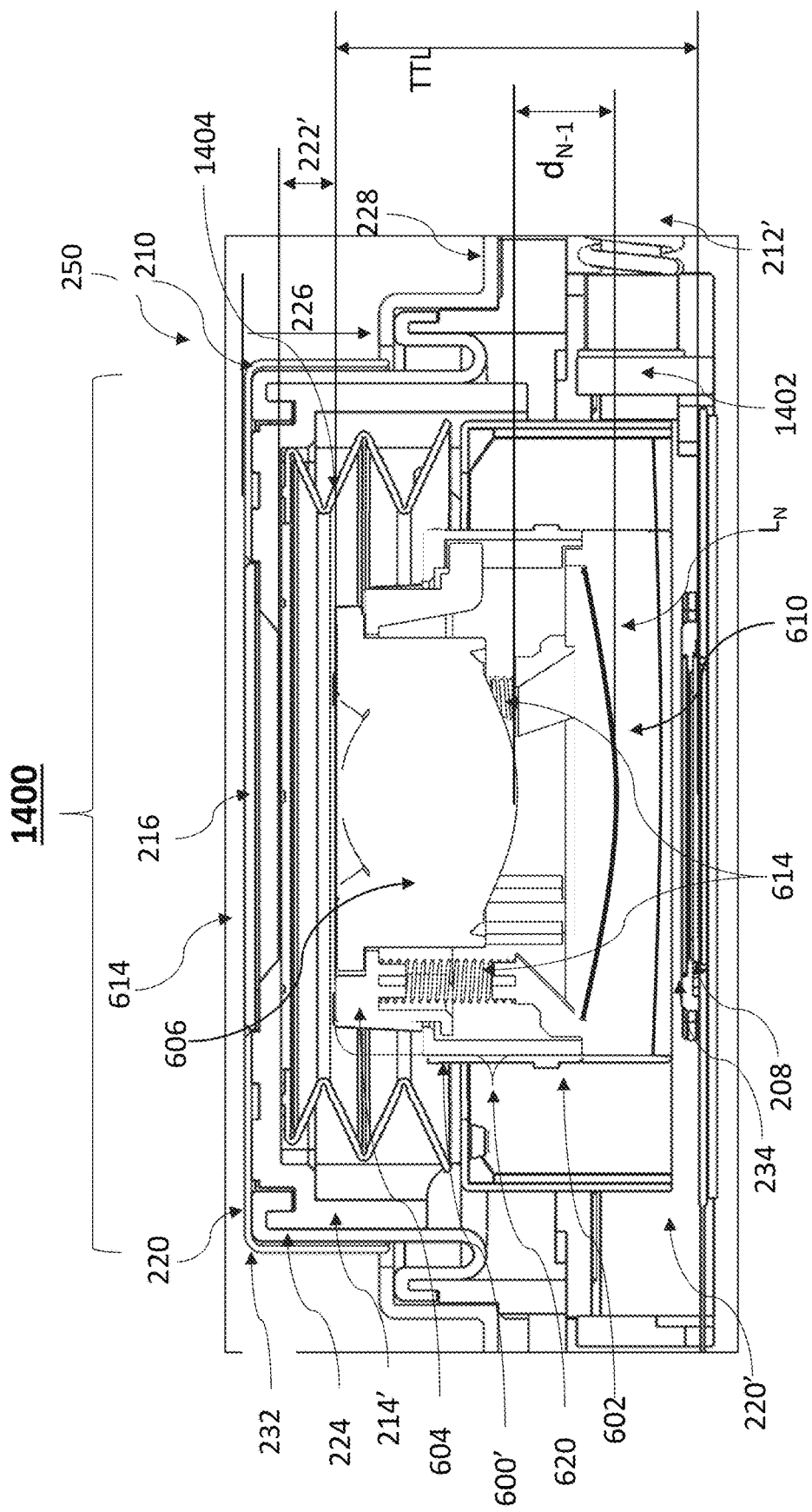
FIG. 14A shows in cross sectional view another example of a pop-out camera disclosed herein in a pop-out state and incorporated in a host device.
Figure 14B:
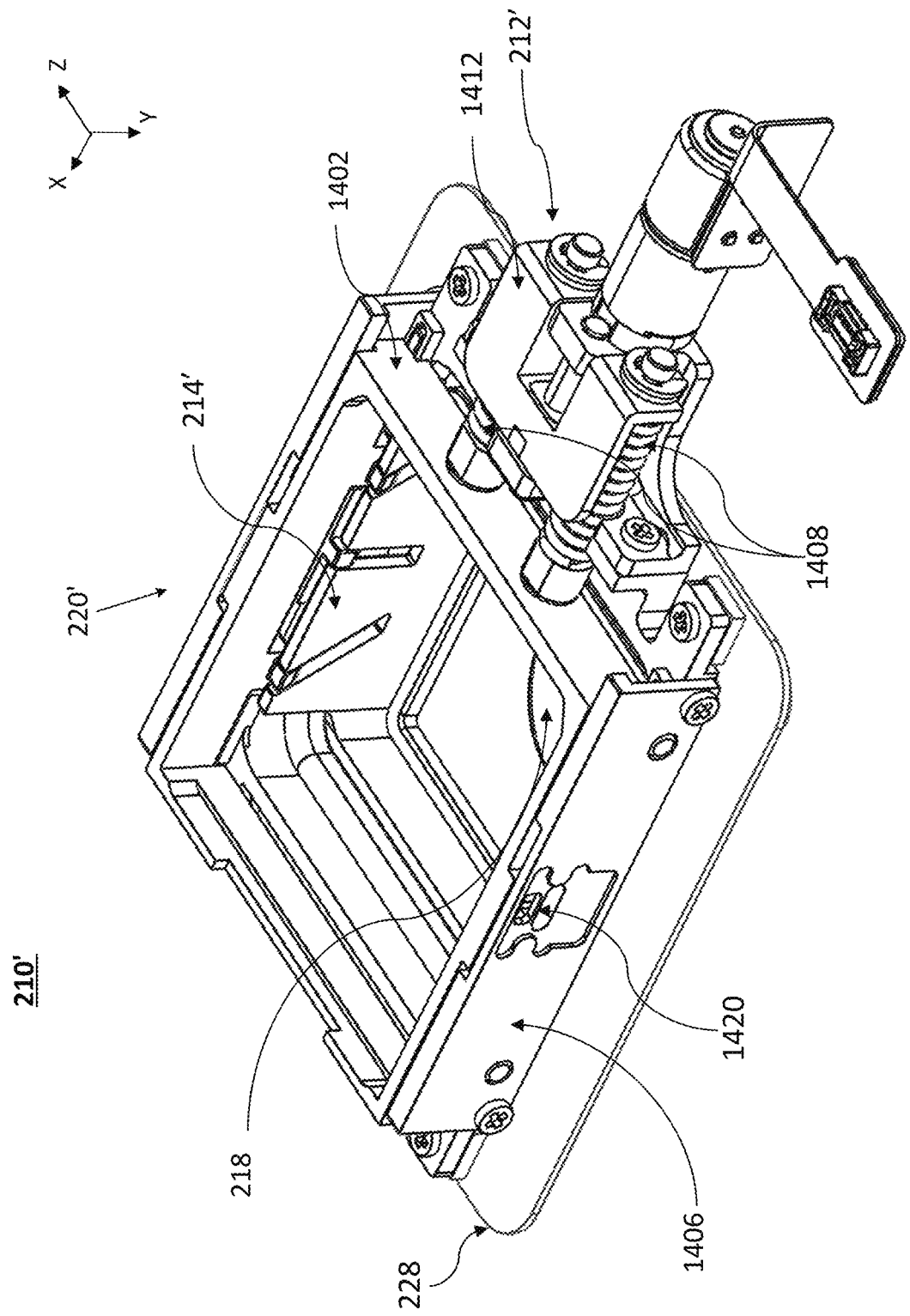
FIG. 14B shows a perspective view of a frame in the pop-out camera of FIG. 14A.

FIG. 14A shows in cross sectional view another example numbered 1400 of a pop-out camera disclosed herein in a pop-out state and incorporated in a "host" device 250 (e.g. a smartphone, tablet, etc.). Camera 1400 comprises a pop-out frame 220' and an optics module 600' that includes a lens 620. As shown in FIG. 14B, frame 220' comprises a window frame 214', a cam follower 1402 and a side limiter 1406. Cam follower 1402 is coupled via springs 1408 to a pop-out actuator 1408. Optics module 600' includes a lens barrel 602 with a collapsible lens barrel section (first barrel section) 604 carrying a first lens group 606, and a fixed lens barrel section (second barrel section) 608 carrying a second lens group 610. The two lens groups form a lens 620 that includes altogether N lens elements L1-LN, arranged with a first lens element L1 on an object side and a last lens element LN on an image side. Lens 620, an optional optical window 234 and image sensor 208 form a lens system 630.

Camera 1400 comprises an external module seal 224 and an internal module seal 1404. External seal 224 prevents particles and fluids from entering device 250. Seal 224 may support a IP68 class ranking of device 250. Internal seal 1404 prevents particles from entering optics module 600'.

"External" and "internal" refer to the fact that seal 224 prevents contamination of the camera from outside the host device, while seal 1404 prevents contamination of the camera from inside the host device.

Optics module 600' and window frame 214 form an air-gap 222' between the lens barrel and window 216, which may be for example 0.1 mm-3 mm. Air-gap 222' allows for a movement of the lens barrel by 0.1-3 mm for performing auto-focus (AF) and optical image stabilization (OIS) by moving lens 620 or parts of lens 620 or optics module 600' or sensor 208 as known in the art.

Camera 1400 forms a significant pop-out bump 226 with respect to an exterior surface 228 of device 250. Here, "significant" may be for example 1.5 mm-12 mm. In the pop-out state, camera 1400 increases the height of host device 250 to a height in a pop-out state.

Lens 620 may have N≥4 lens elements, and, as mentioned, comprises a barrel with two lens barrel sections. In other examples, the lens barrel may comprise more than two barrel sections with more lens groups, e.g. 3, 4, 5 lens barrel sections with each barrel section carrying a lens group. The lens barrel sections may be divided into fixed barrel sections and movable barrel sections. In the example shown, first lens group 606 includes lenses L1-LN−1 and second lens group 610 includes lens LN (see FIG. 14A). Air-gaps may be formed between lens groups according to their relative movement. In examples with more than two barrel sections, some or all barrel sections may be movable and have respective air-gaps formed between the lens groups. The air-gaps between lens groups may collapse in a non-operative camera state. The sum of such air-gaps may be 1-12 mm. In the pop-out state, air-gap $d_{N-1}$ may be 1-5.5 mm. Three springs 614 (not all visible here) push first lens barrel section 604 towards a mechanical stop. The mechanical stop may be provided by a kinematic coupling mechanism as shown in FIGS. 18A-B and FIGS. 19A-B. In other examples and as shown in FIG. 20C, the mechanical stop may be provided by a top cover 1606'. In some examples, the camera in pop-out state may be designed to support tolerances for decenter of e.g. ±20 μm in the X-Z plane and of e.g. ±10 μm in the Y direction, as well as a tilt of ±0.2° of the lens barrel with respect to image sensor 208. In other examples, tolerances for decenter may be e.g. ±2-10 μm in the X-Z plane and of e.g. ±2-10 μm in the Y direction, as well as e.g. ±0.05°-0.15° for a tilt of lens barrel with respect to the image sensor Y.

The TTL of the lens may be 5-22 mm. The image sensor diagonal may be 6 mm<sensor diagonal<30 mm. The eqFL may be 15 mm<equivalent focal length<200 mm. The TTL/EFL ratio may vary in the range 0.7<TTL/EFL<1.5.

Figure 20A:
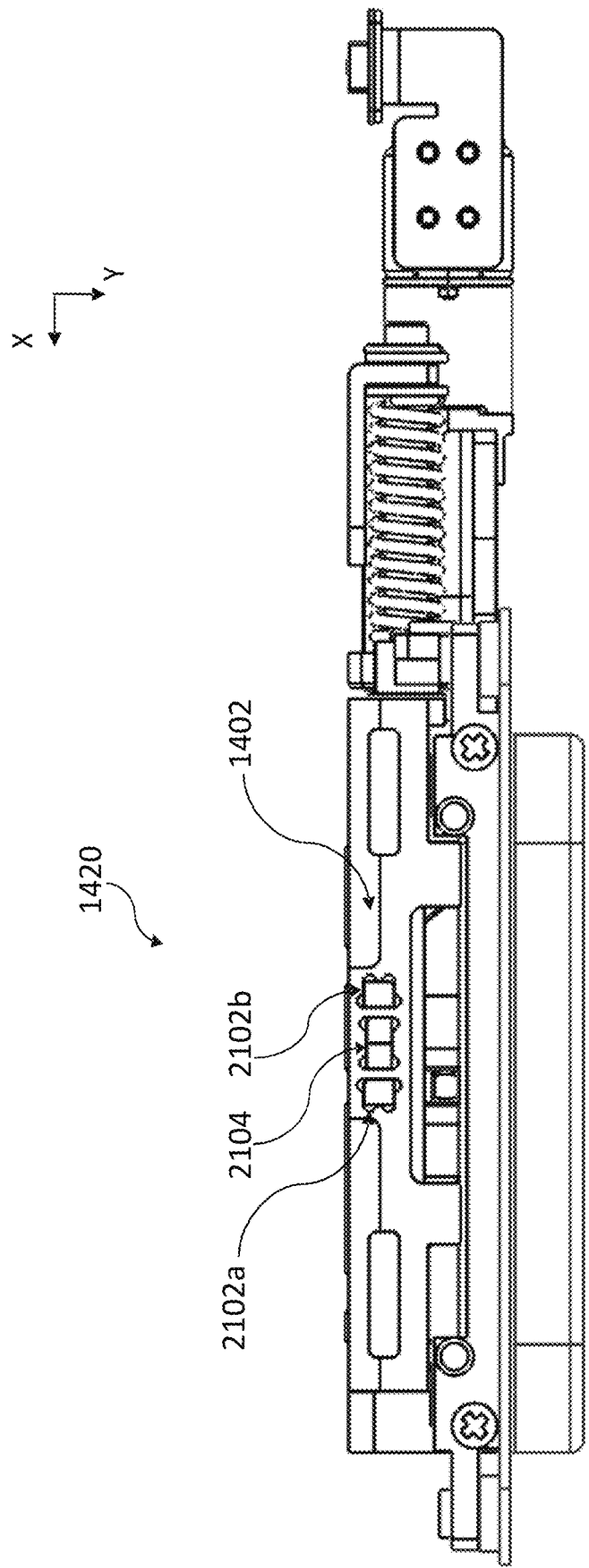
FIG. 20A shows a magnet part of window position measurement mechanism in a side view.
Figure 20B:
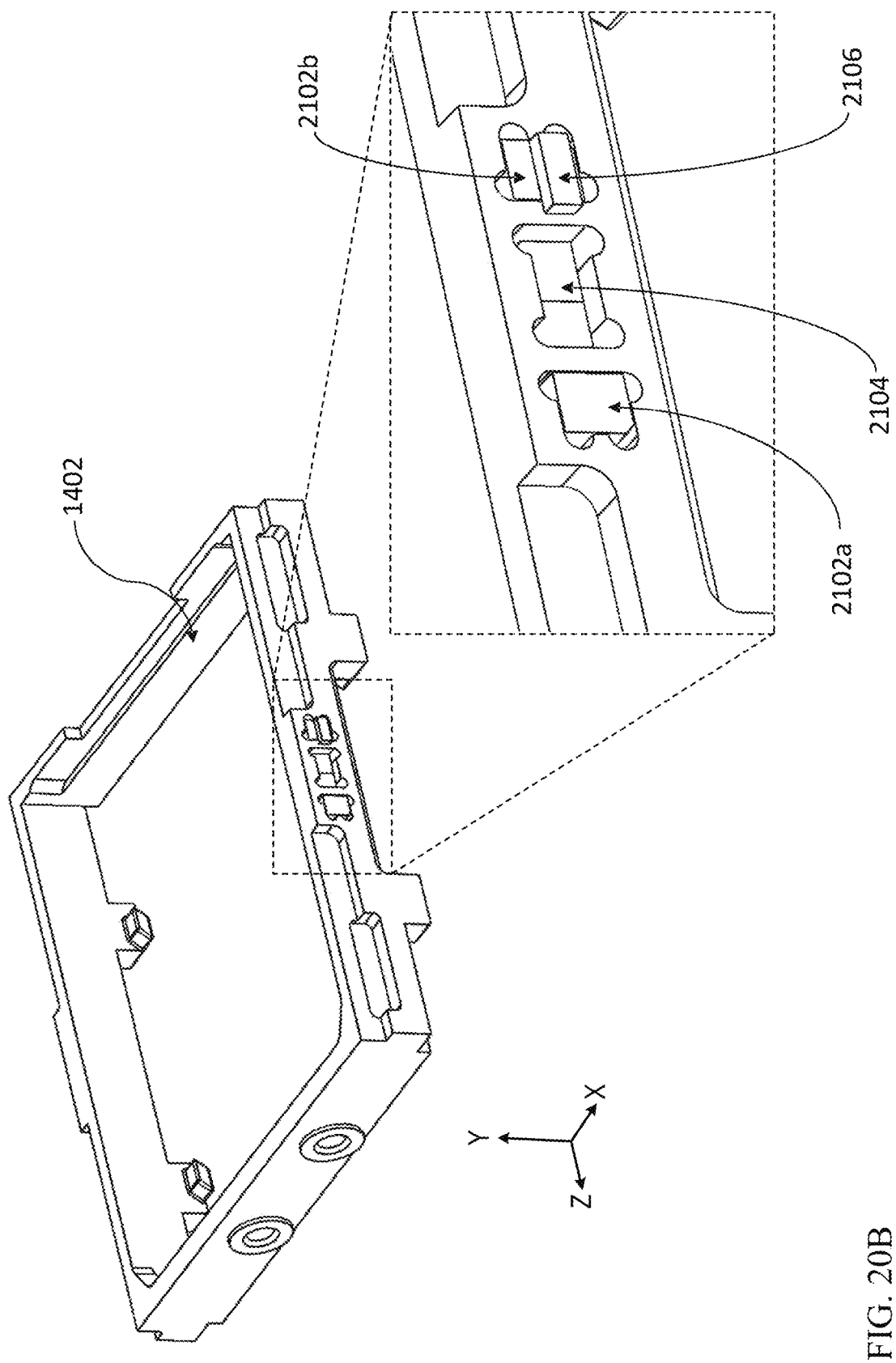
FIG. 20B shows the window position measurement mechanism of FIG. 20A in a perspective view.
Figure 20E:
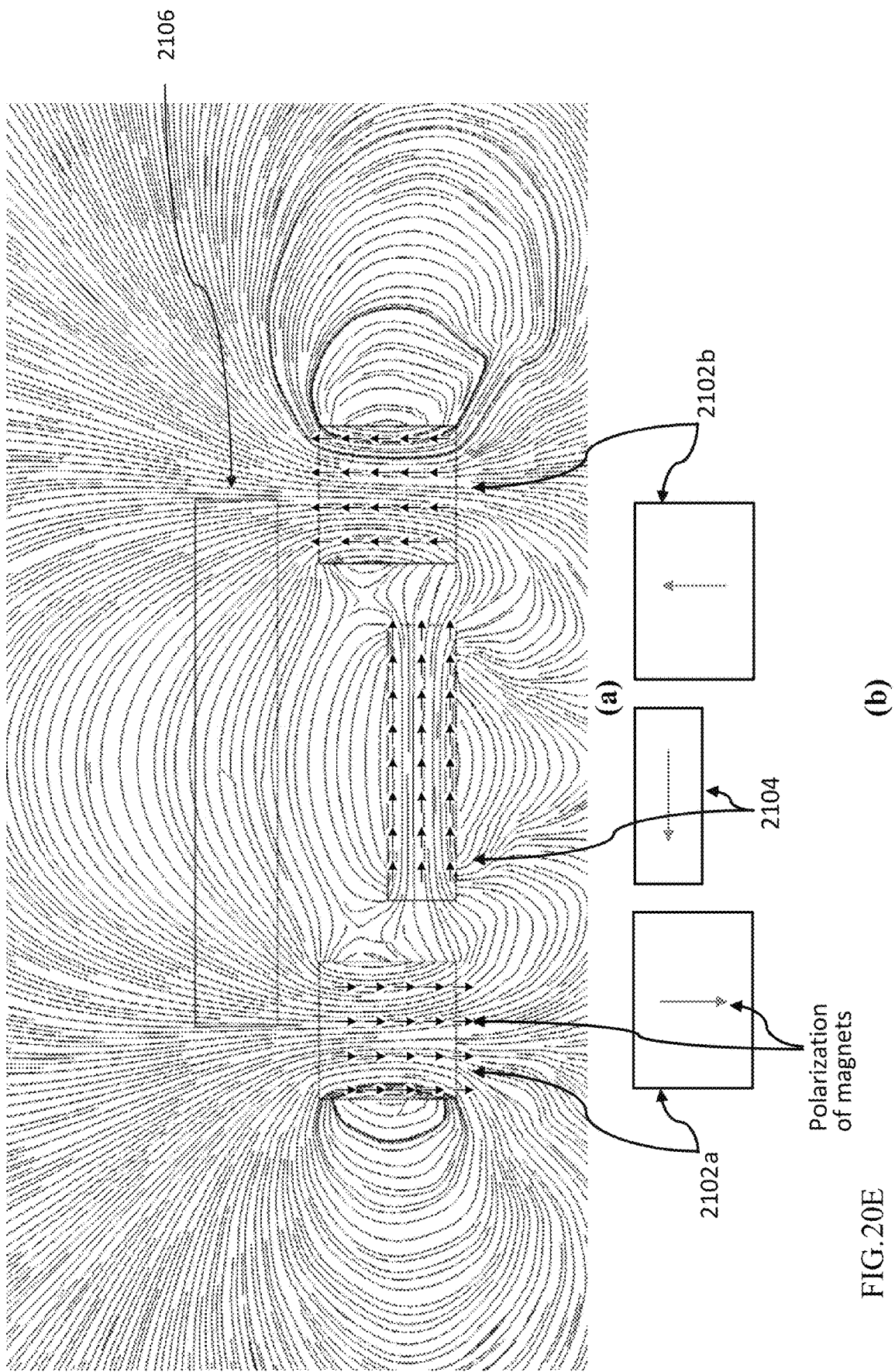
FIG. 20E shows an example of a design and magnetic field of the window position measurement mechanism of FIG. 20A.

A window position measurement mechanism 1420 shown in FIG. 14B comprises one or more magnets and one or more Hall sensors shown in FIGS. 20C-E. The magnets are fixedly coupled to a cam follower 1402, and the Hall sensor(s) is (are) fixedly coupled to a side limiter 1406. Mechanism 1420 senses the position of the cam follower relative to side limiter 1406 and host device 250. The camera is mechanically coupled to the host device and the side limiter is mechanically coupled to the camera.

FIG. 14B shows a perspective view of frame 220' in a pop-out state. A pop-out camera such as 1400 is formed when optics module 600' is inserted into frame 220'. Window frame 214', cam follower 1402 and side limiter 1406 move with respect to each other. Window frame 214' and cam follower 1402 also move with respect to host device 250, but side limiter 1406 does not move with respect to host device 250. Camera 1400 is switched from a pop-out state to a collapsed state by moving window frame 214' in a positive X direction with respect of host device 250 and side limiter 1406. Window frame 214' is moved by actuator 212' via cam follower 1402. The movement of cam follower 1402 is substantially parallel to the X axis, and this movement is translated in a movement of window frame 214' substantially parallel to the Y axis. This translation of movements in X direction and in Y direction is described in FIG. 15A-B. As for the movement along Y, window frame 214' applies pressure to the lens barrel that translates into a movement of the collapsible lens barrel section towards the image sensor. Cam follower 1402 is coupled via springs 1408 to a pop-out actuator 1412. Actuator 1412 moves cam follower 1402 e.g. via a screw stepper motor or another actuation method. The movement is mediated by the springs 1408. Springs 1408 may act as shock absorber for camera 1400. E.g. when host device 250 is dropped and hits another object, a large force may act on window frame 214'. By means of springs 1408, this large force may be translated into a collapse of the pop-out camera, thereby mediating a large portion of the large force. Internal module seal 1404 may act as an additional shock absorber.

Figure 14C:
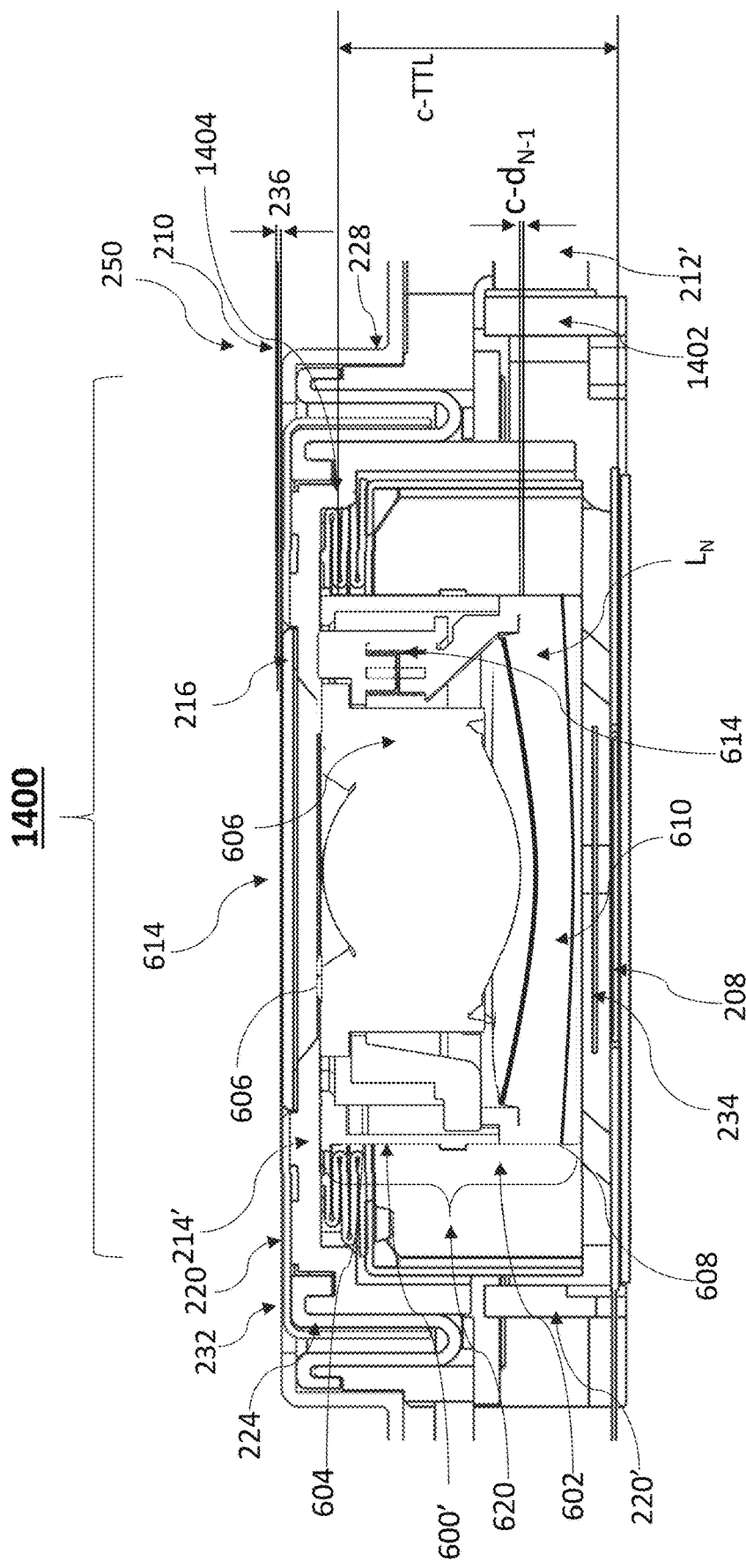
FIG. 14C shows in cross section the camera of FIG. 14A in a collapsed state.
Figure 14D:
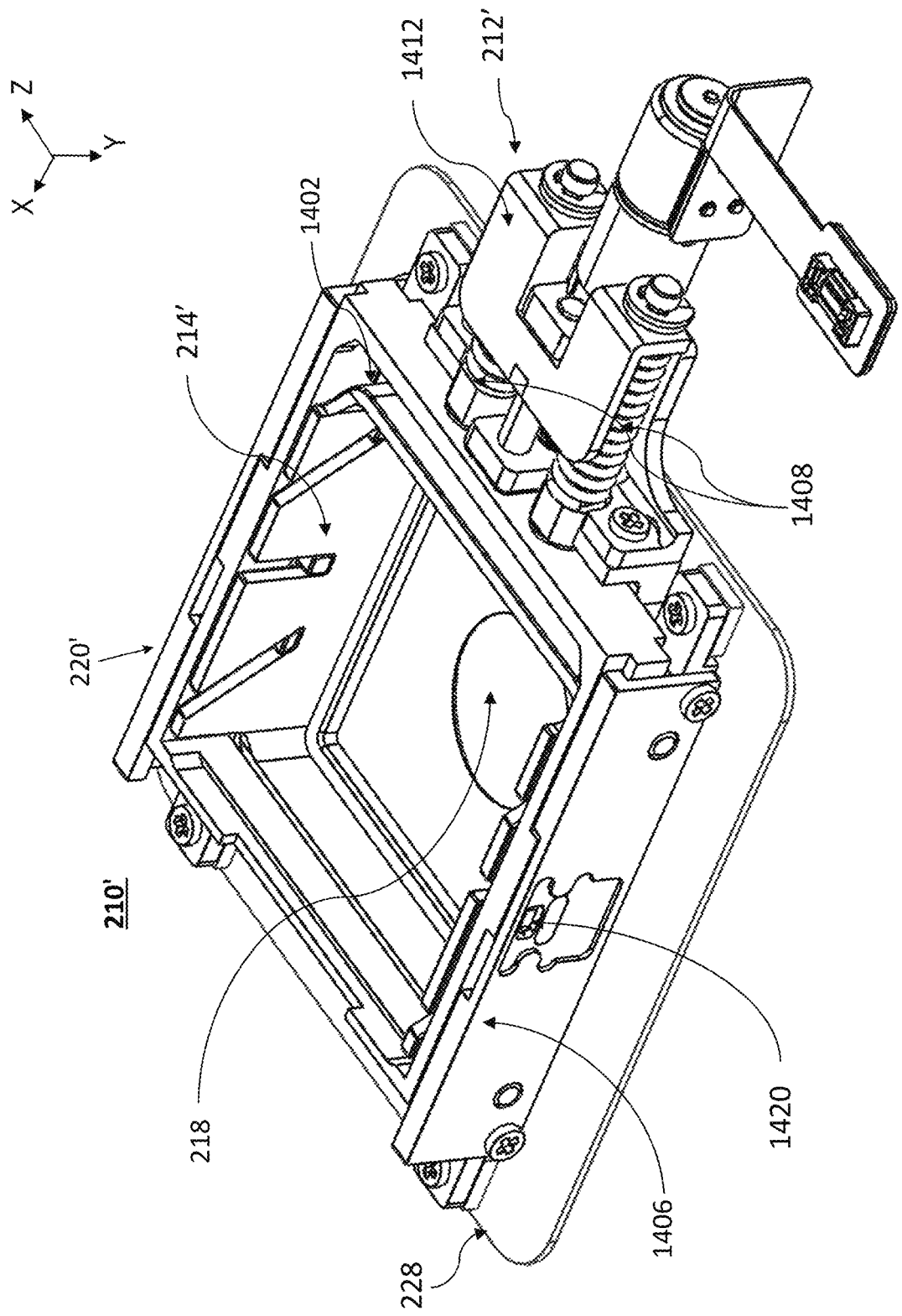
FIG. 14D shows a perspective view of the frame of FIG. 14B in a collapsed state.

FIG. 14C shows a cross sectional view of camera 1400 in a collapsed ("c") or non-operative state. FIG. 14D shows a perspective view of frame 220' in a collapsed state. To switch optics module 600' to the collapsed state, actuator 212' decreases air-gap $d_{N-1}$ by moving the window frame 214' to apply pressure to the lens barrel that translates into a movement of the collapsible lens barrel section towards the image sensor. In the collapsed state, cTTL may be 5-12 mm. and collapsed air-gap c-$d_{N-1}$ may be 0.05-1.5 mm.

Figure 15A:
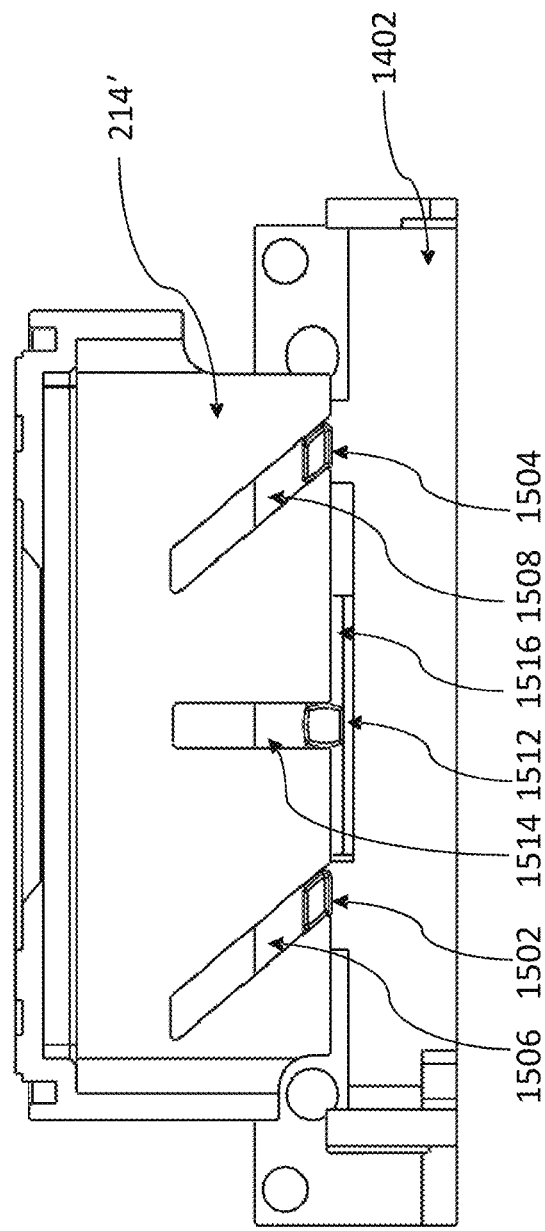
FIG. 15A shows in cross-section a pop-out mechanism in the camera of FIG. 14A.

FIG. 15A shows the frame 220' of example 1400 in a cross sectional view via X-Y plane in a pop-out state. A switching pin 1502 and a switching pin 1504 are rigidly coupled to cam follower 1402. A side limiter pin 1512 is fixedly coupled to side limiter 1406 and slides within a vertically oriented limiter groove 1514. Switching pin 1502 and 1504 slide within switching grooves 1506 and 1508. Switching pins 1502 and 1504 have a diamond shape which is superposed by a curvature having a large radius of curvature for minimizing contact stress acting between the pins and window frame 214'. Side limiter pin 1512 has a rectangular shape superposed by a curvature having a large radius of curvature for minimizing contact stress.

When cam follower 1402 is moved in a negative X direction, the inclination of switching grooves 1506 and 1508 leads to a downward movement (in a negative Y direction) of window frame 214'. This downward movement is used to switch the camera to the collapsed state. The downward movement is limited and guided by side limiter pin 1512. The inclination of switching grooves 1506 and 1508 may e.g. be between 20-80 degrees with respect to a vertical Y axis.

Figure 15B:
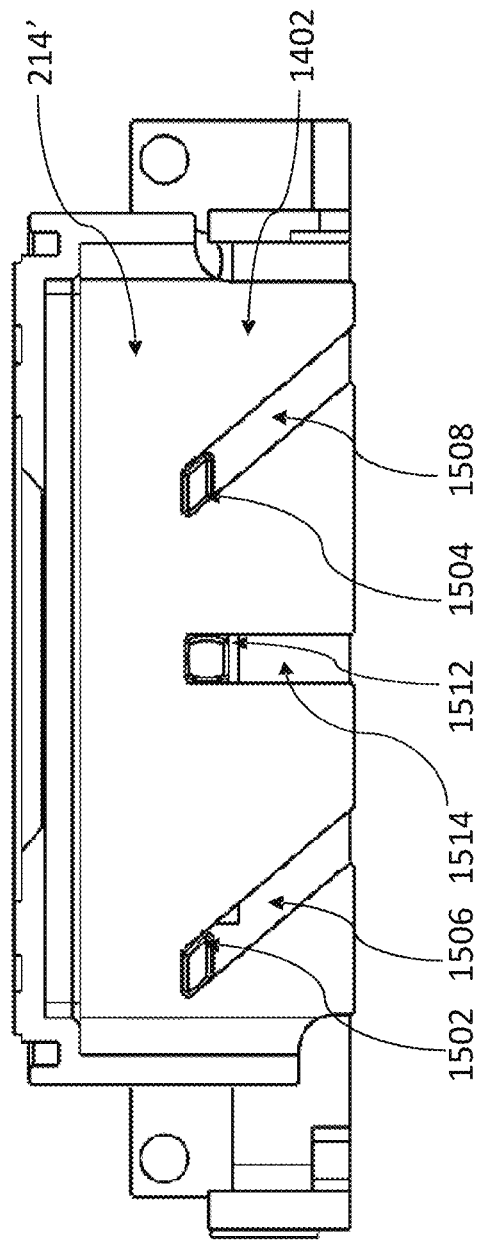
FIG. 15B shows the mechanism of FIG. 15A in a collapsed state.

FIG. 15B shows the frame 220' of FIG. 15A in a collapsed state. To switch the camera from the collapsed state to a pop-out state, cam follower 1402 is moved in a positive X direction and the inclination of switching grooves 1506 and 1508 leads to an upward movement (in a positive Y direction) of window frame 214'.

Figure 16B:
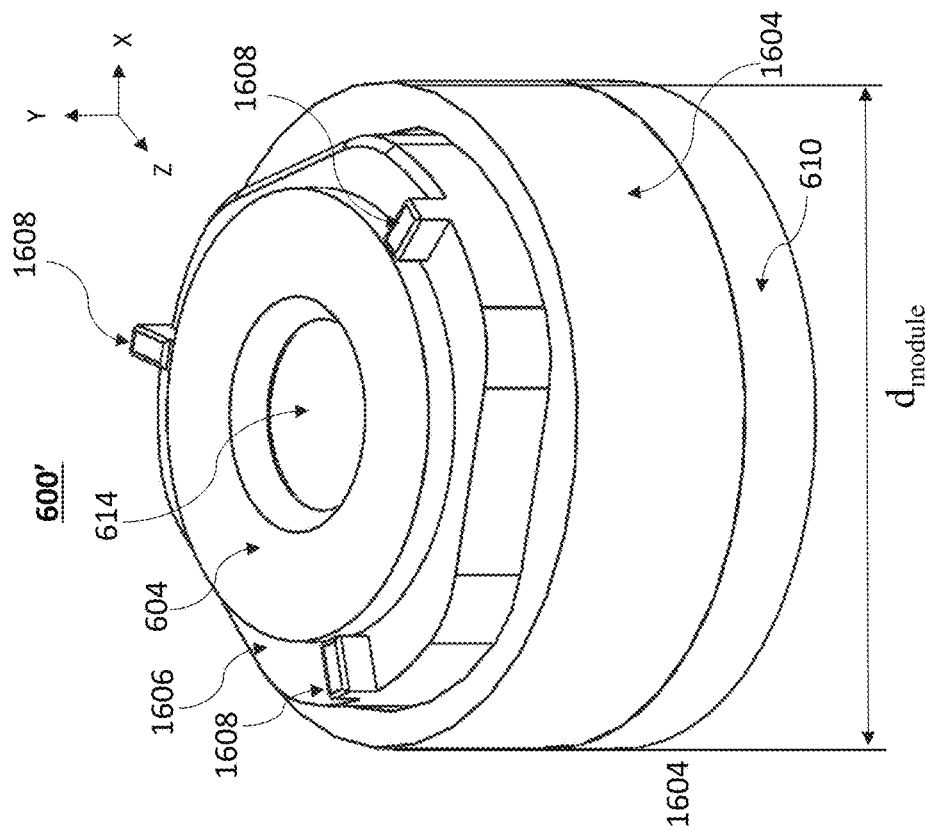
FIG. 16B shows a perspective view of the pop-out optics module of FIG. 16A.
Figure 16A:
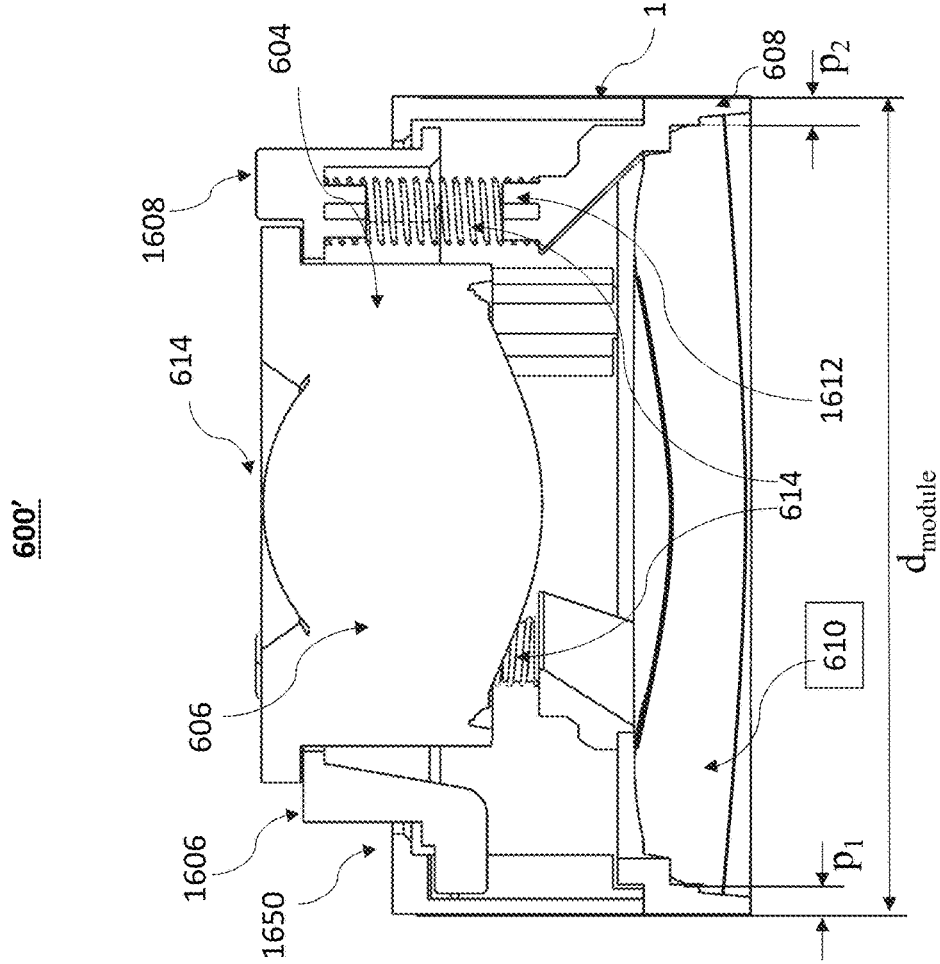
FIG. 16A shows a cross sectional view of another example of a pop-out optics module in a pop-out state.

FIG. 16A shows a cross sectional view and FIG. 16B show a perspective view of optics module 600' in a pop-out state. Module 600' comprises an optics frame 1650, first collapsible lens barrel section 604 (lens elements not shown here), second fixed lens barrel section 608, three springs 614 (not all visible here), a side cover 1604, a top cover 1606 and three stoppers 1608 (not all visible here). Each spring sits on one of three spring holders 1612 (not all visible here). Optics frame 1650 holds all components of optics module 600' except the lens elements that are included in the first and the second lens barrel sections. Stoppers 1608 are rigidly coupled to top cover 1606 and ensure that the collapsible lens barrel section (604) is not in direct contact with window frame 214.

A "penalty" p for a diameter of an optics module is defined as the difference between the diameter of the optics module and the largest diameter of a lens included in the optics module. For optics module 600', $d_{module}$ is slightly larger than the largest diameter of lens 620, represented by the diameter of $L_N$. Therefore, for optics module 600', penalty p is $p=p_1+p_2$ and may be 0.5 mm-8 mm.

Figures 17A, 17B:
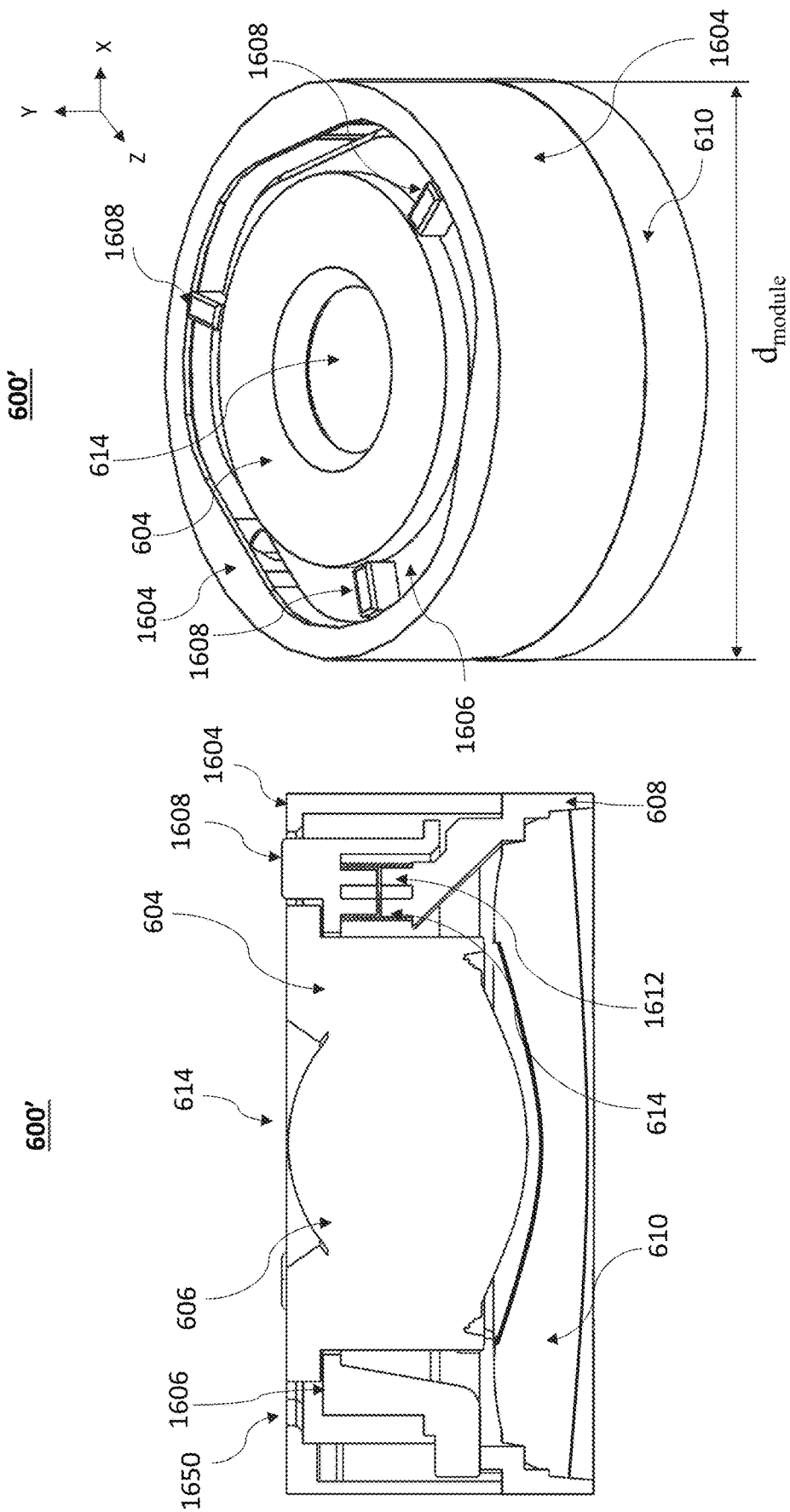
FIG. 17A shows in perspective view the pop-out optics module of FIG. 16A in a pop-out state.
FIG. 17B shows in perspective view the pop-out optics module of FIG. 16A in a collapsed state.

FIG. 17A shows optics module 600' in cross-section and FIG. 17B shows the module in perspective in a collapsed state. In the collapsed state, springs 614 are compressed.

Figure 18B:
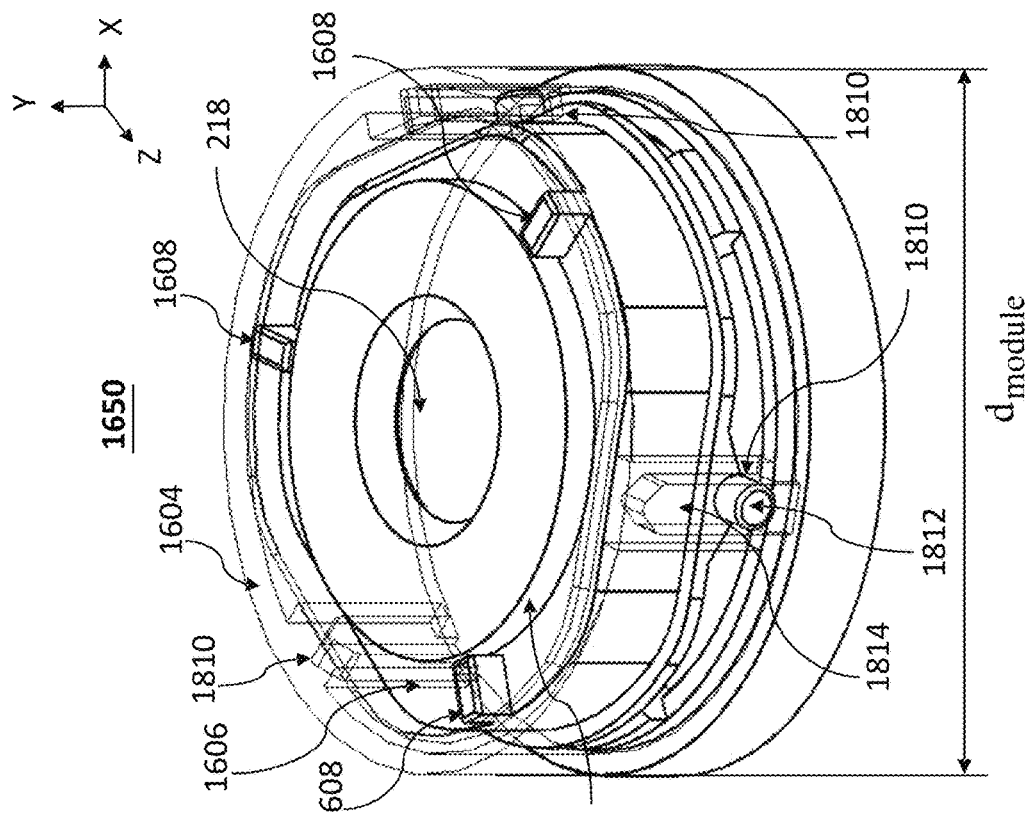
FIG. 18B shows a perspective view of the optics frame of FIG. 18A in a collapsed state.
Figure 18A:
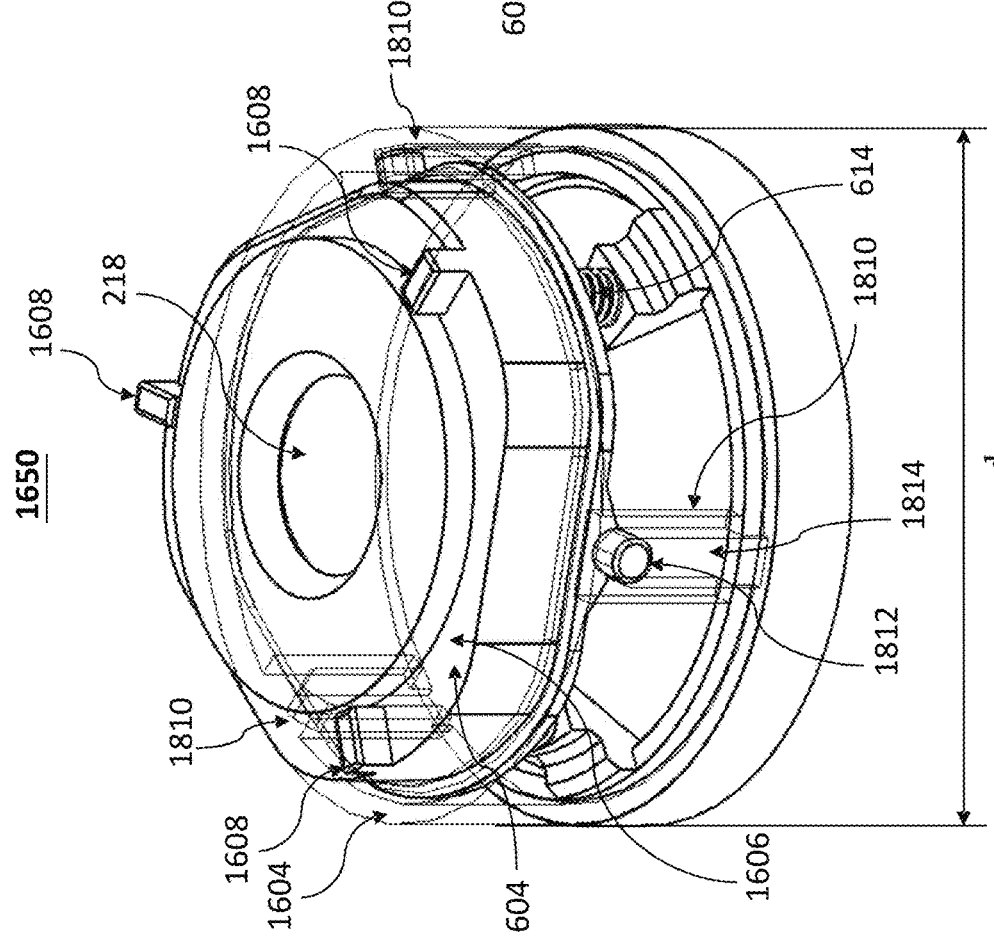
FIG. 18A shows a perspective view of an optics frame in the optics module of FIG. 16A a pop-out state.
Figure 18D:
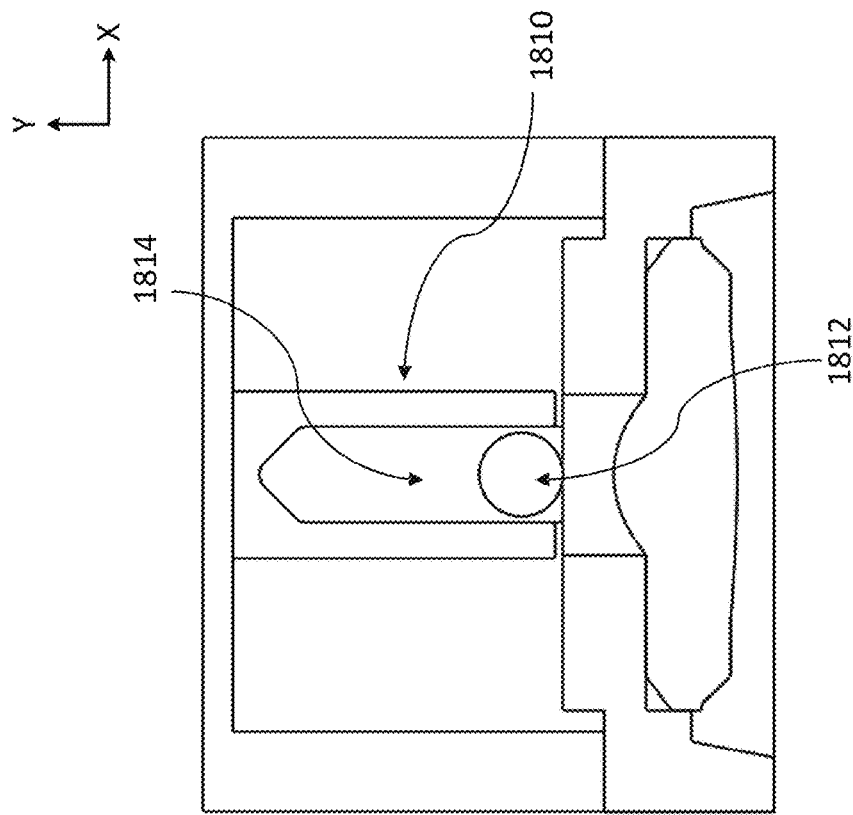
FIG. 18D shows a section of optics frame of FIG. 18B in more detail.
Figure 18C:
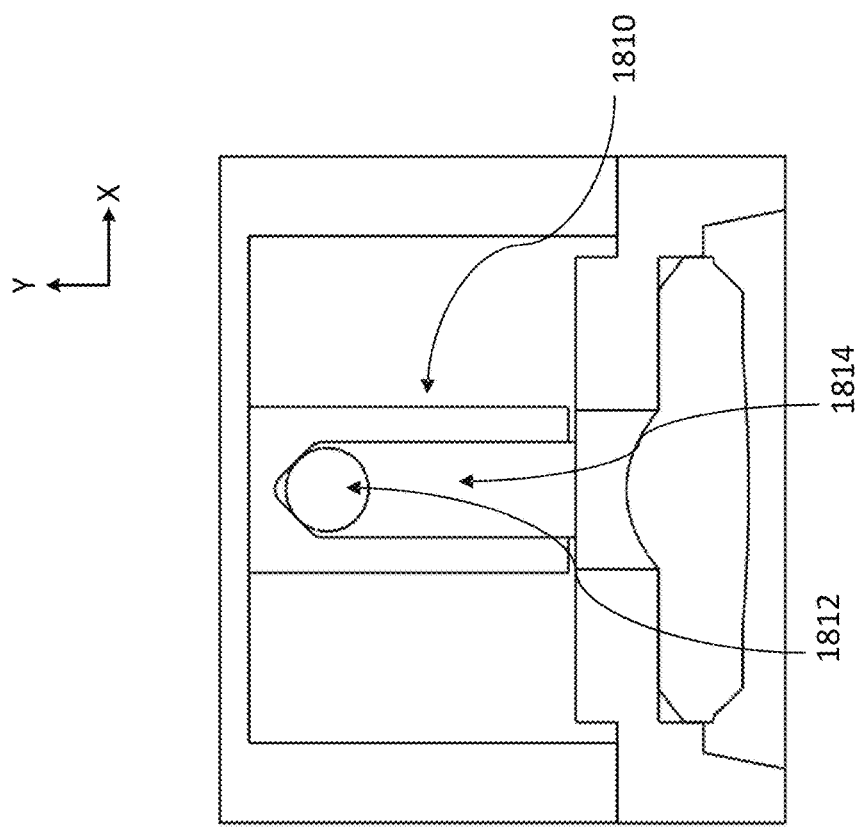
FIG. 18C shows a section of the optics frame of FIG. 18A in more detail.

FIGS. 18A-18F shows optics frame 1650 in various positions and with various details of its components. FIG. 18A shows optics frame 1650 in a pop-out state and FIG. 18B shows optics frame 1650 in a collapsed state, both in a perspective view. Collapsible lens barrel section 604 is coupled to optics frame 1650 via a "Maxwell kinematic coupling" mechanism. The Maxwell kinematic coupling mechanism comprises three v-groove/pin pairs 1810 that act as a guiding and positioning mechanism that ensures that collapsible lens barrel section 604 is kept in a fixed position relative to the other optical elements such as image sensor 208 with high accuracy. Each v-groove/pin pair 1810 is identical and includes a hemispherical pin 1812 and a v-groove 1814. More details of a v-groove/pin pair 1810 are given in FIG. 18C (for the pop-out state) and FIG. 18D (for the collapsed state). In other examples, the pins may be round or diamond-shaped or canoe-shaped. The v-grooves shown in FIG. 18A-18D have an angle of about 90 degrees. In other examples, the angle of the v-grooves may vary between 30 to 150 degrees.

Pairs 1810 are distributed at equal distance from each other. By means of the three v-groove/pin pairs 1810, optics frame 1650 supports narrow tolerances in terms of accuracy as well as repeatability for decenter in X-Z and Y as well as for tilt. Here and in the description of FIGS. 19A and 19B, "tolerances" refer to tolerances between collapsible lens barrel section 604 the fixed lens barrel section 608.

Optics frame 1650 as well as optics module 600" below may be designed to support accuracy tolerances for decenter and reliability tolerances like those of camera 200.

Figure 18F:
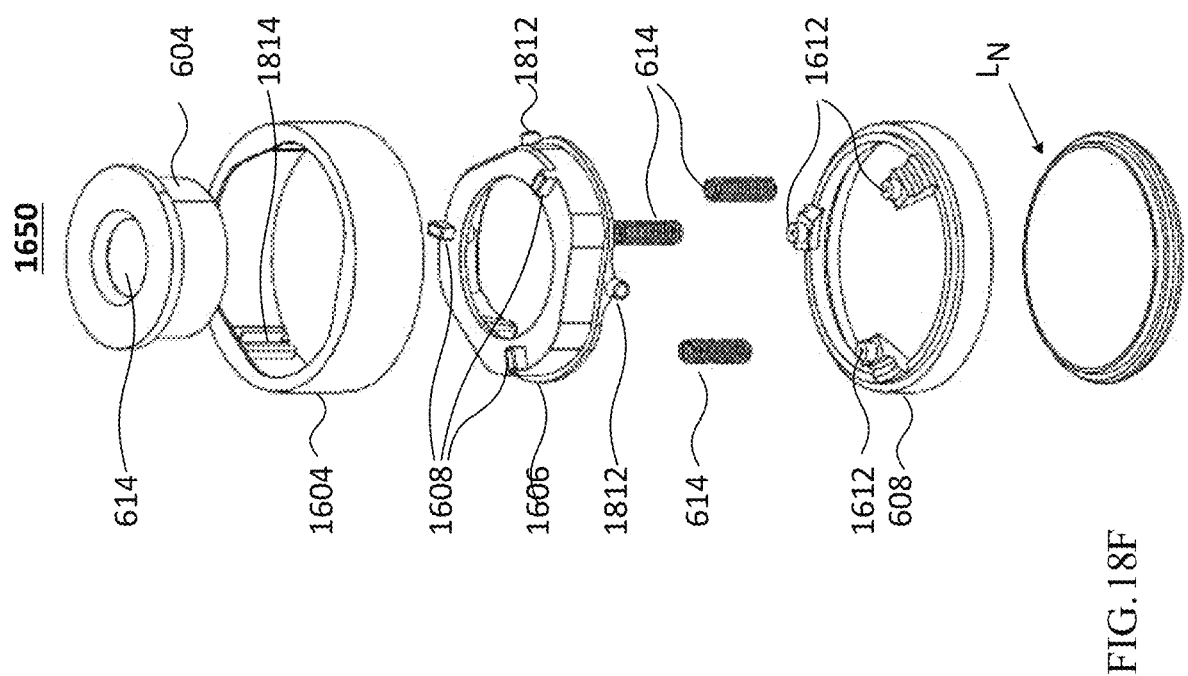
FIG. 18F shows the optics frame of FIG. 18A in an exploded view.
Figure 18E:
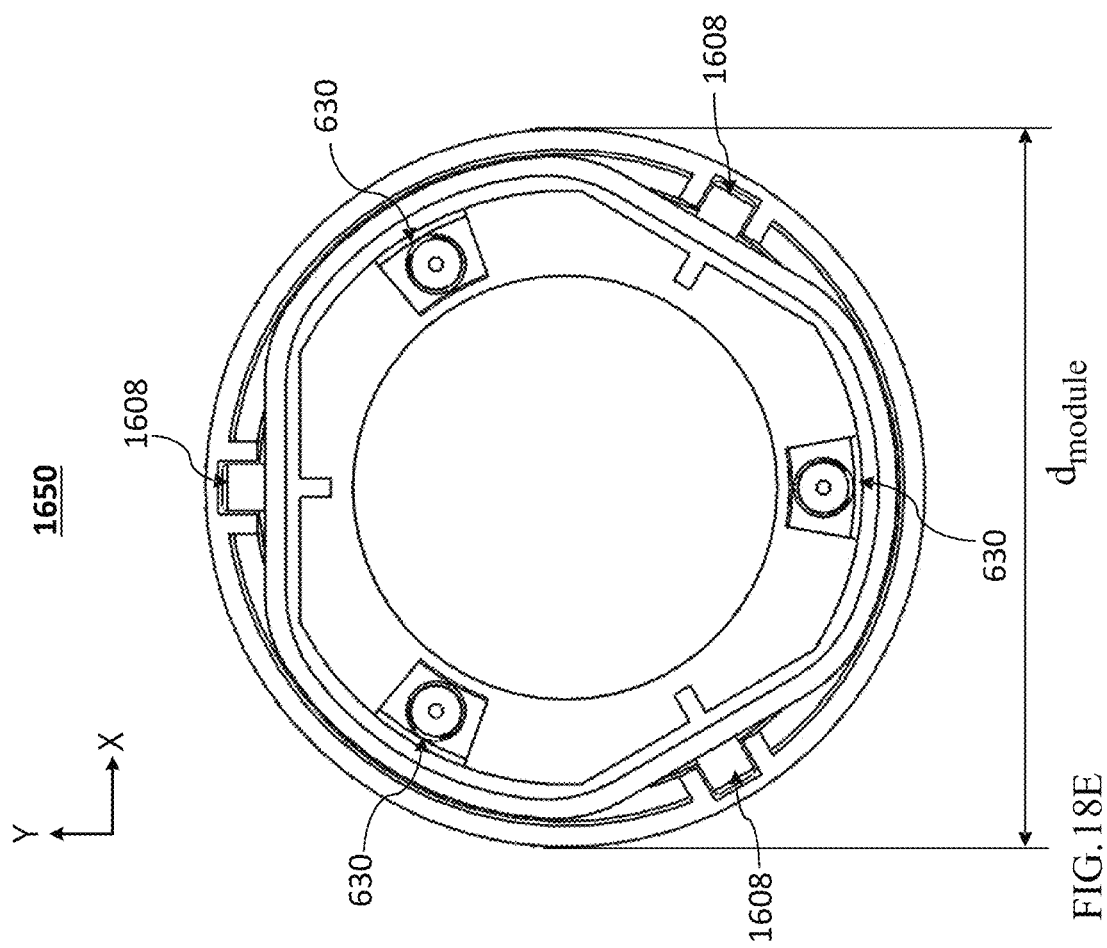
FIG. 18E shows the optics frame of FIG. 18A in a top view.

FIG. 18E shows optics frame 1650 in a top view. FIG. 18F shows optics frame 1650 in an exploded view showing the single parts that 1650 may be assembled from. Three spring holders 1612 keep the three respective springs 614 in a fixed position. One may assemble optics frame 1650 from the bottom to the top. One may start an assembly process with inserting $L_N$ into fixed lens barrel section 608, then insert springs 614 into spring holders 1612, then put top cover 1606, then put side cover 1604 and then insert the collapsible lens barrel 604 on top. In some examples such as shown in FIGS. 2A-D and FIGS. 4A-B, a lens such as lens 420 may be included in an optics frame such as 1650. Lens 420 includes a single group of lens elements only and may be included entirely in a collapsible lens barrel such as 604. In some examples, collapsible lens barrel 604 and top cover 1606 may be one single unit.

FIG. 19A and FIG. 19B show (in perspective and cross section respectively) another optics module numbered 600". Optics module numbered 600" comprises a guiding and positioning mechanism for keeping collapsible lens barrel section 604 in a fixed position with high accuracy. The guiding and positioning mechanism is based on a yoke-magnet pair. A yoke 2002 is fixedly coupled to top cover 1606', and a permanent magnet 2004 is fixedly coupled to the side cover 1604'. Through the use of yoke 2002 and magnet 2004, top cover 1606 and the side cover 1604 are attracted to each other, keeping a constant distance and orientation to each other. Optics module 1650' thus supports narrow tolerances in terms of accuracy as well as repeatability for decenter in X-Z and Y and for tilt.

Figure 19C:
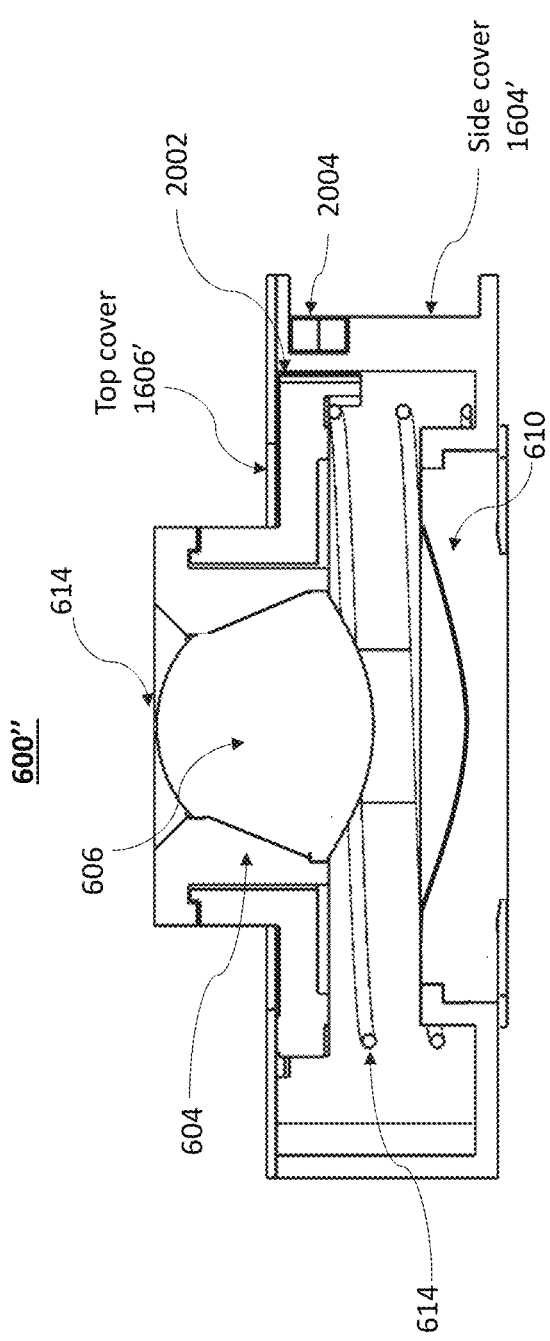
FIG. 19C shows the optics module of FIG. 19A in a pop-out state in a cross-sectional view.
Figure 19D:
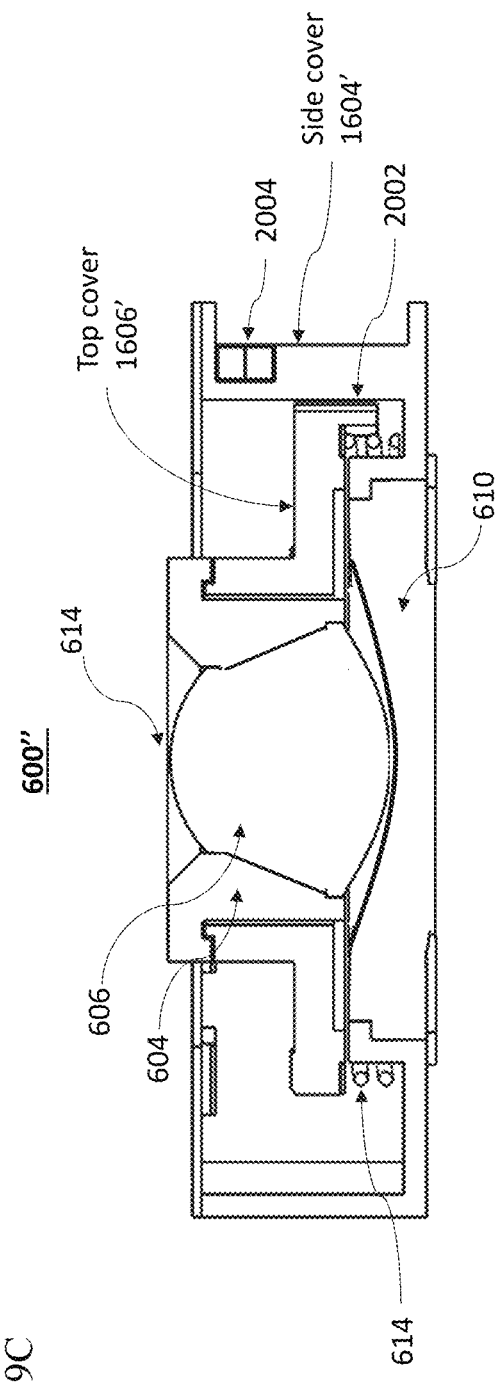
FIG. 19D shows the optics module of FIG. 19A in a collapsed state in a cross-sectional view.

FIG. 19C shows optics module 600" in a pop-out state in a cross-sectional view. A side cover 1604' acts also as a second and fixed lens barrel section carrying a second group of lens elements, i.e. no additional component acting as second lens barrel section is required. FIG. 19D shows optics module 600" in a collapsed state in a cross-sectional view.

Figure 19F:
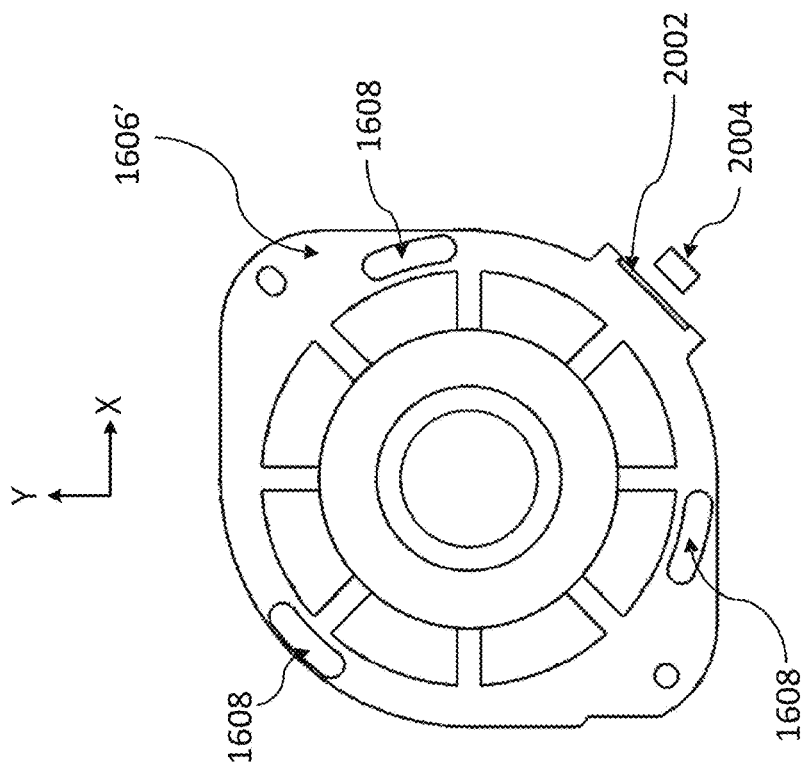
FIG. 19F shows the top cover and magnet of the optics module of FIG. 19E in a top view.
Figure 19E:
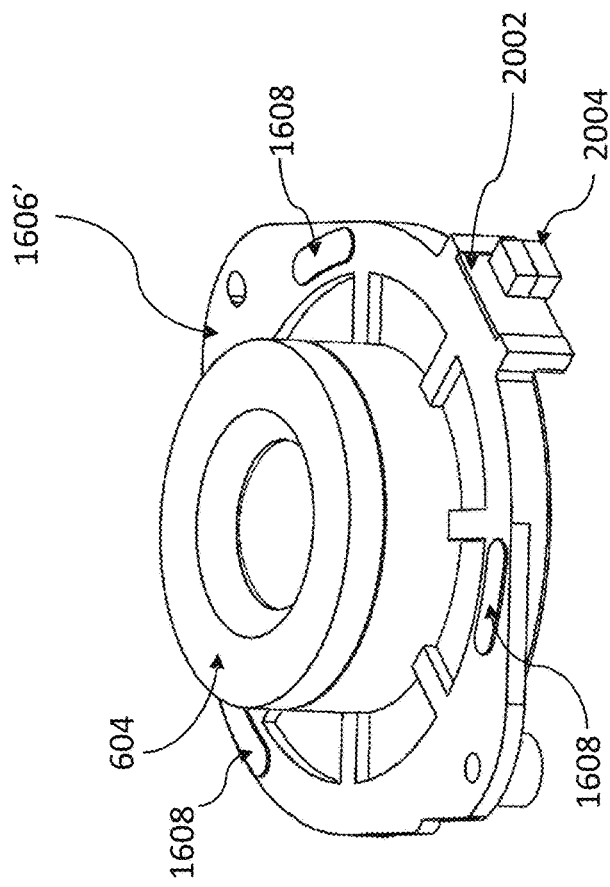
FIG. 19E shows a top cover and a magnet of the optics module of FIG. 19A in a perspective view.

FIG. 19E shows a perspective view and FIG. 19F shows a top view of top cover 1606' and magnet 2004.

FIG. 20A shows a side view and FIG. 20B shows a perspective view of a magnet part of window position measurement mechanism 1420 in a collapsed state. Two side magnets 2102a and 2102b are located on both sides of an inner (auxiliary) magnet 2104. All magnets are fixedly coupled to cam follower 1402. Magnets 2102a, 2102b and 2104 create a magnetic field that is sensed by Hall sensor 2106. Hall sensor 2106 is fixedly coupled to side limiter 1406 (not shown here). The magnetic field sensed by Hall sensor 2106 depends on the relative position of cam follower 1402 and side limiter 1406. That is, mechanism 1420 allows sensing of the relative position of cam follower 1402 and side limiter 1406 continuously along a stroke that may be in a range 1-10 mm.

FIG. 20C shows a side view of magnets 2102a, 2102b, 2104 and Hall sensor 2106, with camera 1400 shown in a collapsed state. FIG. 20D shows a side view of magnets 2102a, 2102b, 2104 and Hall sensor 2106, with camera 1400 shown in a pop-out state. The stroke extends between the extreme positions shown here, i.e. between the collapsed state and the pop-out state. In some examples, mechanism 1420 may measure the relative position of 1402 and 1406 with the same accuracy along the entire stroke. In other examples and beneficially, mechanism 1420 may measure the relative position of 1402 and 1406 with a higher accuracy close to the extreme positions shown here, and with a lower accuracy in other positions.

FIG. 20E shows an example of (a) a design and (b) the magnetic field of mechanism 1420, with magnetization of magnets 2102a, 2102b and 2104 shown.

FIG. 20F shows an example of a magnet configuration 2110 that may be included in a position measurement mechanism such as 1420. A configuration of magnets 2102a, 2102b and 2104 is shown in (a), and magnetic flux density versus a position X as created by the magnet configuration of (a) is shown in (b). A large and substantially identical slope $\Delta B/\Delta X$ may be achieved along a linear range. The linear range of 2110 may extend between 1-10 mm.

FIG. 20G shows another example of a magnet configuration 2120 that may be included in a position measurement mechanism such as 1420. A configuration of magnets 2102a, 2102b and 2104 is shown in (a), and magnetic flux density versus a position X as created by the magnet configuration of (a) is shown in (b). The linear range is divided into three sub-ranges A1, B and A2. In the sub-ranges A1 and A2, slope $\Delta B/\Delta X$ is larger than the slope in sub-range B. For example, a slope in the sub-ranges A1 and A2, $\Delta B/\Delta X(A)$, may be 5 times, 10 times or 25 times larger than a slope in the sub-range B, $\Delta B/\Delta X(B)$. For example, $\Delta B/\Delta X(A) \sim 500$ mT/mm, and $\Delta B/\Delta X(B) \sim 50$ mT/mm, so that a ratio of $[\Delta B/\Delta X(A)]/[\Delta B/\Delta X(B)]=10$. The division in of the linear range in sub ranges with different slopes may be beneficial for a position measurement mechanism such as 1420, as a higher accuracy may be required in the extreme regions close to the positions of the pop-out state and the collapsed state.

In summary, disclosed herein are digital cameras with a pop-out mechanisms that allow for large EFLs and large image sensor sizes and low camera heights in a collapsed mode.

While this disclosure has been described in terms of certain examples and generally associated methods, alterations and permutations of the examples and methods will be apparent to those skilled in the art. The disclosure is to be understood as not limited by the specific examples described herein, but only by the scope of the appended claims.

It is appreciated that certain features of the presently disclosed subject matter, which are, for clarity, described in the context of separate examples, may also be provided in combination in a single example. Conversely, various features of the presently disclosed subject matter, which are, for brevity, described in the context of a single example, may also be provided separately or in any suitable sub-combination.

Furthermore, for the sake of clarity the term "substantially" is used herein to imply the possibility of variations in values within an acceptable range. According to one example, the term "substantially" used herein should be interpreted to imply possible variation of up to 10% over or under any specified value. According to another example, the term "substantially" used herein should be interpreted to imply possible variation of up to 5% over or under any specified value. According to a further example, the term "substantially" used herein should be interpreted to imply possible variation of up to 2.5% over or under any specified value.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

All patents and patent applications mentioned in this specification are herein incorporated in their entirety by reference into the specification, to the same extent as if each individual patent or patent application was specifically and individually indicated to be incorporated herein by reference. In addition, citation or identification of any reference in this application shall not be construed as an admission that such reference is available as prior art to the present disclosure.

What is claimed is:

1. A camera integrated in a mobile device, comprising:
   a lens assembly that includes N lens elements L1-LN starting with $L_1$ on an object side, wherein $N \geq 6$;
   an image sensor having a sensor diagonal SD in the range of 11-22 mm; and
   a pop-out mechanism configured to control an air-gap between a lens element and the image sensor to bring the camera to an operative pop-out state and to a collapsed state,
   wherein the pop-out mechanism is configured to raise and lower a moving window element relative to a stationary surface of the mobile device and comprises an external module seal configured to prevent liquids and particles from penetrating the mobile device,
   wherein the external module seal is coupled to the moving window element and to the stationary surface so as to adapt to a motion of the moving window element,
   wherein the lens assembly has a total track length TTL in the operative pop-out state and a collapsed total track length cTTL in the collapsed state, and
   wherein cTTL/SD<0.65.

2. The camera of claim 1, wherein the external module seal has a collapsible structure, an inner edge and an outer edge, and wherein the external module seal collapses into a peripheral bulge formed between its inner and outer edges in response to the pop-out mechanism lowering the moving window element.

3. The camera of claim 2, wherein the peripheral bulge of the external module seal unfolds in response to the pop-out mechanism raising the moving window element.

4. The camera of claim 3, wherein in the pop-out state, the external module seal extends to form a crown with a tubular shape.

5. The camera of claim 3, wherein in the collapsed state, the peripheral bulge extends inwards into the mobile device.

6. The camera of claim 1, wherein the external module seal facilitates completely preventing ingress of dust into the mobile device and enabling the mobile device to be continuously immersed in water under predefined pressure conditions.

7. The camera of claim 6, wherein the external module seal supports an ingress protection ranking IP68 of the mobile device.

8. The camera of claim 1, wherein the pop-out mechanism includes a stepper motor.

9. The camera of claim 1, wherein cTTL/SD<0.625.

10. The camera of claim 1, wherein $N \geq 6$ includes N=6 or 7.

11. The camera of claim 1, wherein the lens has a f number f/# in the range 1.7-2.5.

12. The camera of claim 1, wherein the lens has a f number f/# in the range 1.5-1.7.

13. The camera of claim 1, wherein the camera includes an optics module comprising the lens, wherein the pop-up mechanism includes a window frame engageable with the optics module, wherein the window frame does not touch the optics module in the operative pop-out state, and wherein the window frame is operable to press on the optics module to bring the camera to the collapsed state.

14. The camera of claim 13, wherein the moving window element is the window frame.

15. The camera of claim 13, wherein the optics module has an optics module diameter dO, wherein the lens assembly has a maximum lens diameter dL, and wherein dO<dL+8 mm.

16. The camera of claim 15, wherein dO<dL+4 mm.

17. The camera of claim 15, wherein dO<dL+2 mm.

18. The camera of claim 15, wherein dO<dL+1 mm.

19. The camera of claim 1, wherein the pop-out mechanism comprises a guiding and positioning mechanism based on a kinematic coupling mechanism.

20. The camera of claim 1, wherein the mobile device is a smartphone.

* * * * *